(12) United States Patent
Li et al.

(10) Patent No.: US 12,074,269 B2
(45) Date of Patent: Aug. 27, 2024

(54) SQUARE HOUSING BATTERY COATING DEVICES COMPATIBLE WITH A PLURALITY OF COATING MANNERS

(71) Applicant: SHENZHEN UTIMES INTELLIGENT EQUIPMENT CO., LTD., Guangdong (CN)

(72) Inventors: Junli Li, Shenzhen (CN); Guoping Zhang, Shenzhen (CN); Caiwei Yan, Shenzhen (CN); Gang Chen, Shenzhen (CN)

(73) Assignee: SHENZHEN UTIMES INTELLIGENT EQUIPMENT CO., LTD., Shenzhen (CN)

( * ) Notice: Subject to any disclaimer, the term of this patent is extended or adjusted under 35 U.S.C. 154(b) by 0 days.

(21) Appl. No.: 18/437,177

(22) Filed: Feb. 8, 2024

(65) Prior Publication Data
US 2024/0213511 A1   Jun. 27, 2024

Related U.S. Application Data

(63) Continuation-in-part of application No. PCT/CN2023/099568, filed on Jun. 11, 2023.

(30) Foreign Application Priority Data

Dec. 23, 2022  (CN) ......................... 202211668392.X

(51) Int. Cl.
*H01M 10/04*   (2006.01)
*H01M 50/103*   (2021.01)

(52) U.S. Cl.
CPC ......... *H01M 10/04* (2013.01); *H01M 50/103* (2021.01)

(58) Field of Classification Search
CPC ........................... H01M 10/04; H01M 50/103
See application file for complete search history.

(56) References Cited

U.S. PATENT DOCUMENTS

2009/0202903 A1   8/2009   Chiang et al.
2021/0107174 A1   4/2021   Shao

FOREIGN PATENT DOCUMENTS

CN   105514477 A   4/2016
CN   108615928 A   10/2018
(Continued)

OTHER PUBLICATIONS

Notification to Grant Patent Right for Invention in Chinese Application No. 202211668392.X mailed on May 31, 2023, 7 pages.
(Continued)

*Primary Examiner* — Lingwen R Zeng
(74) *Attorney, Agent, or Firm* — Porus IP LLC

(57) ABSTRACT

The embodiments of the present disclosure provides a square housing battery coating device compatible with a plurality of coating manners. The device may include a machine station, a pushing device, a feeding device, a film releasing device, a film sending device, a film adhering device, a transferring and positioning device, an edge cutting device, and a folding and adhering device. The device may be configured to form a U-shaped coating battery by first paving an insulating film on a bottom side, a left side, and a right side of the battery input with the bottom side facing forward using a U-shaped coating manner, or form a hollow-square-shaped coating battery by first paving the insulating film on a front side, the left side, and the right side, and folding and adhering the back side of the battery input with the front side facing forward using a hollow-square-shaped coating manner.

7 Claims, 20 Drawing Sheets

(56) References Cited

FOREIGN PATENT DOCUMENTS

| CN | 111816906 | A | | 10/2020 | | |
|----|-----------|---|---|---------|---|---|
| CN | 112208830 | A | * | 1/2021 | ............. | B65B 33/02 |
| CN | 114132555 | A | | 3/2022 | | |
| CN | 114597471 | A | | 6/2022 | | |
| CN | 217498125 | U | | 9/2022 | | |
| CN | 115832401 | A | | 3/2023 | | |
| EP | 1921693 | A2 | | 5/2008 | | |
| WO | 2005015659 | A1 | | 2/2005 | | |
| WO | 2022037588 | A1 | | 2/2022 | | |

OTHER PUBLICATIONS

Wu, Zhihua, Introduction on Choice and Application of Plastics, Engineering Plastics Application, 28(7): 29-34, 2000.

* cited by examiner

SQUARE HOUSING BATTERY COATING DEVICES COMPATIBLE WITH A PLURALITY OF COATING MANNERS

CROSS-REFERENCE TO RELATED APPLICATIONS

The application is a continuation-in-part application of International Application No. PCT/CN2023/099568, filed on Jun. 11, 2023, which claims priority to Chinese Patent Application No. 202211668392.X, filed on Dec. 23, 2022, the entire contents of each of which are hereby incorporated by reference.

TECHNICAL FIELD

The present disclosure relates to the technical field of a coating device for a square housing battery, and in particular, to a square housing battery coating device compatible with a plurality of coating manners.

BACKGROUND

For a square housing battery (hereinafter referred to as a battery), an insulating film (sheet) may be coated on six housing faces of a metal housing of a bare battery in a manufacturing process of a battery, so that the bare battery becomes a coated battery to achieve an electrical isolation (insulation). At the same time, the insulating film (sheet) may also play a role of anti-corrosion and decoration.

A form of adopting an insulating film tape to coat the six housing sides of the battery may include paving some sides to form paved sides, and the remaining another side may be folded and adhered with the insulating film extending out of the paved sides so as to form a folded and adhered side. In the prior arts, the insulating film may be adopted to pave some housing sides of the battery, and then the insulating film tape may be cut during a film adhering process. Before the folding and adhering operation is performed, the insulating film extending out of four corners of a bottom side of the battery may be notched or cut off a piece near the four corners to avoid that an adhesive side of the insulating film in the folding and adhering process is forced to overlap with itself and is unable to be adhered to the housing side of the battery, which leads to wrappings. Finally, the insulating film (sheet) may be adhered to a top side of the battery.

Therefore, it is desirable to provide a square housing battery coating device compatible with a plurality of coating manners, so as to perform a battery coating operation in a U-shaped coating manner or a hollow-square-shaped coating manner.

SUMMARY

A purpose of the embodiments of the present disclosure focuses on providing a square housing battery coating device compatible with a plurality of coating manners. The device may be configured to perform a battery coating in a U-shaped coating manner or a hollow-square-shaped coating manner while ensuring that a quality of the insulating film coating is in accordance with requirements.

The square housing battery coating device compatible with a plurality of coating manners provided in the embodiments of the present disclosure may include a machine station, a feeding line, a code scanning device, a charging turnover device, a charging and handling device, a pushing device, a feeding device, a film releasing device, a film sending device, a film adhering device, a transferring and positioning device, an edge cutting device, a folding and adhering device, a blanking turnover device, a blanking and handling device, a discharging transfer device, and a discharging line. The machine station may be disposed with a film adhering station. The feeding line, the code scanning device, the charging turnover device, the charging and handling device, the pushing device, the feeding device, the film releasing device, the film sending device, the film adhering device, the transferring and positioning device, the edge cutting device, the folding and adhering device, the blanking turnover device, the blanking and handling device, the discharging transfer device, and the discharging line may be fixed to the machine station according to a sequence of a coating process. The square housing battery coating device may be configured to perform a battery coating in a U-shaped coating manner or a hollow-square-shaped coating manner.

The film sending device may be disposed above the pushing device and disposed between the film releasing device and the film adhering device, and the film sending device may be configured to send an insulating film tape on the film releasing device to the film adhering device. The film sending device may include a film pulling mechanism configured to pull the insulating film tape to the film adhering station, and a film cutting mechanism configured to cut the insulating film tape on the film pulling mechanism into a plurality of insulating film tape sections.

The film adhering device may be fixed to the film adhering station and disposed between the film sending device and the transferring and positioning device, and the film adhering device may be configured to send a battery with a left side of the battery facing upward to the feeding device, and with a support of the film sending device inputting the plurality of insulating film tape sections, form a U-shaped coating semi-finished battery by paving an insulating film on a bottom side, the left side, and a right side of the battery input with the bottom side facing forward using the U-shaped coating manner, or form a hollow-square-shaped coating semi-finished battery by paving the insulating film on a front side, the left side, and the right side and paving a folding and adhering insulating film to a back side of the battery input with the front side facing forward using the hollow-square-shaped coating manner, the film adhering device being provided with a first folding and adhering station configured to fold and adhere the insulating film paved on the left side and the right side of a hollow-square-shaped coating battery to the back side.

The transferring and positioning device may be disposed between the film adhering device and the blanking and turning device, and the transferring and positioning device may be disposed with an edge cutting and second folding and adhering station, and a third folding and adhering station configured to transfer between the edge cutting and the second folding and adhering station and the third folding and adhering station in the coating process, and clamp and locate the U-shaped coating semi-finished battery or the hollow-square-shaped coating semi-finished battery at the edge cutting and second folding and adhering station and the third folding and adhering station.

The edge cutting device may be disposed at the edge cutting and second folding and adhering station, and the edge cutting device may be configured to cut, in a preset position and with an assistance of the transferring and positioning device, the insulating film extending outside the front side, the back side, or the bottom side of the U-shaped semi-finished battery, or cut, in the preset position, with the assistance of the transferring and positioning device, the insulating film extending outside the bottom side of the hollow-square-shaped semi-finished battery.

The folding and adhering device may be disposed at the third folding and adhering station behind the edge cutting device. The folding and adhering device may be configured to fold and adhere the insulating film extending outside the front side, the back side, and the bottom side of the U-shaped coating semi-finished battery to the front side and the back side, or fold and adhere the insulating film extending outside the bottom side of the hollow-square-shaped coating semi-finished battery to the bottom side.

Preferably, the film sending device may further include a film sending bracket, a film holding mechanism, a light-curing mechanism, and a waste film recycling mechanism. The film sending device may be fixed to the machine station, and the film device may be configured to lay the insulating film tape. The film holding mechanism may be fixed to the film sending bracket, and may be disposed with a film sending channel. The film sending channel may be configured to locate and input the insulating film tape. The light-curing mechanism may be fixed to a top of the film sending bracket, and may be above the film holding mechanism, the light-curing mechanism may be configured to carry out a light-curing process on a back-adhesive of the insulating film tape on the film holding mechanism. The film pulling mechanism may be fixed to the film sending bracket. The film cutting mechanism may be fixed inside the film sending bracket. The waste film recycling mechanism may be fixed under the film sending bracket, and configured to recycle a waste insulating film.

Advantageously, the film applying device may include a film adhering bracket, an upper paving mechanism, a lower paving mechanism, a film adhering and receiving mechanism, a folding and adhering clamping mechanism, and a first folding and adhering mechanism. The film adhering bracket may be fixed on the machine station and provided with a paving channel configured to pave the insulating film to the battery. The upper paving mechanism and the lower paving mechanism may be fixed on the film adhering bracket. The upper paving mechanism may be located on a top of the paving channel and configured to pave the insulating film to an upper half of the bottom side and the left side of the battery under the U-shaped coating manner, or pave the insulating film to an upper half of the front side and the left side of the battery under the hollow-square-shaped coating manner. The lower paving mechanism may be located at a bottom of the paving channel and may be configured to pave the insulating film to a lower half of the bottom side and the right side of the battery under the U-shaped coating manner, or pave the insulating film to a lower half of the front side and the right side of the battery under the hollow-square-shaped coating manner. The film adhering and receiving mechanism may be disposed at an outlet end of the paving channel and configured to receive the battery during and after a paving process. The folding and adhering clamping mechanism may be disposed at an output end of the coating receiving mechanism and configured to clamp the battery after the paving process. The first folding and adhering station configured to fold and adhere the back side of the hollow-square-shaped coating battery may be formed between the coating receiving mechanism and the folding and clamping mechanism. A first folding and adhering mechanism may include a first upper folding and adhering module and a first lower folding and adhering module. The first upper folding and adhering module may be fixed to the upper paving mechanism and located above the first folding and adhering station. The first upper folding and adhering module may be configured to fold and adhere a tape end of each of the plurality of insulating film tape sections extending out of the left side of the hollow-square-shaped coating battery to the back side of the hollow-square-shaped coating battery from top to bottom. The first lower folding and adhering module may be fixed to the film receiving mechanism and located below the first folding and adhering station, and the first lower folding and adhering module may be configured to fold and adhere a tape head of each of the plurality of insulating film tape sections extending out of the right side of the hollow-square-shaped coating battery to the back side of the hollow-square-shaped coating battery from bottom to top.

Preferably, the transferring and positioning device may include the following portions.

Two coating positioning mechanisms symmetrically fixed to a left side and a right side of the machine station, each coating positioning mechanism including a coating positioning bracket and a plurality of positioning fixtures disposed on the coating positioning bracket, the edge cutting and second folding and adhering station and the third folding and adhering station being formed on the plurality of positioning fixtures symmetrically disposed in pairs, a transferring channel configured to determine a conveying direction of the battery being formed between the two coating positioning mechanisms.

A transferring mechanism fixed to the machine station and disposed in the transferring channel, the transferring mechanism including a plurality of transferring carriers configured to clamp the battery stably and a transferring linear module with a plurality of slide blocks. The plurality of transferring carriers may be configured to move to the battery. The transferring linear module may be fixed on the machine station and located between the two coating positioning brackets, the plurality of transfer carriers may be fixed to the plurality of slide blocks of the transferring linear module, respectively.

Two top pressing mechanisms corresponding to the edge cutting and second folding and adhering station and the third folding and adhering station, respectively, each top pressing mechanism including a top pressing bracket, a top pressing driver bracket, a top pressing driver, and a top pressing palm. The top pressing bracket may include two top pressing bracket columns and a top pressing bracket beam. The top pressing driver bracket may be fixed on the top pressing bracket beam, the top pressing driver may be fixed on the top pressing driver bracket, and the top pressing palm may be fixed on a free end of the top pressing driver, and faced downwardly towards the edge cutting and second folding and adhering station and the third folding and adhering station.

Preferably, the edge cutting device may include two first edge cutting mechanisms and two second edge cutting mechanisms that are interchangeable with each other.

The first edge cutting mechanism and the second edge cutting mechanism may include an edge cutting bracket module, a first film abutting, an edge cutting forward-backward module, and a film-shouldering module.

The first edge cutting mechanism may further include a first film abutting module and a first edge cutting module, the first film abutting module and the first edge cutting module being an independent unit for easy replacement, the first edge cutting mechanism being configured to cut edges of the bottom side of the U-shaped coating battery, or cut edges of the front side and edges of the back side of the hollow-square-shaped coating battery.

The second edge cutting mechanism may further include a second film abutting and edge cutting forward-backward module, a second film abutting module, and a second edge cutting module. The second film abutting and edge cutting forward-backward module, the second film abutting module, and the second edge cutting module may be an independent unit for easy replacement. The second edge cutting mechanism may be configured to cut edges of the left side and edges of the right side of the U-shaped coating battery, or cut edges of the left side and edges of the right side of the hollow-square-shaped coating battery.

The edge cutting bracket module may be disposed on the machine station and aligned with the edge cutting and second folding and adhering station. The edge cutting bracket module may be configured to install the first film abutting and edge cutting forward-backward module and the film-shouldering module.

The first film abutting and edge cutting forward-backward module may be configured to install the second film abutting and edge cutting forward-backward module, the first film abutting module, and the first edge cutting module.

The second film abutting and edge cutting forward-backward module may be configured to install the second film abutting module and the second edge cutting module.

The film shouldering module may be configured to support the insulating film extending from the left side and the right side of the battery to keep a smooth extension of an insulating film to be cut that is extended out of the left side and the right side.

The first film abutting module may be configured to abut against and hold the insulating film out of the bottom side of the U-shaped battery at an edge cutting position when cutting the edges of the bottom side of the U-shaped coating battery, such that a concavity of the insulating film does not occur to affect the edge cutting when edges of the insulating film are cut, or abut against and hold the insulating film out of the front side and the back side of the hollow-square-shaped coating battery at an edge cutting position when cutting the edges of the front side and the edges of the back side of the hollow-square-shaped coating battery, such that the concavity of the insulating film does not occur to affect the edge cutting.

The second film abutting module may be configured to abut against and hold the insulating film out of the left side and the right side of the U-shaped coating battery at the edge cutting position when cutting the edges of the left side and the right side of the U-shaped coating battery, such that the concavity of the insulating film does not occur to affect the edge cutting; or, abut against and hold the insulating film out of the left side and the right side of the hollow-square-shaped coating battery at the edge cutting position when cutting the edges of the front side and the edges of the back side of the hollow-square-shaped coating battery, such that the concavity of the insulating film does not occur to affect the edge cutting.

The first edge cutting module may be configured to cut a preset length at a preset position of the insulating film extending outside the bottom side of the U-shaped coating battery when cutting the edges of the bottom side of the U-shaped coating, or cut a preset length at a preset position of the insulating film extending outside of the front side and the back side of the hollow-square-shaped coating battery when cutting the edges of the front side and the edges of the back side of the hollow-square-shaped coating battery.

The second edge cutting module may be configured to cut a preset length at a preset position of the insulating film extending outside the left side and the right side of the U-shaped coating battery when cutting the edges of the left side and the right side of the U-shaped coating battery; or cut a preset length at a preset position of the insulating film extending outside the left side and the right side of the U-shaped coating battery when cutting the edges of the left side and the edges of the right side of the hollow-square-shaped coating battery.

Preferably, the edge cutting device may further include a first middle folding and adhering module including a first middle folding and adhering module mounting plate, a first middle folding and adhering front-rear translating slide group, a first middle folding and adhering front-rear translating driver, a first middle folding and adhering front-rear translating slide plate, a first middle folding and adhering front-rear position adjusting member, a first middle folding and adhering front-rear position adjusting slide group, a first middle folding and adhering press bracket, and a first middle folding and adhering press member. The first middle folding and adhering module mounting plate may be fixed on the first film abutting module, the first middle folding and adhering front-rear translating driver and a slide rail of the first middle folding and adhering front-rear translating slide group may be fixed to the first middle folding and adhering module mounting plate, the first middle folding and adhering front-rear translating slide plate may be fixed to a free end of the first middle folding and adhering front-rear translating driver, a slide block of the first middle folding and adhering front-rear translating slide group may be fixed to the first middle folding and adhering front-rear translating slide plate, the first middle folding and adhering front-rear position adjusting member and a slide rail of the first middle folding and adhering front-rear position adjusting slide group may be fixed to the first middle folding and adhering front-rear translating slide plate, the first middle folding and adhering press bracket may be fixed to the free end of the first middle folding and adhering front-rear position adjusting member and the slide block of the first middle folding and adhering front-rear position adjusting slide group, the first middle folding and adhering press member may be fixed to the first middle folding and adhering press bracket, a pressing direction of the first middle folding and adhering press member being opposite to a conveying direction of the battery, and a projection of the first middle folding and adhering press member in the pressing direction being located on the insulating film extending out of the bottom side of the battery.

Preferably, the folding and adhering device may include one or two second folding and adhering mechanisms, each of the second folding and adhering mechanisms including a second upper folding and adhering module, a second lower folding and adhering module, a second middle folding and adhering module, a second folding and adhering forward-backward module, and a second folding and adhering support base. The second upper folding and adhering module may be configured to hold and adhere the insulating film extending outside the left side of the battery to the front side or the back side of the battery from top to bottom under the U-shaped coating, or fold and adhere the insulating film extending outside the left side of the battery to the bottom side of the battery from top to bottom under the hollow-square-shaped coating. The second lower folding and adhering module may be configured to hold and adhere the insulating film extending outside the right side of the battery to the front side or the back side of the battery from bottom to top under the U-shaped coating; or fold and adhere the insulating film extending outside the right side of the battery to the bottom side of the battery from bottom to top in the hollow-square-shaped coating. The second upper folding and adhering module and the second lower folding and adhering module, combined with the transferring and positioning device, may be configured to form the third folding and adhering station configured to fold and adhere the battery coating. The second middle folding and adhering module may be configured to hold and adhere the insulating film extending outside the bottom side of the battery in a horizontal backward direction to the back side of the battery under the U-shaped coating, or fold and adhere the insulating film extending outside the front side or the back side of the battery in a horizontal forward or backward direction to the bottom side of the battery in the hollow-square-shaped coating. The second folding and adhering forward-backward module may be configured to install the second upper folding and adhering module, the second lower folding and adhering module, and the second middle folding and adhering module, and may be able to drive the second upper folding and adhering module, the second lower folding and adhering module, and the second middle folding and adhering module to move forward-backward in a left-right direction. The second folding and adhering support may be configured to install the second folding and adhering forward-backward module, and adjust and locate the second folding and adhering forward-backward module.

Beneficial effects of the square housing battery coating device of the present disclosure may include that: the device may either form a U-shaped coating semi-finished battery by paving an insulating film on the bottom side, the left side, and the right side of the battery input with the bottom side facing forward using the U-shaped coating manner, or form a hollow-square-shaped coating semi-finished battery by paving the insulating film on the front side, the left side, and the right side, and folding and adhering the back side of the battery input with the front side facing forward using the hollow-square-shaped coating manner. The edge cutting mechanism of the edge cutting device, and the folding and adhering mechanism of the folding and adhering device may be fixed directly or through replacement on the edge cutting and second folding and adhering station and the third folding and adhering station, so as to continue to finish the edge cutting of the U-shaped coating, and the folding and adhering of the U-shaped coating, or the edge cutting of the hollow-square-shaped coating, and the folding and adhering of the bottom side of the hollow-square-shaped coating, and complete the battery coating.

BRIEF DESCRIPTION OF THE DRAWINGS

The present disclosure will be further described with reference to exemplary embodiments, which will be described in detail with the accompanying drawings. These embodiments are not limiting, and the same numbering represents the same structure in these embodiments, wherein.

Figure 1:
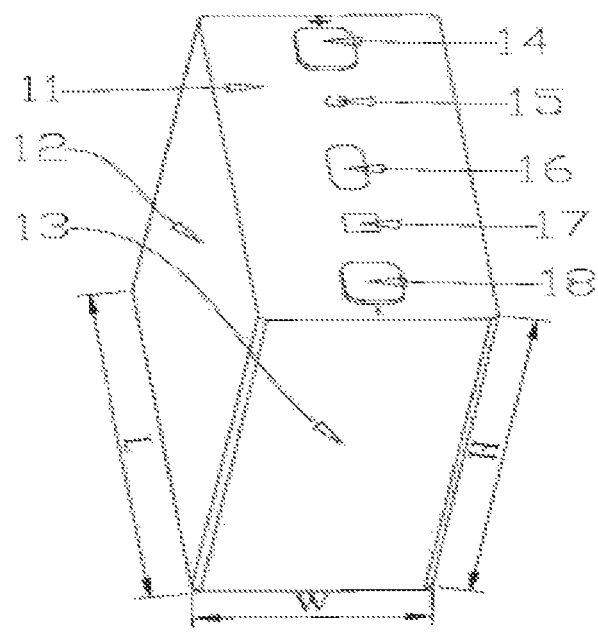
FIG. 1 is a schematic diagram illustrating a structure of a battery according to some embodiments of the present disclosure.

DESCRIPTION OF REFERENTIAL NUMBERS IN THE DRAWINGS 100, battery; 11, top side; 12, left side; 13, back side; 14, positive pole; 15, liquid-filling port; 16, explosion-proof window; 17, QR code; 18, negative pole.

200, machine station; 210, film adhering station. 300, film sending device.

310, film sending bracket; 311, left standing plate; 312, right standing plate; 313, lower standing plate; 314, lower flat plate; 315, middle flat plate; 316, upper pulling lever.

320, film holding mechanism; 321, edge-fixing module; 3211, edge-fixing film sensor bracket; 3212, edge-fixing film sensor slide group; 3213, edge-fixing film sensor slide plate; 3214, edge-fixing film sensor driver; 3215, edge-fixing film sensor mounting bracket; 3216, edge-fixing film sensor; 322, first film holding roller; 323, film storage roller; 324, second film holding roller; 325, third film holding roller; 326, film sending channel.

330, photocuring mechanism; 331, light box; 332, fan; 333, light outlet.

340, film pulling mechanism; 341, film pulling lifting driver; 342, film pulling active wheel; 343, first film pulling transmission belt; 344, film pulling transmission shaft; 345, second film pulling driven wheel; 346, second film pulling transmission belt; 347, third film pulling driven wheel; 348, film pulling transmission clamp; 349, film pulling lifting slide plate; 34a, film pulling lifting slide group; 34b, film pulling translating driver; 34c, film pulling translating slide group; 34d, film pulling translating slide plate; 34e, film pulling lever base; 34f, film pulling lever; 34g, film pulling lever brake; 34h, film pulling buffer driver; 34i, film pulling buffer slide group; 34j, film pulling buffer slide plate.

350, film cutting mechanism; 351, film shouldering front-rear driver; 352, film shouldering slide group; 353, film shouldering front-rear slide plate; 354, film cutting front-rear driver; 355, film cutting slide group; 356, film cutting front-rear slide plate; 357, film cutting left-right driver; 358, film cutting left-right slide group; 359, film cutting left-right slide plate; 35a, film cutter bracket; 35b, film shouldering roller bracket; 35c, film shouldering roller; 35d, sheath plate; 35e, cutter.

360, waste film recycling mechanism; 361, waste film recycling translating driver; 362, waste film recycling translating slide group; 363, waste film recycling translating slide plate; 364, waste film recycling bracket; 365, waste film recycling reel; 366, waste film winding driver; 367, waste film winding active wheel; 368, waste film winding driven wheel; 369, waste film winding transmission belt; 36a, waste film over-roller; 36b, waste film splicing bracket; 36c, waste film splicing driver; 36d, waste film splicing slide bracket; 36e, waste film splicing slide group; 36f, waste film splicing pressure roller bracket; 36g, waste film splicing pressure roller; 36h, waste film splicing press plate bracket; 36i, waste film splicing press plate; 36j, waste film roll proximity switch bracket; 36k, waste film roll proximity switch.

400, film adhering device.

410, film adhering bracket; 420, paving channel.

430, upper paving mechanism; 431, upper film adhering roller lifting drive module; 432, upper film adhering roller lifting slide group; 433, upper film adhering roller lifting slide plate; 434, upper film adhering roller bracket; 435, upper film adhering roller; 436, upper film adhering material-press lifting driver; 437, upper film adhering material-press lifting slide group; 438, upper film adhering material-press lifting slide plate; 439, upper film adhering material-press member.

440, lower paving mechanism; 441, lower film adhering roller lifting drive module; 442, lower film adhering roller lifting slide group; 443, lower film adhering roller lifting slide plate; 444, lower film adhering roller bracket; 445, lower film adhering roller.

450, film adhering and receiving mechanism; 451, film adhering and receiving bracket; 452, film adhering and receiving roller bracket; 453, film adhering and receiving roller; 454, film adhering and receiving brake roller; 455, receiving brake;

460, folding and adhering clamping mechanism; 461, folding and adhering clamping mounting member; 462, folding and adhering clamping front-rear translating drive module; 463, folding and adhering clamping front-rear translating slide group; 464, folding and adhering clamping front-rear translating slide plate; 465, folding and adhering clamping bracket; 466, upper clamp lifting driver; 467, upper clamp lifting slide group; 468, upper clamp lifting slide plate; 469, upper clamp bracket; 46a, upper clamp; 46b, upper clamp soft palm; 46c, lower clamp lifting driver; 46d, lower clamp lifting slide group; 46e, lower clamp lifting slide plate; 46f, lower clamp bracket; 46g, lower clamp; 46h, lower clamp soft palm; 46i, lower clamp left-right translating driver; 46j, lower clamp left-right translating slide group; 46k, lower clamp left-right translating slide plate; 461, lower clamp left-right clamp; 46m, lower clamp material sensor; 46n, lower clamp side abutting driver; 460, lower clamp side abutting bracket; 46p, lower clamp side abutting clamp body; 46q, lower clamp side abutting soft palm.

470, first folding and adhering mechanism; 471, first folding and adhering station.

472, first upper folding and adhering module; 4721, first upper folding and adhering roller lifting driver; 4722, first upper folding and adhering roller lifting slide group; 4723, first upper folding and adhering roller lifting slide plate; 4724, first upper folding and adhering roller bracket; 4725, first upper folding and adhering roller.

473, first lower folding and adhering module; 4731, first lower folding and adhering mounting plate; 4732, first lower folding and adhering roller lifting drive module; 4733, first lower folding and adhering roller lifting slide group; 4734, first lower folding and adhering roller lifting slide plate; 4735, first lower folding and adhering roller bracket; 4736, first lower folding and adhering roller.

500, transferring and positioning device.

510, coating positioning mechanism; 511, positioning fixture; 5111, bottom tray plate; 5112, front positioning vertical driver; 5113, front positioning vertical slide group; 5114, front positioning vertical slide plate; 5115, front positioning clamp; 5116, rear positioning longitudinal driver; 5117, rear positioning longitudinal slide group; 5118, rear positioning longitudinal slide plate; 5119, rear positioning vertical driver; 511a, rear positioning vertical slide group; 511b, rear positioning vertical slide plate; 511c, rear positioning clamp; 512, coating positioning bracket; 5121, coating positioning base; 5122, coating positioning longitudinal beam.

521, edge cutting and second folding and adhering station; 522, third folding and adhering station.

530, transferring channel.

540, transferring mechanism; 541, transferring carrier; 5411, transferring carrier bracket; 5412, transferring lifting driver; 5413, transferring lifting slide group; 5414, transferring lifting slide bracket; 5415, transferring gripper driver; 5416, transferring gripper; 542, transferring linear module.

550, top pressing mechanism; 551, top pressing bracket; 5511, top pressing bracket column; 5512 top pressing bracket beam; 552, top pressing driver bracket; 553, top pressing driver; 554, top pressing palm.

600, edge cutting device; 610, first edge cutting mechanism; 620, second edge cutting mechanism.

611, edge cutting bracket module; 6111, edge cutting bracket adjusting driver; 6112, edge cutting bracket adjusting slide group; 6113, edge cutting bracket; 6114, edge cutting bracket top plate; 6115, edge cutting bracket locking member.

612, film shouldering module; 6121, left-right side film shouldering base; 6122, left-right side film shouldering forward-backward driver; 6123, left-right side film shouldering forward-backward slide bracket; 6124, left-right side film shouldering forward-backward slide group; 6125, right side film shouldering driver; 6126, right side shouldering film palm; 6127, left side film shouldering driver; 6128, left side shouldering film palm.

613, first film abutting module; 6131, first film abutting and edge cutting bracket; 6132, first film abutting driver; 6133, first upper film abutting palm; 6134, first lower film abutting palm.

614, second film abutting module; 6141, second film abutting driver; 6142, second upper film abutting palm; 6143, second lower film abutting palm.

615, first film abutting and edge cutting forward-backward module; 6151, first film abutting and edge cutting forward-backward driver; 6152, first film abutting and edge cutting forward-backward slide group; 6153, first film abutting and edge cutting forward-backward slide plate.

616, second film abutting and edge cutting forward-backward module; 6161, second film abutting and edge cutting forward-backward bracket; 6162, second film abutting and edge cutting forward-backward driver; 6163, second film abutting and edge cutting forward-backward slide group; 6164, second film and edge cutting forward-backward slide plate.

617, first edge cutting module; 6171, first edge cutting driver; 6172, first cutter bracket; 6173, first upper blade; 6174, first lower blade.

618, second edge cutting module; 6181, second upper edge cutting driver; 6182, second upper cutter bracket; 6183, second upper blade; 6184, second lower edge cutting driver; 6185, second lower cutter holder; 6186, second lower blade.

619, first middle folding and adhering module; 6191, first middle folding and adhering front-rear translating slide group; 6192, first middle folding and adhering front-rear translating driver; 6193, first middle folding and adhering front-rear translating slide plate; 6194, first middle folding and adhering front-rear position adjusting member; 6195, first middle folding and adhering front-rear position adjusting slide group; 6196, first middle folding and adhering press bracket; 6197, first middle folding and adhering press member; 6198, first middle folding and adhering module mounting plate.

700, folding and adhering device;

710, second folding and adhering mechanism; 711, second upper folding and adhering module; 7111, second upper folding and adhering lifting driver; 7112, second upper folding and adhering lifting slide bracket; 7113, second upper folding and adhering adjusting assembly; 7114, second upper folding and adhering lifting slide group; 7115, second upper folding and adhering press roller bracket; 7116, second upper folding and adhering press roller.

712, second lower folding and adhering module; 7121, second lower folding and adhering lifting driver; 7122, second lower folding and adhering lifting slide bracket; 7123, second lower folding and adhering adjusting assembly; 7124, second lower folding and adhering lifting slide group; 7125, second lower folding and adhering press roller bracket; 7126, second lower folding and adhering roller.

713, second middle folding and adhering module; 7131, second middle folding and adhering bracket; 7132, second middle folding and adhering slide group; 7133, second middle folding and adhering press roller slide bracket; 7134, second middle folding and adhering buffer member; 7135, second middle folding and adhering press roller.

714, second folding and adhering forward-backward module; 7141, second folding and adhering forward-backward slide group; 7142, second folding and adhering forward-backward slide bracket; 71421, side panel; 71422, vertical panel; 7143, second folding and adhering forward-backward driver.

715, second folding and adhering support; 7151, second folding and adhering base; 7152, second folding and adhering support slide group; 7153, second folding and adhering support drive assembly; 7154, second folding and adhering support slide plate; 7155, second folding and adhering support upper bracket; 7156, second folding and adhering support locking member.

800, feeding line; 900, code scanning device; 1000, charging turnover device; 1100, charging and handling device; 1200, push device; 1300, feeding device; 1400, film releasing device; 1500, discharging transfer device; 1600, discharging line; 1700, blanking and handling device; 1800, blanking turnover device.

DETAILED DESCRIPTION

In order to make the objects, technical solutions, and advantages of the present disclosure clearer and more understandable, the present disclosure is hereinafter described in further detail in conjunction with the accompanying drawings and embodiments. It should be understood that the specific embodiments described herein are only for explaining the present disclosure and are not intended to limit the present disclosure.

In the description of the present disclosure, it is to be noted that orientations or position relationships indicated by terms "center", "down", "under", "left", "right", "front", "rear", "vertical", "horizontal", "inside", "outside", etc., are based on the orientations or the position relationships shown in the accompanying drawings, and are intended solely for the purpose of facilitating the description of the present disclosure and simplifying the description, and are not intended to indicate or imply that the device or element referred to must have a particular orientation, or must be constructed and operated in a particular orientation, and therefore are not regarded to be a limitation of the present disclosure; the terms "first", "second", "third" are used for descriptive purposes only and are not to be understood as indicative of or suggestive of relative importance; furthermore, unless otherwise expressly specified and limited, the terms "mounting", "connected", "connected", "linked" are to be understood in a broad sensor, e.g., understood as a fixed connection, a removable connection, an integral connection, a direct connection, an indirect connection through an intermediary medium, a communication within two components. To those skilled in the art, terms may be understood in specific contexts to have specific meanings in the context of the present disclosure.

FIG. 1 is a schematic diagram illustrating a structure of a battery according to some embodiments of the present disclosure.

A square housing battery (hereinafter referred to as a battery), as shown in FIG. 1, may be divided into six housing sides, which include a top side 11, a bottom side (not shown in the figure), a left side 12, a right side (not shown in the figure), a front side (not shown in the figure), a back side 13. A positive pole 14, a liquid-filling port 15, an explosion-proof window 16, a Quick Response (QR) code 17, and a negative pole 18 may be distributed from front to back on a center line of the top side 11 (an exposed side of a top cover) of a conventional battery. Dimensions of the battery may be expressed as L in length, W in width, and H in height, which may be expressed in unit of mm. In a process of battery manufacturing, it may be necessary to adhere an insulating film (sheet) to the six housing sides of a metal housing of a bare battery to make the bare battery become a film-covered battery to play a role of electrical isolation (insulation), as well as corrosion resistance and decoration. A coating manner of the six housing sides may be determined under a condition that coated batteries need to be close to each other when forming a battery module and insulated from each other when contacting an envelope housing of the battery module. The top side 11 of the battery may be arranged with the positive pole 14, the liquid-filling port 15, the explosion-proof window 16, the QR code 17, and the negative pole 18, which may be a kind of bare side with coated edges. The left side 12, the right side (not shown in the figure), the front side (not shown in the feature), the back side 13, and the bottom side (not shown in the figure) may generally be full coated sides that are all coated with insulating films with no exposed housing sides. In case no insulation demand is made to one or more of the left side 12, the right side (not shown in the figure), the front side (not shown in the figure), the back side 13, and the bottom side (not shown in the figure), and an insulation demand is made to another one or more sides, then the another one or more sides may be fully coated, and only edges of the one or more sides may be coated, leaving a center region of the housing of the one or more sides to be exposed, so as to save an insulating film material.

Generally, the insulating film material is made into two forms: a single insulating film (an insulating film sheet) and an insulating film tape in a shape of long strip. An adhesive side of prepared glue on a back side of the insulating film may be adhered on an equal-sized release film, a plurality of insulating film sheets may be stacked together in a stack for supply, and the insulating film tape and a release film tape roll may be rolled on a reel and supplied as a double-layer film tape roll. The insulating film sheet may be used by removing the release film before a coating process, and the insulating tape needs to be peeled off from a release film tape before the coating process, and may be cut into insulation tape sections during the coating process. In the present disclosure, a location that does not need to be distinguished between the insulating film sheet and the insulating film tape may be referred to as the insulating film collectively. The insulating film (sheet) may be made of a polyethylene terephthalate (also known as PET). A thickness of the insulating film may be generally within a range of 0.08-0.15 mm, and a thickness of the insulating film sheet may be generally within a range of 0.15-0.5 mm, which has an excellent insulating property, a high-temperature resistance, a flame retardancy, a heat dissipation, and a rigidity of stretching. An adhesive may be a polymer binder (one or more of polyvinylidene fluoride-hexafluoropropylene copolymer, polyvinylidene fluoride, polymethyl methacrylate, polyethylene oxide, polyacrylonitrile, polystyrene, polyvinyl acetate, and polyvinylpyrrolidone) with a thickness in a range of 0.01-0.05 mm. The adhesive may accelerate solidification when exposed to ultraviolet (UV) light, and has the excellent insulation, the high temperature resistance, the flame retardancy, the heat dissipation and a viscosity. A material of the release film may be polyethylene (also referred to as PE), and a thickness of the release film may generally be within a range of 0.05-0.1 mm.

A manner of coating the six housing sides of the battery with the insulating film tape may include paving some sides to make the sides become the paved sides, and the other sides may be folded and adhered sides made by folding and adhering the insulating film extending out of the paved sides.

Battery Coating Requirements:

1. Coating six housing sides of the battery according to requirements. The top side of the battery may usually be a bare side, and the left side, the right side, the front side, the back side, and the bottom side of the battery may generally be full-coated sides, or the left side, the right side, and the front side, and a portion of the bottom side of the battery may be coated, and another portions may be half-coated.
2. Coating accuracy is ±1 mm.

3. No exposure (except for exposure in purpose), tacklessness, bubbles, creases, horns, wrappings, scratches, and dirt.
4. Insulation requirements for the coating may be that a creepage distance between any point on the coating side (except for the top side) and the housing side of the battery must satisfy ≥4 mm, and 4 mm may be referred to as a minimum safety creepage distance. To this end, there may be a fitting region where films are engaged with each other, and a shortcut (such as a straight-line distance or a sum of the shortest straight-line distances) from any point on a fringe of the exposed edge of the insulating film on the fully coated side (including an original edge of the insulating film, a cut tape edge, an incision edge, and a cutting edge) to the fitting region where any portion of the fully coated side of the coated housing side needs to pass through may be referred to as the creepage distance from the edge of the film to the housing side, which must satisfy ≥4 mm. At the same time, any point on the fully coated side reaching any housing side of a side that needs to be exposed or semi-coated needs to pass through a shortcut (a straight-line distance or a sum of the shortest straight-line distances) determined from a fitting region between the film of the fully coated side and the side needs to be exposed or semi-coated. The shortcut may be referred to as a creepage distance from the fully coated side to a housing side of another side that needs to be exposed or semi-coated, which must satisfy ≥4 mm.
5. There may be no significant increase in a length dimension and a width dimension to avoid an influence on forming the battery module in the future.

According to the manner and a sequence of the coating on the six housing sides of the battery, a coating film may be classified as a U-shaped coating film, and a hollow-square-shaped coating film, so as to meet the needs of various battery types, and to meet a matching need between a width of the film tape and a battery size.

Figure 2:
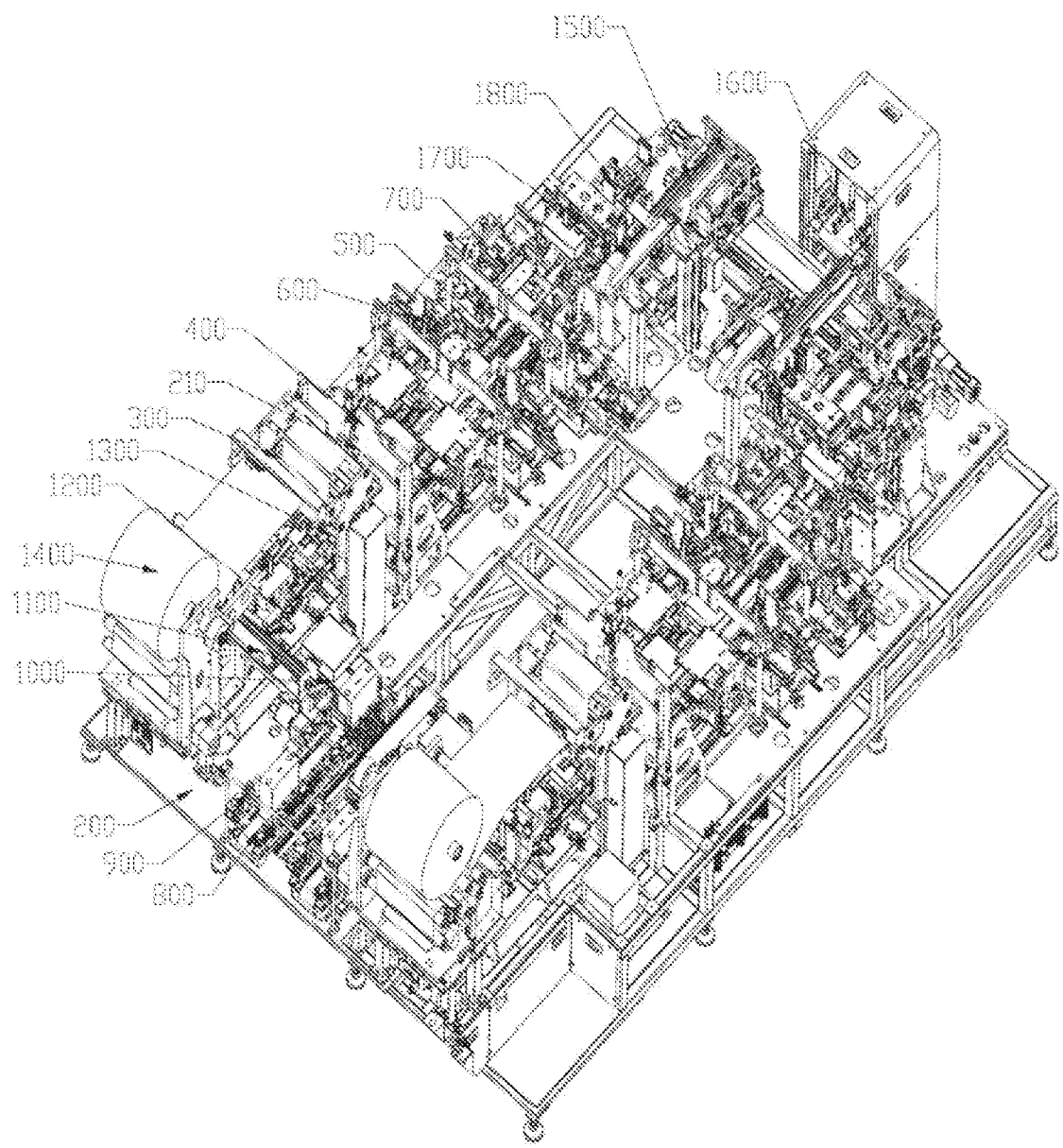
FIG. 2 is a schematic diagram illustrating a structure of a square housing battery coating device according to some embodiments of the present disclosure.

FIG. 2 is a schematic diagram illustrating a structure of a square housing battery coating device according to some embodiments of the present disclosure.

In some embodiments, as shown in FIG. 2, a square housing battery coating device compatible with a plurality of coating manners is provided. The device includes a machine station 200, a feeding line 800, a code scanning device 900, a charging turnover device 1000, a charging and handling device 1100, a push device 1200, a feeding device 1300, a film releasing device 1400, a film sending device 300, a film adhering device 400, a transferring and positioning device 500, an edge cutting device 600, a folding and adhering device 700, a blanking turnover device 1800, a blanking and handling device 1700, a discharging transfer device 1500, and a discharging line 1600, all of which are fixed on the machine station 200 according to a sequence of a coating process. The square housing battery coating device may be configured to perform a battery coating in a U-shaped coating manner or a hollow-square-shaped coating manner, so as to be compatible with the plurality of coating manners.

An exemplary coating process may be as follows: the feeding line 800 may be configured to receive a battery 100, and the code scanning device 900 may be configured to scan information of the battery 100, which is disposed on the feeding line 800. The charging turnover device 1000 and the charging and handling device 1100 may be configured to cooperate with each other to send the battery 100 on the feeding line into the pushing device 1200 according to a preset direction and feed to an adhering film by the feeding device 1300. The film releasing device 1400 may be used to release an insulating film to the film sending device 300, and the film sending device 300 may pull the insulating film to the adhering device 400 for film adhering. The semi-finished battery 100 may be transferred by the transferring and positioning device 500. The edge cutting device 600 may perform an edge cutting operation, and the folding and adhering device 700 may perform the folding and adhering operation on the battery 100. The edge cutting device 600 and the folding and adhering device 700 may be close to the transferring and positioning device 500. After the folding and adhering operation is finished, the coated battery 100 may be turned over by the blanking turnover device 1800, transported to the discharging transfer device 1500 through the blanking and handling device 1700, and transferred through the discharging transfer device 1500 to the discharging line 1600 for output. If the U-shaped coating manner is adopted to perform the coating operation on the battery 100, the left side 12 of the battery 100 may face upward, and a bottom side (not marked) may enter the pushing device 1200 horizontally facing a conveying direction of the battery 100. If the hollow-square-shaped coating manner is adopted to perform the coating operation on the battery 100, the left side 12 of the battery 100 may face upward, and a front side (not marked) may enter the pushing device 1200 horizontally facing the conveying direction of the battery 100.

In some embodiments, as shown in FIG. 2, the machine station 200 may be disposed with a film adhering station 210. The push device 1200 may be fixed on the machine station 200. The battery 100 may be input to the film adhering station 210 with the left side facing upward. The feeding device 1300 may be disposed between the pushing device 1200 and the film adhering device 400, which is used to stabilize an input direction and a conveying speed of the battery 100. The film releasing device 1400 and the film sending device 300 may be disposed above the pushing device 1200.

The film sending device 300, which is disposed between the film releasing device 1400 and the film adhering device 400, may be configured to send the insulating film to the film adhering device 400. The film sending device 300 may include a film pulling mechanism 340 configured to pull an insulating film tape to the film adhering station 210 and a film cutting mechanism 350 configured to cut the insulating film tape on the film pulling mechanism 340 to obtain an insulating film tape section.

A film adhering device 400 may be configured to perform film adhering on the battery 100 and form the coating semi-finished battery 100. The film adhering device 400 may be fixed to the film adhering station 210, and may be located between the film sending device 300 and the transferring and positioning device 500. In some embodiments, the film adhering device 400 may be used to send the battery 100 with the left side of the battery facing upward to the feeding device 1300, and with a support of the film sending device 1400 inputting the insulating film tape sections, form a U-shaped coating semi-finished battery by paving the insulating film on the bottom side (not marked), the left side 12, and the right side (not marked) of the battery input with the bottom side (not marked) facing forward using the U-shaped coating manner, or form a hollow-square-shaped coating semi-finished battery 100 by paving the insulating film on a front side (not marked), the left side 12, and the right side (not marked), and folding and adhering the insulating film to a back side of the battery 100 input with the front side facing forward using the hollow-square-shaped coating manner.

The film adhering device 400 may further include a first folding and adhering mechanism 470 provided with a first folding and adhering station 471. The first folding and adhering mechanism 470 and the first folding and adhering station 471 may be configured to fold and adhere the insulating film paved on the left side and the right side of a hollow-square-shaped coating battery 100 to the back side 13.

The transferring and positioning device 500, which is disposed between the film adhering device 400 and the blanking turnover device 1800, may be configured to transfer the battery 100 to a next station. In some embodiments, the transferring and positioning device 500 may be provided with an edge cutting and second folding and adhering station 521 and a third folding and adhering station 522, and the transferring and positioning device 500 may be configured to perform a transference between the edge cutting and the second folding and adhering station 521 and the third folding and adhering station 522 in the coating process, and clamp and locate the U-shaped coating semi-finished battery 100 or the hollow-square-shaped coating semi-finished battery 100 at the edge cutting and second folding and adhering station 521 and the third folding and adhering station 522.

An edge cutting device 600, which is disposed at the edge cutting and second folding and adhering station 521, may be configured to cut the insulating film extending out of a coated semi-finished battery 100. In some embodiments, the edge cutting device 600 may be configured to cut, in a preset position and with an assistance of the transferring and positioning device 500, the insulating film extending outside the front side (not marked), the back side 13, or the bottom side (not marked) of the U-shaped semi-finished battery 100, or cut, in the preset position, with the assistance of the transferring and positioning device 500, the insulating film extending outside the bottom side (not marked) of the hollow-square-shaped semi-finished battery 100.

A folding and adhering device 700, which is disposed at the third folding and adhering station 522 behind the edge cutting device 600, may be configured to fold and adhere the insulating film extending out of the coated semi-finished battery 100. In some embodiments, the folding and adhering device 700 may be configured to fold and adhere the insulating film extending outside the front side (not marked), the back side 13, and the bottom side (not marked) of the U-shaped coating semi-finished battery to the front side (not marked) and the back side 13, or fold and adhere the insulating film extending outside the bottom side (not marked) of the hollow-square-shaped coating semi-finished battery to the bottom side (not marked).

Figure 3:
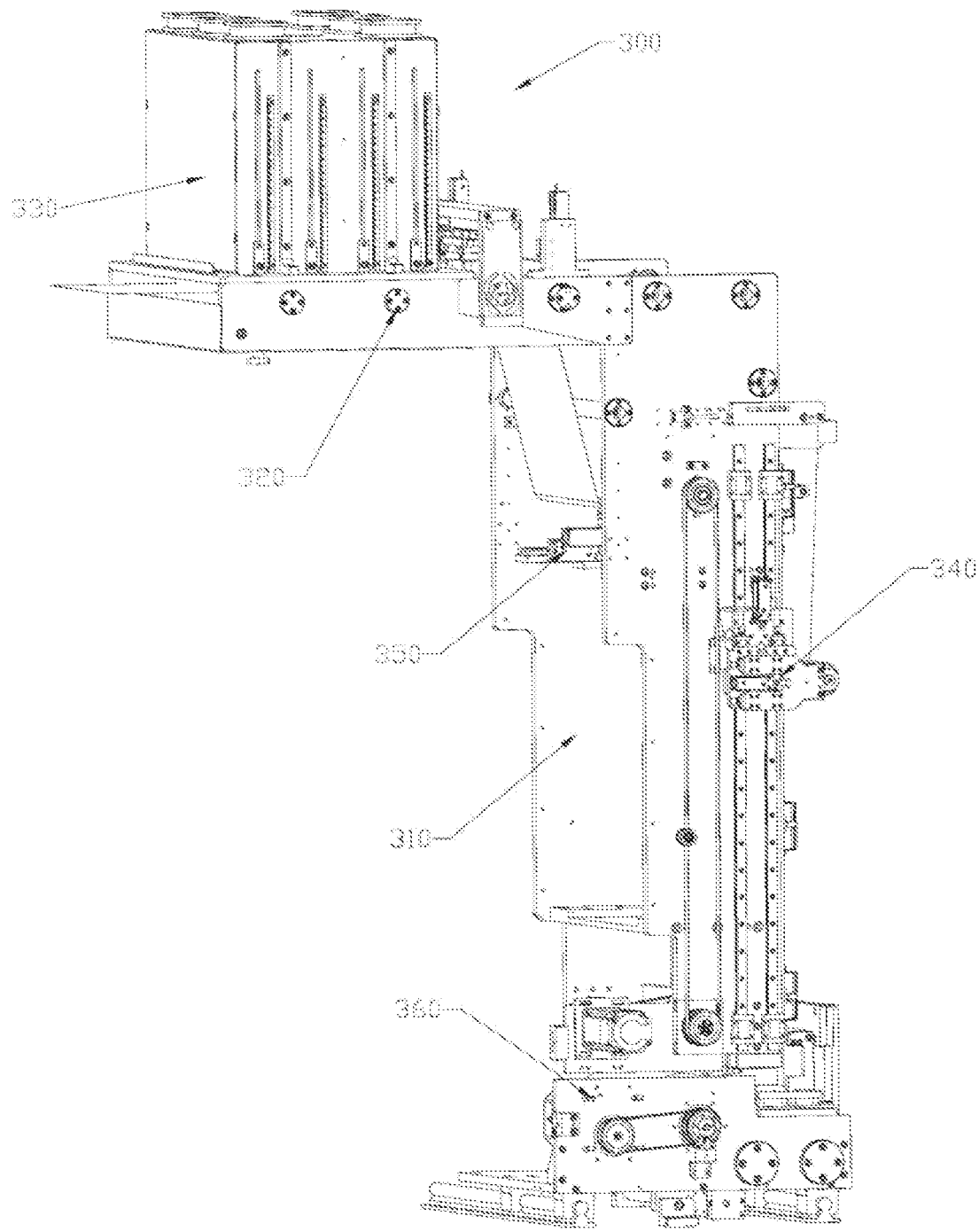
FIG. 3 is a schematic diagram illustrating a film sending device according to some embodiments of the present disclosure.

FIG. 3 is a schematic diagram illustrating a film sending device according to some embodiments of the present disclosure.

In some embodiments, as shown in FIG. 3, the film sending device 300 may further include a film sending bracket 310, a film holding mechanism 320, a photocuring mechanism 330, and a waste film recycling mechanism 360. The film feeding bracket 310 may be fixed to the machine station 200 for laying the insulating film tape. The film holding mechanism 320 may be fixed to the film sending bracket 310 and may be disposed with a film sending channel 326 configured to locate and input the insulating film tape. The photocuring mechanism 330 may be fixed to a top of the film feeding bracket 310 and may be above the film holding mechanism 320. The photocuring mechanism 330 may be configured to carry out a photocuring process on a back-adhesive of the insulating film tape on the film holding mechanism 320. The film pulling mechanism 340 may be fixed to the film sending bracket 310. The film cutting mechanism 350 may be fixed inside the film sending bracket 310. The waste film recycling mechanism 360 may be fixed under the film sending bracket 310 for a recycling of a waste insulating film.

Figure 4:
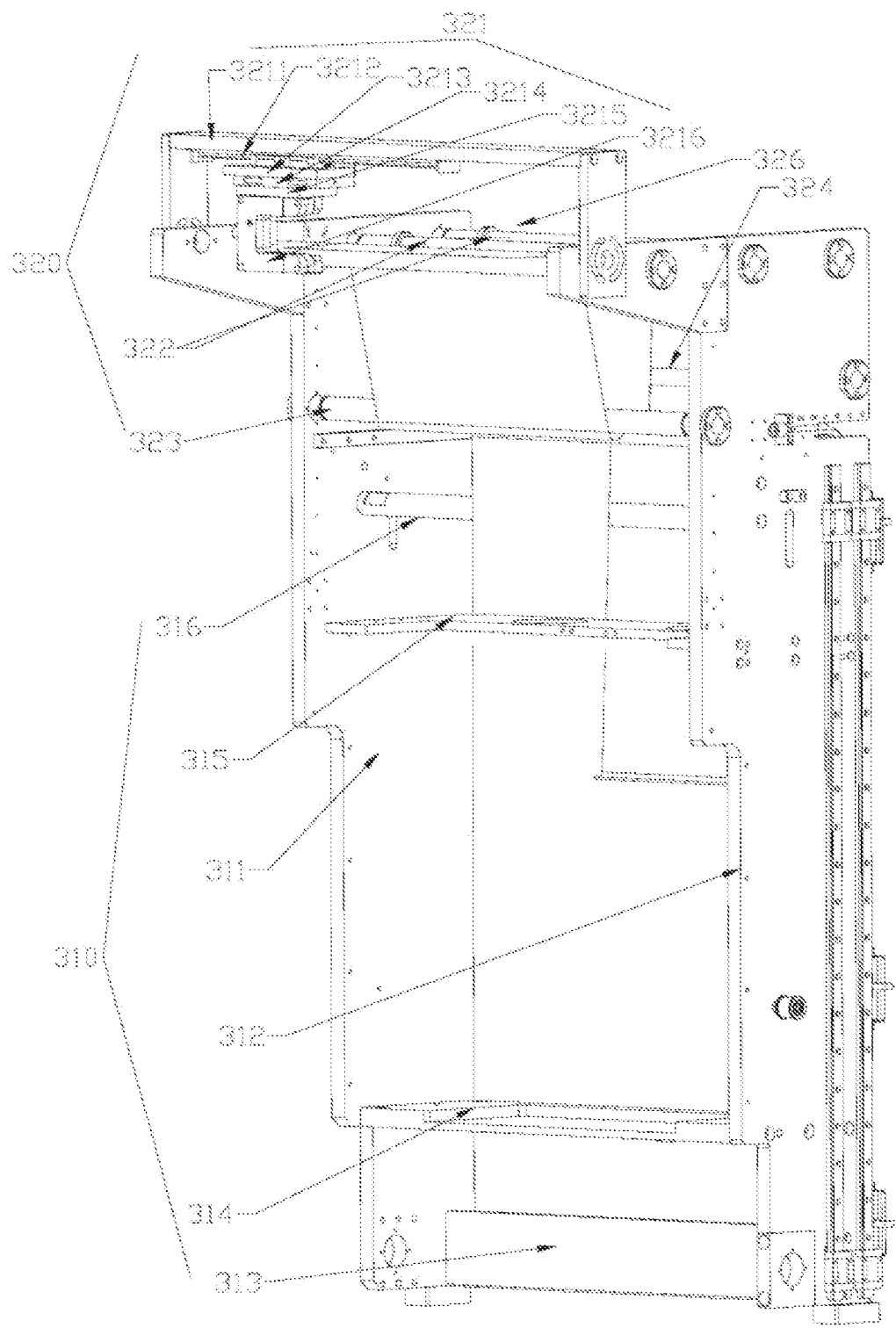
FIG. 4 is a schematic diagram illustrating a structure of a film sending bracket and a structure of a film holding mechanism according to some embodiments of the present disclosure.

FIG. 4 is a schematic diagram illustrating a structure of a film sending bracket and a structure of a film holding mechanism according to some embodiments of the present disclosure.

In some embodiments, as shown in FIG. 4, the film sending bracket 310 may include a left standing plate 311, a right standing plate 312, a lower standing plate 313, a lower flat plate 314, a middle flat plate 315, and an upper pulling lever 316. The left standing plate 311 and the right standing plate 312 may be disposed symmetrically, two ends of the lower standing plate 313, two ends of the lower flat plate 314, two ends of the middle flat plate 315, and two ends of the upper pulling lever 316 may be respectively fixed on the left standing plate 311 and the right standing plate 312. The film cutting mechanism 350 may be disposed between the upper pulling lever 316 and the middle flat plate 315 and fixed on the middle flat plate 315. The waste film recycling mechanism 360 may be dispose under the flat plate 314, and a waste insulating film tape may be sent into the waste film recycling mechanism 360 through a position between the lower flat plate 314 and the lower standing plate 313. The film sending bracket 310 may be configured to serve as a support frame, and the left standing plate 311, the right standing plate 312, and the upper pulling lever 316 of the film sending bracket 310 may play a role in shouldering the film holding mechanism 320 and the film pulling mechanism 340. The left standing plate 311, the right standing plate 312, and the upper pulling lever 316 may play a role in shouldering the film holding mechanism 320 and the film pulling mechanism 340. The middle flat plate 315 and the lower flat plate 314 may play a role in distinguishing the film cutting mechanism 350 and the film adhering station 210. The lower flat plate 314 may be used to support the left flat plate 311 and the right flat plate 312, and may be further used to cooperate with the waste film recycling mechanism 360 to provide a channel for the waste insulating film tape recycling.

In some embodiments, the film holding mechanism 320 may include an edge-fixing module 321, a plurality of first film holding rollers 322, at least one film storage roller 323, at least one second film holding roller 324, and at least one third film holding roller 325. The edge-fixing module 321 may include an edge-fixing film sensor bracket 3211, an edge-fixing film sensor slide group 3212, an edge-fixing film sensor slide plate 3213, an edge-fixing film sensor driver 3214, an edge-fixing film sensor mounting bracket 3215, and an edge-fixing film sensor 3216. The plurality of first film holding rollers 322 may be located at the top and arranged in a horizontal row, the second film holding roller 324 may be located lower at the front, and the third film holding roller 325 may be located at the front of the second film holding roller 324 and at a lower level compared with the second film holding roller 324. The film storage roller 323 may be located under the plurality of first film holding rollers 322. The plurality of first film holding rollers 322, the second film holding roller 324, the third film holding roller 325, and the film storage roller 323 may be fixed between the left standing plate 311 and the right standing plate 312 of the film sending bracket 310. An upper part of the plurality of first film holding rollers 322, a lower part of the film storage roller 323, a front part of the second film holding roller 324, and an upper part of the third film holding roller 325 may form the film sending channel 326 used for the insulating film tape to pass through. The insulating film tape may pass through an upper part of a first film holding roller 322 in a first order, the lower part of the film storage roller 323, an upper part of another first film holding rollers 322, a lower part of the second frame roller 324, and the upper part of the third frame roller 325 in sequence. The edge-fixing film sensor bracket 3211 may be fixed above the left standing plate 311 and the right standing plate 312, and a slide rail of the edge-fixing film sensor slide group 3212 may be fixed under the edge-fixing film sensor bracket 3211. The edge-fixing film sensor slide plate 3213 may be fixed under the edge-fixing film sensor slide group 3212, and the edge-fixing film sensor driver 3214 may be fixed under the edge-fixing film sensor slide plate 3213. The edge-fixing film sensor mounting bracket 3215 may be fixed to a free end of the edge-fixing film sensor driver 3214, and the edge-fixing film sensor 3216 may be fixed to the edge-fixing film sensor mounting bracket 3215. The edge-fixing film sensor 3216 may have an opening facing toward the film sending channel 326 above the plurality of first film holding rollers 322 and crossing the film sending channel 326 up and down. In some embodiments, the edge-fixing film sensor driver 3214 may be any driver capable of achieving a linear movement, such as a linear module, an electric actuator, a screw assembly, a cylinder, etc. The edge-fixing film sensor 3216 may be moved driven by the edge-fixing film sensor driver 3214, so as to detect positions of two side edges of insulating films with different sizes. The edge-fixing film sensor 3216 may include a monolithic center-opening ultrasonic transducer used to detect a position of two side edges of the insulating film to ensure that the insulating film tape is able to be moved forward on a preset edge position to meet a requirement of a film adhering edge position. The plurality of first film holding rollers 322 may be arranged in a row in the horizontal direction for horizontally inputting the insulating film, and the photocuring mechanism 330 may also better perform a pre-curing on the insulating film tape in the horizontal direction. The film storage roller 323 may be located under the plurality of first film holding rollers 322, so that the insulating film tape may pass out from the lower part of the film storage roller 323 and enter the plurality of first film holding rollers 322, which stores the insulating film tape. The third film holding roller 325 may be fixed to the left standing plate 311 and the right standing plate 312, and extend out of the left standing plate 311 and the right standing plate 312, and an extension position may be adjusted, so as to ensure that the insulating film tape pulled by the film pulling mechanism 340 is inclined and adjustable on the film adhering station 210 when contacting with the battery 100.

Figure 5:
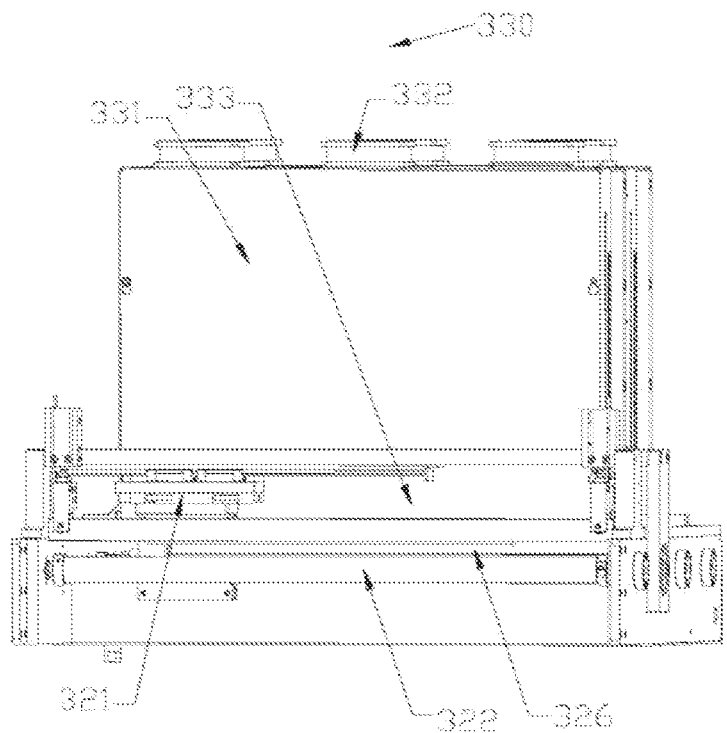
FIG. 5 is a schematic diagram illustrating a structure of a photocuring mechanism according to some embodiments of the present disclosure.

FIG. 5 is a schematic diagram illustrating a structure of a photocuring mechanism according to some embodiments of the present disclosure.

In some embodiments, referring to FIG. 5, the photocuring mechanism 330 may include a light box 331, a fan 332, and a light outlet 333 on a surface of the light box 331 facing downwardly. The light outlet 333 may face toward the film sending channel 326 located above the plurality of first film holding rollers 322. The light box 331 may be provided with an UV light illuminating lamp, and a back-adhesive of the insulating film tape may be rapidly cured after irradiation with the UV light, so that the insulating film on a side of the battery 100 is rapidly cured after adhering the film, and the insulating film tape is firmly adhered to the battery side, and an overlap of the insulating film tape sections is not open after being adhered. The fan 332 may be configured to dissipate a heat of the light box 331 to prevent the light box 331 from overheating.

In some embodiments, a sampling test mechanism may be provided on the blanking turnover device 1800. The sampling test mechanism may be configured to perform a sampling test on each of the various sides of the coated battery 100. Exemplarily, the sampling test mechanism may be configured to randomly select one of the coated batteries 100 for a next work shift to perform the test operation at the start of each work shift. The sampling test mechanism may also include an infrared range sensing lattice and a processor. The infrared range sensing lattice refers to a point array structure composed of a plurality of infrared range sensing units. An infrared range sensing unit may be a range sensor based on an infrared technology, which transmits infrared light signals and receives reflected light signals to measure a distance between a target object and the range sensor. In some embodiments, the infrared range sensing lattice may be distributed and deployed near the film sending channel 326, and may be configured to emit infrared rays to each side of the coated battery 100 and receive returned infrared rays. The processor may collect, analyze, and process information and/or data, generate a control instruction based on the information and/or data, and issue the control instruction to an execution mechanism (for example, a driver, a fan, etc.) to enable the execution mechanism to perform a corresponding action or function. The processor may be communicatively connected with the infrared range sensing lattice and the photocuring mechanism 330.

In some embodiments, the processor may be configured to determine, based on infrared sensing data obtained by the infrared range sensing lattice, a surface morphology sampling feature of the coated battery 100, determine, based on the surface morphology sampling feature of the coated battery 100, whether an illuminating parameter of a Ultraviolet (UV) light illuminating lamp needs to be adjusted, and in response to a determination that the illuminating parameter of the UV light illuminating lamp needs to be adjusted, determine, based on the surface morphology sampling feature of the coated battery 100, an adjustment volume of the illuminating parameter when the UV light illuminating lamp irradiates the current coated battery 100.

The surface morphology sampling feature refers to a feature configured to describe a surface morphology of the coated battery 100. In some embodiments, the surface morphology sampling feature may be composed of a plurality of distances, and each distance may be a distance between a sensing unit and the coated battery 100 measured by the sensing unit in the infrared range sensing lattice. The surface morphology sampling feature may be determined through the following operation. The operation may include obtaining a distance by converting the infrared sensing data, and a vector may be formed by a plurality of distances. The vector may be the surface morphology sampling feature. It should be understood that since a surface of the coated battery 100 is not absolutely flat, the surface may have undulations, wrinkles, etc., that are invisible to the naked eyes. Due to a resolution reason, a camera device such as an optical camera may cause a greater error when capturing undulations, wrinkles, etc., on the surface. The infrared range may be a measurement manner with a high-precision. Therefore, the surface feature of a three dimensional (3D) object (i.e., the coated battery 100) may be accurately described through distances to the 3D object measured by the infrared rays emitted from a plurality of fixed positions far away with fixed angles.

An illuminating parameter refers to a parameter used by the UV light illuminating lamp for illumination. In some embodiments, the illuminating parameter may include an illuminating time and an illuminating intensity. In some embodiments, whether to adjust the illuminating parameter of the UV light illuminating lamp may be determined by calculating a similarity between a current surface morphology sampling feature and a standard surface morphology sampling feature. If the similarity is less than a preset threshold, it may indicate a need for an adjustment. The standard surface morphology sampling feature may be a surface morphology sampling feature of the coated battery 100 that meets a qualified standard, which is obtained by conducting a measurement experiment on the coated battery 100 that meets the qualified standard. The similarity may be determined through a similarity algorithm such as a Euclidean distance, a cosine similarity, etc. The preset threshold may be preset based on experience.

In some embodiments, the adjustment volume of the illuminating parameter of the UV light illuminating lamp may be determined through the following operation. The processor may generate a plurality of candidate illuminating parameters, predict an estimated adhesion intensity corresponding to each candidate illuminating parameter through an adhesion intensity prediction model, determine, based on the estimated adhesion intensities, a target illuminating parameter of the UV light illuminating lamp, and obtain the adjustment volume based on the target illuminating parameter and a current illuminating parameter. The adhesion intensity prediction model may be a machine learning model.

A candidate illuminating parameter refers to an illuminating parameter to be selected. In some embodiments, the processor may generate a plurality of candidate illuminating parameters, and each candidate illuminating parameter may include a group of illuminating times and illuminating intensities. In some embodiments, the processor may generate several candidate illuminating parameters based on various manners. For example, the processor may obtain several candidate illuminating parameters based on historical data or through a random generation.

An adhesion intensity refers to an adhering tightness between the insulating film and the battery 100. It should be understood that the higher the adhesion intensity is, the better an effect of film adhering of the battery 100 may be. In some embodiments, the adhesion intensity prediction model may be a machine learning model used to predict the estimated adhesion intensity corresponding to the each candidate illuminating parameter. In some embodiments, the adhesion intensity prediction model may be a deep neural network (DNN), etc., or any one or a combination of other customized model structures.

In some embodiments, an input of the adhesion intensity prediction model may include the surface morphology sampling feature of the coated battery 100 and the candidate illuminating parameters, and an output may include the estimated adhesion intensity.

In some embodiments, the adhesion intensity prediction model may be trained in various of ways based on a great number of first training samples with first labels. For example, the adhesion intensity prediction model may be trained based on a gradient descent manner and an adaptive learning rate manner.

In some embodiments, a first training sample may be a surface morphology sampling feature of the coated battery 100 and a sample candidate illuminating parameter. The first training sample may be obtained based on the historical data.

A first label corresponding to the first training sample may be an actual adhesion intensity after illumination of the first training sample. The first label may be obtained in various ways. For example, a standardized adhesion intensity test may be performed on the first training sample to obtain the actual adhesion intensity as the first label. The first label may also be manually labeled.

In some embodiments, the target illuminating parameter of the UV light illuminating lamp may be determined in the following operation. The processor may select a candidate illuminating parameter with the highest estimated adhesion intensity from the candidate illuminating parameters whose illuminating time and illuminating intensity are within a certain preset range as the target illuminating parameter. It should be noted that when the candidate illuminating parameters are randomly generated, extreme data may occur, such as an illuminating parameter with very long illuminating time, very high illuminating intensity, etc. By limiting the illuminating time and the illuminating intensity to a certain preset range, an illuminating efficiency may be improved, and a power of the UV light illuminating lamp may reach a preset degree.

In some embodiments, the adjustment volume may be a difference between the target illuminating parameter and the current illuminating parameter. For example, the difference between the target illuminating time and the current illuminating time may be the adjustment volume of the illuminating time, and a positive value indicates that the current illuminating time needs to be extended.

In some embodiments of the present disclosure, since the insulating film itself may be slightly different from each other, the film adhering process may also produce surface textures, micro-wrinkles, etc., that are invisible to the naked eyes. These factors mentioned above may affect a curing effect of the insulating film illuminated by the UV light illuminating lamp. Therefore, if the UV illuminating is performed with fixed illuminating parameters, the curing effect of some coated batteries may be worsened. However, the adhesion intensity prediction model may be used to identify such subtle differences, so as to adaptively adjust the illuminating parameters according to these subtle differences to improve a film adhering quality and make a yield rate higher.

In some embodiments, the processor may be further configured to determine a heat dissipation parameter of a fan based on a current temperature of the UV light illuminating lamp, generate a control instruction based on the illuminating parameter and the heat dissipation parameter, and send the illuminating parameter and the heat dissipation parameter to the UV light illuminating lamp and the fan. A heat dissipation parameter refers to a parameter related to a heat dissipation performance of the fan. The dissipation parameter may include an operating power, a wind speed, etc.

In some embodiments, a current temperature of the UV light illuminating lamp refers to a temperature inside the light box 331, which is estimated through a preset algorithm based on the illuminating parameter. The preset algorithm may be a corresponding relationship between the illuminating time, the illuminating intensity, and heat generated by the light box 331. The current temperature of the UV light illuminating lamp may also be obtained through readings of a temperature sensor disposed near the light box 331.

In some embodiments, the current temperature of the UV light illuminating lamp may be positively related to a dissipation power of the fan.

In some embodiments, the determining a heat dissipation parameter of the fan based on a current temperature of the UV light illuminating lamp may include predicting, based on the current temperature of the UV light illuminating lamp and illuminating parameters of the UV light illuminating lamp in a plurality of historical moments, a temperature of the UV light illuminating lamp in a future moment, and determining, based on the current temperature of the UV light illuminating lamp and the temperature of the UV light illuminating lamp in the future moment, the heat dissipation parameter of the fan. The illuminating parameters of the UV light illuminating lamp in the plurality of historical moments may be obtained by reading historical illuminating parameter data of the UV light illuminating lamp through the processor.

In some embodiments, the processor may predict the temperature of the UV light illuminating lamp in the future moment through a time series model.

In some embodiments, the time series model may be a machine learning model for predicting the temperature of the UV light illuminating lamp in the future moment, such as the DNN, etc., or any one or a combination of other customized model structures.

In some embodiments, an input of the time series model may include the current temperature of the UV light illuminating lamp, the illuminating parameters of the UV light illuminating lamp in the plurality of historical moments, and an output may include a temperature of the UV light illuminating lamp in a future moment.

In some embodiments, the time series model may be trained in various ways based on a great number of second training samples with second labels. For example, the time series model may be trained based on the gradient descent manner and the adaptive learning rate manner.

In some embodiments, a second training sample may include a temperature of a sample UV light illuminating lamp at a first historical moment and an illumination parameter of the first historical moment, and a second label may be an actual temperature of the sample UV light illuminating lamp at a second historical moment. The first historical moment may be a moment before the second historical moment.

In some embodiments, the determining, based on the current temperature of the UV light illuminating lamp and the temperature of the UV light illuminating lamp in the future moment, the heat dissipation parameter of the fan may include that the higher the current temperature is, the higher the predicted future temperature is, the greater the heat dissipation power of the fan may be.

In some embodiments of the present disclosure, by controlling the heat dissipation power of the fan, the current temperature as well as the temperature in the future moment may be considered, so as to make decisions in advance to carry out a higher intensity heat dissipation to avoid a situation where "the current temperature is not high, but the temperature is higher in the future," which causes the heat dissipation to be unable to keep up.

Figure 6:
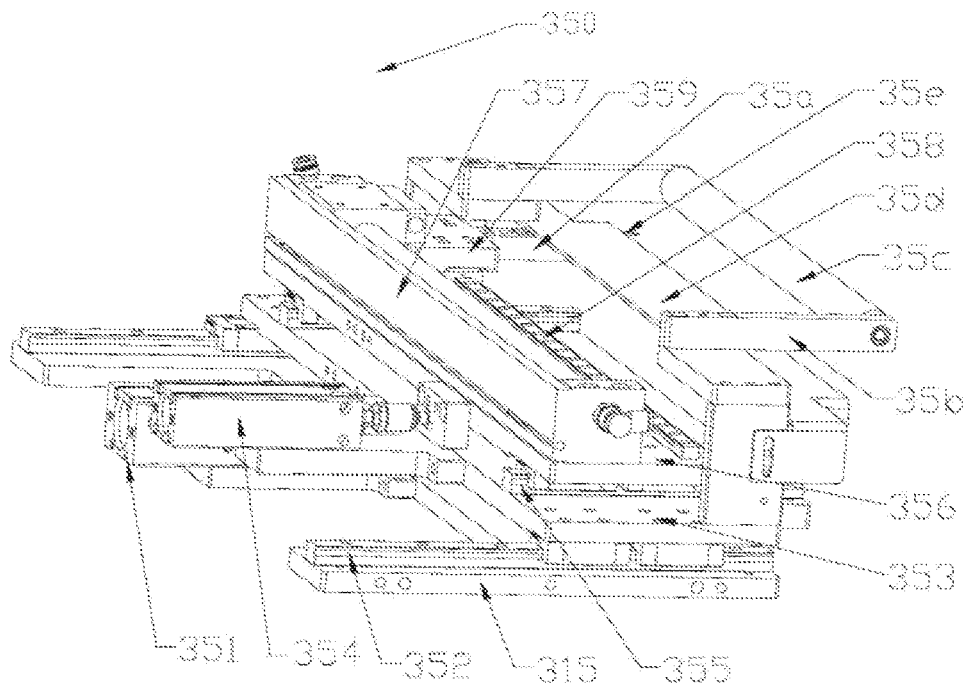
FIG. 6 is a schematic diagram illustrating a structure of a film cutting mechanism according to some embodiments of the present disclosure.
Figure 7:
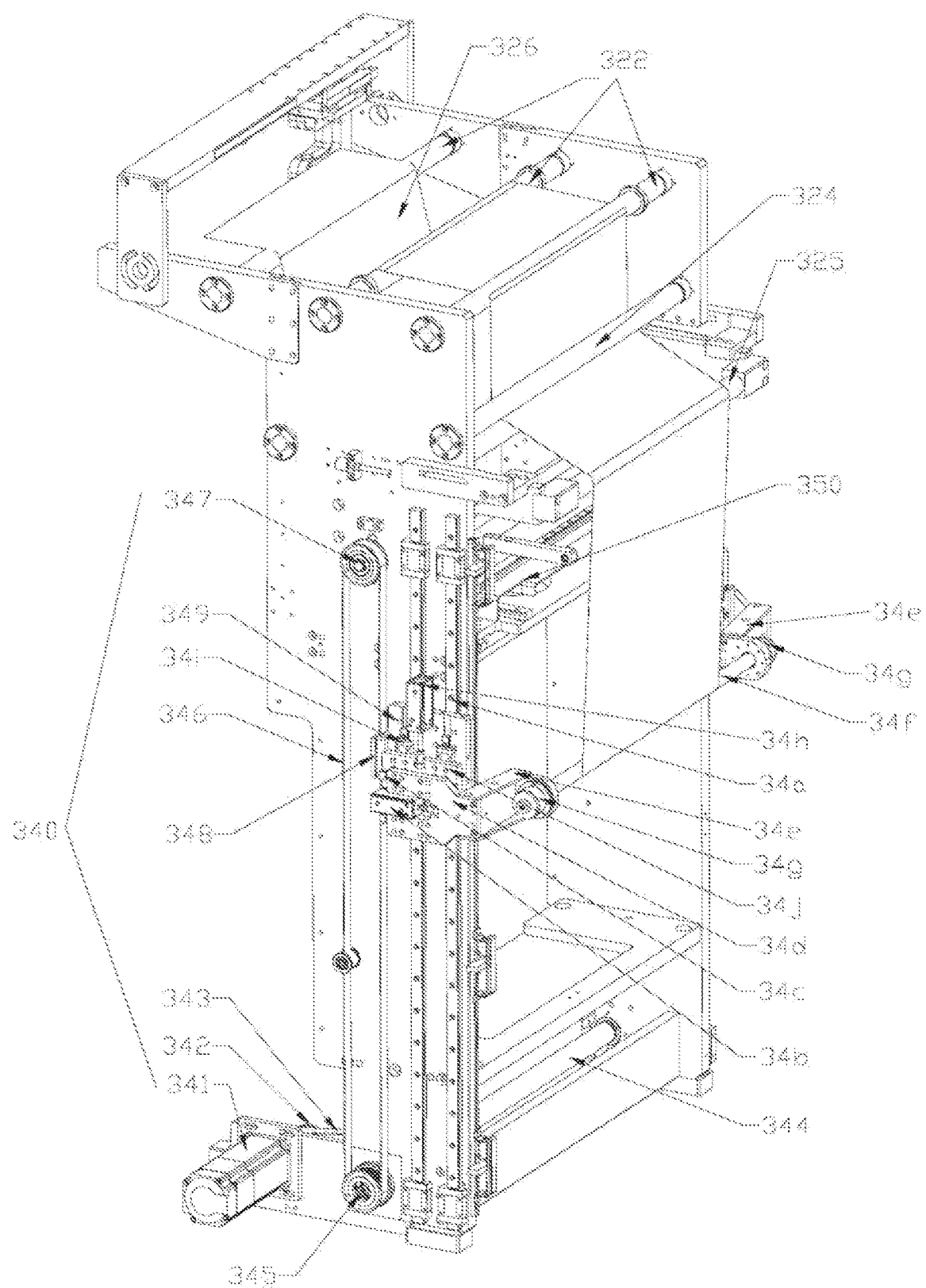
FIG. 7 is a schematic diagram illustrating a structure of a film pulling mechanism according to some embodiments of the present disclosure.

FIG. 6 is a schematic diagram illustrating a structure of a film cutting mechanism according to some embodiments of the present disclosure; and FIG. 7 is a schematic diagram illustrating a structure of a film pulling mechanism according to some embodiments of the present disclosure.

In some embodiments, as shown in FIG. 7, the film pulling mechanism 340 may include a film pulling lifting driver 341, a film pulling active wheel 342, a first film pulling transmission belt 343, a first film pulling driven wheel (not shown), a film pulling transmission shaft 344, two left and right second film pulling driven wheels 345, two left and right second film pulling transmission belts 346, two left and right third film pulling driven wheels 347, two left and right film pulling transmission clamps 348, two left and right film pulling lifting slide plates 349, two left and right film pulling lifting slide groups 34a, two left and right film pulling translating drivers 34b, two left and right film pulling translating slide groups 34c, two left and right film pulling translating slide plates 34d, two left and right film pulling lever bases 34e, two left and right film pulling levers 34f, and two left and right film pulling lever brakes 34g. The film pulling lifting driver 341 may be fixed on the left standing plate 311 or the right standing plate 312. The film pulling lifting driver 341 may be any drivers being able to realize a linear drive, such as a cylinder, an electric putter, etc. Slide rails of the two left and right film pulling lifting slide groups 34a may be fixed on the left standing plate 311 and the right standing plate 312, respectively. The film pulling active wheel 342 may be fixed on a rotating end of the film pulling lifting driver 341. The film pulling transmission shaft 344 may be arranged on the left standing plate 311 and the right standing plate 312, the first film pulling driven wheel (not shown) and the two left and right second film pulling driven wheels 345 may be fixed on the film pulling transmission shaft 344. The first film pulling transmission belt 343 may be sheathed on the outside of the film pulling active wheel 342 and the first film pulling driven wheel (not shown). The two left and right third film pulling driven wheels 347 may be fixed on an upper end of the left standing plate 311 or the right standing plate 312, and the two left and right second film pulling drive belts 346 may be respectively sheathed outside the two left and right second film pulling driven wheels 345 and the two left and right third film pulling driven wheels 347. The two left and right film pulling transmission clamps 348 may be fixed on the two left and right second film pulling drive belts 346, respectively. The two left and right film pulling lifting slide plates 349 may be fixed on the two left and right film pulling transmission clamps 348 and the two left and right slide blocks of the two film pulling lifting slide groups 34a, respectively. The two left and right film pulling translating drivers 34b and the two left and right slide rails of the two left and right film pulling translating groups 34c may be respectively fixed on the two left and right film pulling lifting slide plates 349. The two left and right film pulling translating slide plates 34d may be respectively fixed on a free end of the two left and right film pulling translating drivers 34b and the slide blocks of the two left and right film pulling translating slide plates 34d. The two left and right film pulling lever bases 34e may be directly fixed to the two left and right film pulling translating slide plates 34d, and the two left and right film pulling levers 34f and the two left and right film pulling lever brakes 34g may be respectively fixed to the two left and right film pulling lever bases 34e. The film pulling mechanism 340 may lead the insulating film tape from the film sending channel 326 in front of the third film holding roller 325 to the film pulling lever 34f, and a film head of the insulating film tape may be adhered to a periphery of the film pulling lever 34f, and the film pulling lever 34f may be driven to lead the insulating film tape on the film pulling lever 34f down to a position where the insulating film tape between the third film holding roller 325 and the film pulling lever 34f is tilted in front of the film adhering station 210 along a vertical direction by the film pulling lifting driver 341.

In some embodiments, the film pulling mechanism 340 may further include two left and right film pulling buffer drivers 34h, two left and right film pulling buffer slide groups 34i, and two left and right film pulling buffer slide plates 34j. The two left and right film pulling buffer drivers 34*h* and the slide rails of the two left and right film pulling buffer slide groups 34*i* may be fixed to the two left and right film pulling translating slide plates 34*d*, respectively. The two left and right film pulling buffer slide plates 34*j* may be fixed to two left and right free ends of the two left and right film pulling buffer drivers 34*h*, and two left and right slide blocks of the two left and right film pulling buffer slide groups 34*i*, respectively. The two left and right film pulling lever bases 34*e* may be fixed to the two left and right film pulling buffer slide plates 34*j*. The two right and left film pulling lever bases 34*e* may be indirectly fixed to the two right and left film pulling translating slide plates 34*d*, respectively. The two right and left film pulling levers 34*f* and the two right and left film pulling lever brakes 34*g* may be fixed to the two right and left film pulling lever bases 34*e*, respectively. The film pulling buffer driver 34*h* may be similar to a spring in an extending state. When a falling resistance of the film pulling lever 34*f* driven by the film pulling lifting driver 341 is greater than a preset value, the film pulling lever 34*f* may be configured to reversely drive the film pulling buffer slide plates 34*j* to move upward to reduce the falling resistance of the film pulling lever 34*f*, so as to avoid the insulating film tape from falling off the film pulling lever 34*f*.

In some embodiments, as shown in FIG. 6, the film cutting mechanism 350 may include a lifting front-rear driver 351, a film shouldering slide group 352, a film shouldering front-rear slide plate 353, a film cutting front-rear driver 354, a film cutting slide group 355, a film cutting front-rear slide plate 356, a film cutting left-right driver 357, a film cutting left-right slide group 358, a film cutting left-right slide plate 359, a film cutter bracket 35*a*, two film shouldering roller brackets 35*b*, a film shouldering roller 35*c*, a sheath plate 35*d*, and a cutter 35*e*. The lifting front-rear driver 351 and a slide rail of the film shouldering slide group 352 may be fixed to the middle flat plate 315, and the film shouldering front-rear slide plate 353 may be fixed to a free end of the lifting front-rear driver 351 and a slide block of the film shouldering slide group 352. The film cutting front-rear driver 354, the two film shouldering roller brackets 35*b*, and the slide rail of the film cutting slide group 355 may be fixed on the film shouldering front-rear slide plate 353. The film cutting front-rear slide plate 356 may be fixed on a free end of the film cutting front-rear driver 354 and the slide block of the film cutting slide group 355. The film cutting left-right driver 357 and the slide rail of the film cutting left-right slide group 358 may be fixed on the film cutting front-rear slide plate 356. The film cutting left-right slide plate 359 may be fixed on a free end of the film cutting left-right driver 357 and the slide rail of the film cutting left-right slide group 358. The film cutter bracket 35*a* may be fixed on the free end of the film cutting left-right driver 357. The cutter 35*e* may be fixed on the film cutter bracket 35*a*, a left end and a right end of the sheath plate 35*d* may be fixed on a left end and a right end of the film shouldering roller 35*c* downside, and fixed on two left and right film shouldering roller brackets 35*b* upside. The cutter 35*e* may be located under the film shouldering roller 35*c*, and a cutting direction of the cutter 35*e* may be the same with a length direction of the film shouldering roller 35*c*. The film shouldering front-rear driver 351 of the film cutting mechanism 350 may be configured to drive the film shouldering front-rear slide plate 353 to move forward. At the same time, the cutter 35*e* and the film shouldering roller 35*c* may be driven to move forward. The film shouldering roller 35*c* may be in contact with and adhered with the insulating film tape. The film cutting front-rear driver 354 may be further configured to drive the film cutting front-rear slide plate 356 to move forward with the cutter 35*e*, so that the cutter 35*e* may be located at an edge of the insulating film tape. The cutter 35*e* may then be driven to move horizontally by the film cutting left-right driver 357 so that the cutter 35*e* may cut the insulating film tape, and the film shouldering roller 35*c* may be configured to keep the insulating film tape in a tensioned state to prevent a cutting film from collapsing.

The film pulling lever 34*f* may drop with a tape head of the insulating film tape to a preset position, where the battery 100 is adhered to the back-adhesive of the insulating film tape when the battery 100 is sent on the film adhering station 210. The inclined insulating film tape may be used to avoid air bubbles or wrinkles in the adhering film. At the same time, the film pulling lever 34*f* may be driven by the film pulling translating driver 34*b* to be retreated to disengage from the insulating film tape and to be lifted by the film pulling lifting driver 341 to a position above the film cutting mechanism 350. The film pulling lever 34*f* may stop when the adhering film of the battery 100 is sent to the preset position. Then the film pulling lever 34*f* may be pushed forward by the film pulling translating driver 34*b* to the position to press against the back-adhesive of the insulating film tape above the film pulling lever 34*f*, so that the insulating film tape may be adhered. The film shouldering roller 35*c* of the film cutting mechanism 350 may be configured to extend out underneath the film pulling lever 34*f* to be adhered with the insulating film tape underneath. The cutter 35*e* may then be configured to extend out again underneath the film shouldering roller 35*c* to cut the film, and the film cutting mechanism 350 may be retreated and the film pulling lever 34*f* may continue to drive the insulating film tape to move downward to the front of the film adhering station 210, and the film pulling action may be repeated.

Figure 8:
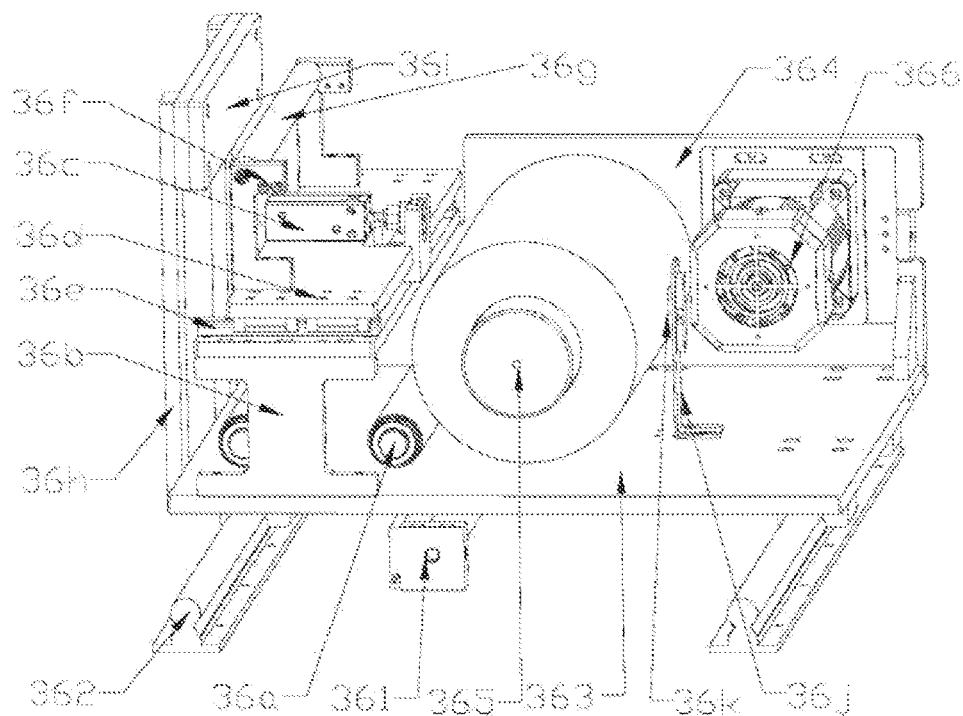
FIG. 8 is a schematic diagram illustrating one perspective of a structure of a waste film recycling mechanism according to some embodiments of the present disclosure.
Figure 9:
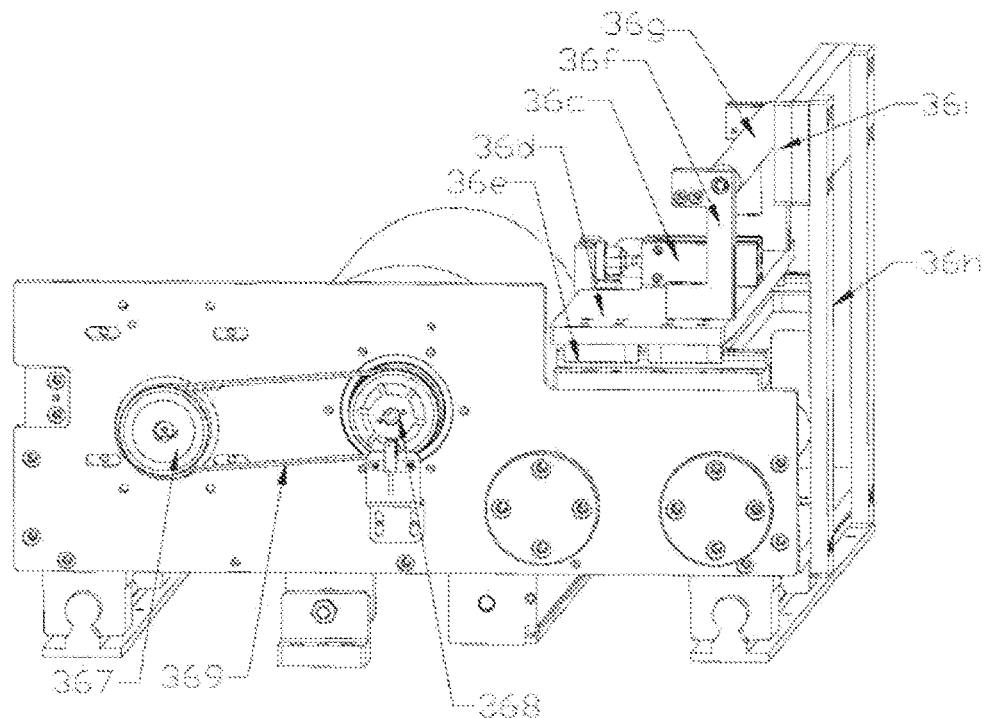
FIG. 9 is a schematic diagram illustrating another perspective of a structure of a waste film recycling mechanism according to some embodiments of the present disclosure.

FIG. 8 is a schematic diagram illustrating one perspective of a structure of a waste film recycling mechanism according to some embodiments of the present disclosure. FIG. 9 is a schematic diagram illustrating another perspective of a structure of a waste film recycling mechanism according to some embodiments of the present disclosure.

In some embodiments, as shown in FIGS. 8-9, the waste film recycling mechanism 360 may include a waste film recycling translating slide plate 363, a waste film recycling bracket 364, a waste film recycling reel 365, a waste film winding driver 366, a waste film winding active wheel 367, a waste film winding driven wheel 368, a waste film winding transmission belt 369, a waste film over-roller 36*a*, a waste film splicing bracket 36*b*, a waste film splicing driver 36*c*, a waste film splicing slide bracket 36*d*, a waste film splicing slide group 36*e*, a waste film splicing pressure roller bracket 36*f*, a waste film splicing pressure roller 36*g*, a waste film splicing press plate bracket 36*h*, a waste film splicing press plate 36*i*, waste film roll proximity switch bracket 36*j*, and a waste film roll proximity switch 36*k*. The waste film winding driver 366 may be any drivers being able to realize a rotary drive, such as a motor, etc.

The waste film recycling bracket 364, the waste film splicing bracket 36*b*, the waste film splicing press plate bracket 36*h*, and the waste film roll proximity switch bracket 36*j* may be fixed to the waste film recycling translating slide plate 363. The waste film winding driver 366 and the waste film over-roller 36*a* may be fixed on the waste film recycling bracket 364. The waste film winding active wheel 367 may be fixed on a rotating end of the waste film winding driver 366. The waste film recycling reel 365 may be rotatably set on the waste film recycling bracket 364. The waste film winding driven wheel 368 may be fixed on the waste film recycling reel 365. The waste film winding transmission belt 369 may be sheathed outside the waste film winding active wheel 367 and the waste film winding driven wheel 368. A free end of the waste film splicing driver 36c and a slide rail of the waste film splicing slide group 36e may be fixed to the waste film splicing bracket 36b. The waste film splicing slide bracket 36d may be fixed under the waste film splicing driver 36c and on a slide block of the waste film splicing slide group 36e. The waste film splicing pressure roller bracket 36f may be fixed on the waste film splicing slide bracket 36d. The waste film splicing pressure roller 36g may be fixed to the waste film splicing pressure roller bracket 36f. The waste film splicing press plate 36i may be fixed on the waste film splicing press plate bracket 36h and face toward the waste film splicing pressure roller 36g. The waste film roll proximity switch 36k may be fixed on the waste film roll proximity switch bracket 36j and face toward the waste film recycling reel 365.

A waste film recycling splicing pressure roller may be configured to move horizontally driven by the waste film splicing driver 36c. When the film pulling mechanism 340 pulls a tape head of the waste insulating film tape to a position between the waste film splicing pressure roller 36g and the waste film splicing press plate 36i, the waste film splicing driver 36c may be configured to drive the waste film splicing pressure roller 36g to move until the waste film splicing press plate 36i presses and fits the tape head of the waste insulating film tape onto an original tape tail of the waste insulating film tape on the waste film splicing pressure roller 36g. An original tape head of the waste insulating film tape on the waste film splicing pressure roller 36g may be winded on the waste film recycling reel 365. Therefore, at this time, the waste film winding driver 366 may be activated to wind the waste insulating film roll from the waste film splicing pressure roller 36g onto the waste film recycling reel 365. It should be noted that there may always be a waste insulating film connection between the waste film recycling reel 365 and the waste film splicing pressure roller 36g to ensure that a newly generated waste insulating film is able to be continuously transferred to the waste film recycling reel 365 through the waste film splicing pressure roller 36g. The waste film roll proximity switch 36k may be configured to detect that the winded waste insulating film on a waste film reel of the waste film recycling reel 365 reaches a preset thickness.

In some embodiments, the waste film recycling mechanism 360 may further comprise the waste film recycling translating driver 361 and the waste film recycling translating slide group 362. The slide rails of the waste film recycling translating driver 361 and the waste film recycling translating slide group 362 may be fixed under the film sending bracket 310. The waste film recycling translating slide plate 363 may be fixed to a free end of the waste film recycling translating driver 361 and the slide block of the waste film recycling translating slide group 362. The waste film recycling translating driver 361 and the waste film recycling translating slide group 362 may be used to move out the waste film recycling translating slide plate 363 according to information detected by the waste film roll proximity switch 36k after the waste film reel is winded to the preset thickness, and the waste film reel may be taken off and replaced with an empty waste film reel.

Figure 10:
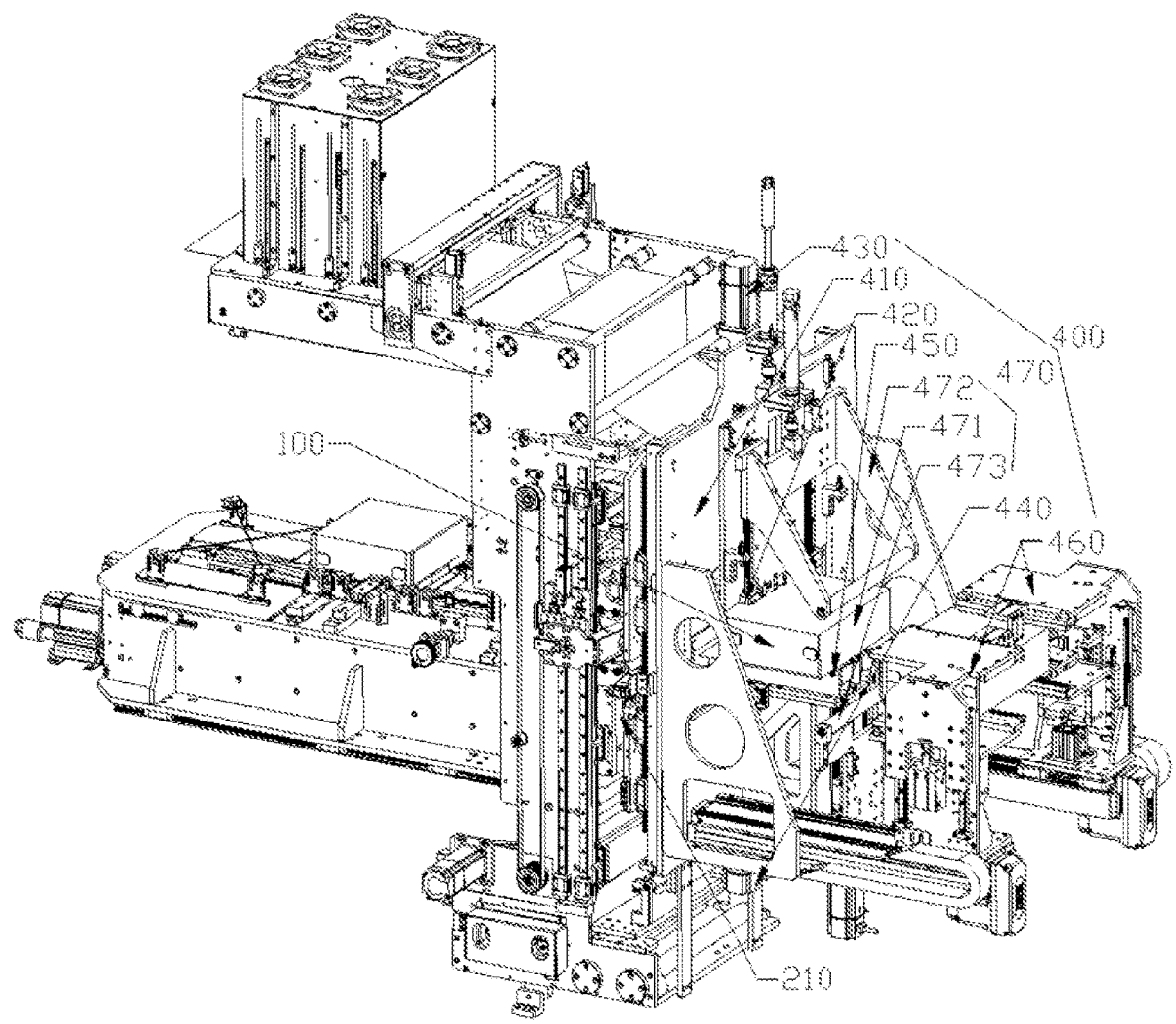
FIG. 10 is a schematic diagram illustrating a structure of a film adhering device according to some embodiments of the present disclosure.

FIG. 10 is a schematic diagram illustrating a structure of a film adhering device according to some embodiments of the present disclosure.

In some embodiments, as shown in FIG. 10, a film adhering device 400 may include a film adhering bracket 410, an upper paving mechanism 430, a lower paving mechanism 440, a film adhering and receiving mechanism 450, a folding and adhering clamping mechanism 460, and a first folding and adhering mechanism 470.

The film adhering bracket 410 may be fixed to the machine station 200, and may be provided with the paving channel 420 used to pave the insulating film to the battery 100. The upper paving mechanism 430 and the lower paving mechanism 440 may be fixed to the film adhering bracket 410 located above the paving channel 420 and configured to pave the insulating film to an upper half of the bottom side and the left side of the battery under the U-shaped coating manner, or pave the insulating film to an upper half of the front side (not shown) and the left side 12 of the battery 100 under the hollow-square-shaped coating manner. The lower paving mechanism 440 may be located under the paving channel 420 and configured to pave the insulating film to a lower half of the front side (not shown) and the right side (not shown) of the battery under the U-shaped coating manner, or pave the insulating film to the lower half of the front side (not shown) and the right side (not shown) of the battery 100 under the hollow-square-shaped coating manner. The film splicing mechanism 450 may be located at an outlet end of the paving channel 420 for receiving the battery 100 during and after a paving process is performed. The folding and adhering clamping mechanism 460 may be located at the outlet end of the film adhering and receiving mechanism 450 for clamping the battery 100 after the paving process is performed. A first folding and adhering station 471 may be formed between the film splicing mechanism 450 and the folding and adhering clamping mechanism 460, and the first folding and adhering station 471 may be merely configured to fold and adhere the insulating film on the back side of the battery 100 under the hollow-square-shaped coating manner. The first folding and adhering mechanism 470 may include a first upper folding and adhering module 472 and a first lower folding and adhering module 473. The first upper folding and adhering module 472 may be fixed to the upper paving mechanism 430, which is located above the first folding and adhering station 471, and is configured to fold and adhere a tape end of each of the plurality of insulating film tape sections extending out of the left side 12 of the hollow-square-shaped coating battery 100 to the back side 13 of the hollow-square-shaped coating battery from top to bottom. The first lower folding and adhering module 473 may be fixed on the film splicing mechanism 450 and located below the first folding and adhering station 471. The first lower folding and adhering module 490 may be configured to fold and adhere a tape head of each of the plurality of insulating film tape sections extending out of the right side 13 of the hollow-square-shaped coating battery 100 to the back side of the hollow-square-shaped coating battery 100 from bottom to top.

Figure 11:
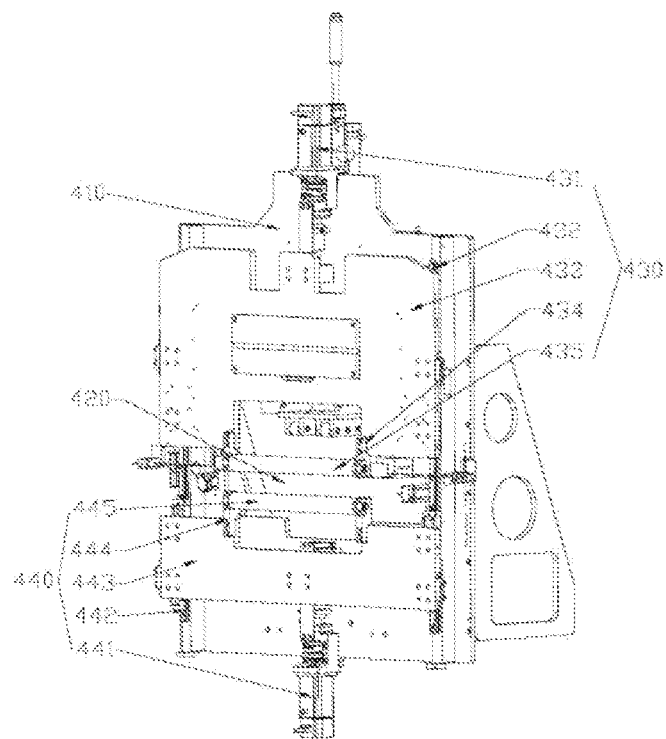
FIG. 11 is a schematic diagram illustrating a partial rear structure of a film adhering device according to some embodiments of the present disclosure.
Figure 12:
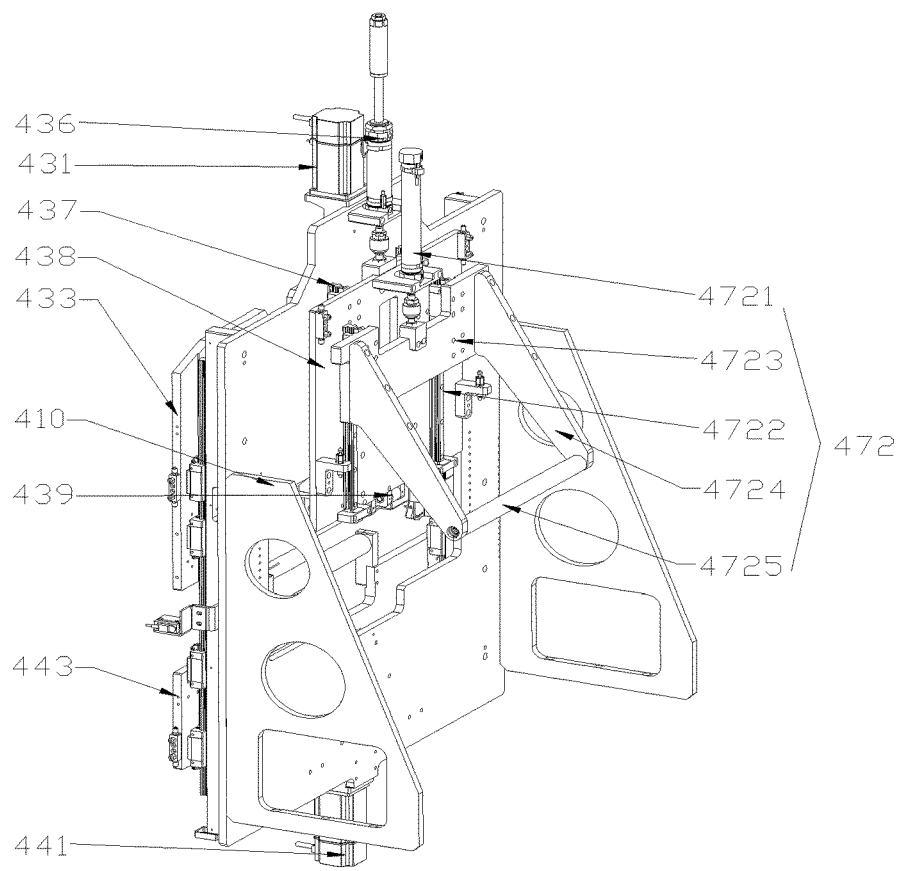
FIG. 12 is a schematic diagram illustrating a partial front structure of a film adhering device according to some embodiments of the present disclosure.

FIG. 11 is a schematic diagram illustrating a partial rear structure of a film adhering device according to some embodiments of the present disclosure. FIG. 12 is a schematic diagram illustrating a partial front structure of a film adhering device according to some embodiments of the present disclosure.

In some embodiments, as shown in FIGS. 11-12, the upper paving mechanism 430 may include an upper film adhering roller lifting drive module 431, an upper film adhering roller lifting slide group 432, an upper film adhering roller lifting slide plate 433, two upper film adhering roller brackets 434, an upper film adhering roller 435, an upper film adhering material-press lifting driver 436, an upper film adhering material-press lifting slide group 437, an upper film adhering material-press lifting slide plate 438, and an upper film adhering material-press member 439.

Slide rails of the upper film adhering roller lifting drive module 431 and the upper film adhering roller lifting slide group 432 may be fixed to an upper portion of the film adhering bracket 410 facing backward, the upper film adhering roller lifting slide plate 433 may be fixed to a free end of the upper film adhering roller lifting drive module 431 and the slide block of the upper film adhering roller lifting slide group 432. The two upper film adhering roller brackets 434 may be respectively fixed to two sides of a middle portion of the upper film adhering roller lifting slide plate 433. The upper film adhering roller 435 may be rotatably arranged between the two upper film adhering roller brackets 434.

The upper film adhering material-press lifting driver 436 and the slide rail of the upper film adhering material-press lifting slide group 437 may be fixed on the upper portion of the film adhering bracket 410 facing forward, and the upper film adhering material-press lifting slide plate 438 may be fixed on the free end of the upper film adhering material-press lifting driver 436 and the slide block of the upper film adhering material-press lifting slide group 437. The upper film adhering material-press member 439 may be fixed on a lower end of the upper film adhering material-press lifting slide plate 438. The upper film adhering roller 435 and the upper film adhering material-press member 439 may be configured to enter the paving channel 420.

The upper film adhering roller 435 may be configured to move up and down driven by the upper film adhering roller lifting drive module. The insulating film tape may be pressed and adhered to the upper half portion of the front side (not marked) of the battery 100 in a static state from bottom to top, and the upper film adhering roller 435 may be configured to stop at a height where the insulating film tape is capable of contacting with the left side 12 of the battery 100. Then the battery 100 may be sent in, and the upper film adhering roller 435 may continue to press and adhere the insulating film tape onto the left side 12 of the battery 100. The upper film adhering material-press member 439 may be disposed behind the upper film adhering roller 435, and the battery 100 which has been pressed and adhered by the upper film adhering roller 435 may be stably coated under the pressing of the upper film adhering material-press member 439 and the film adhering and receiving mechanism 450, thereby avoiding bubbles and wrinkles.

In some embodiments, the lower paving mechanism 440 may include a lower film adhering roller lifting drive module 441, a lower film adhering roller lifting slide group 442, a lower film adhering roller lifting slide plate 443, two lower film adhering roller brackets 444, and a lower film adhering roller 445. Slide rails of the lower film adhering roller lifting drive module 441 and the lower film adhering roller lifting slide group 442 may be fixed on the lower portion of the backside of the film adhering bracket 440. The lower film adhering roller lifting slide plate 443 may be fixed on a free end of the lower film adhering roller lifting drive module 441 and the slide block of the lower film adhering roller lifting slide group 442. The two lower film adhering roller brackets 444 may be fixed on two sides of a middle portion of the lower film adhering roller lifting slide plate 443, and the lower film adhering roller 445 may be rotatably arranged between the two lower film adhering roller brackets 444. The lower film adhering roller 445 may be configured to act in conjunction with the upper film adhering roller 435. Before or after the upper film adhering roller 435 is fitted to the upper half portion of the front side (not marked), the lower film adhering roller 445 may be configured to press and adhere the insulating film tape to the lower half portion of the front side (not marked) of the battery 100 in the static state from bottom to top, and the lower film adhering roller 445 may be configured to stop at a height where the insulating film tape is capable of contacting with the right side (not marked) of the battery 100. When the insulating film tape is pressed and adhered to the upper and lower half portions of the front side (not marked) of the battery 100 in the static state through the lower film adhering roller 445 and the upper film adhering roller 435, the battery 100 may be sent in, the upper film adhering roller 435 may continue to press and adhere the insulating film tape onto the left side 12 of the battery 100, and the lower film adhering roller 445 may continue to press and adhere the insulating film tape to the right side (not marked) of the battery 100. An film adhering and receiving mechanism 450 may be disposed behind the lower adhering roller 445. The film adhering and receiving mechanism 450 and the upper film adhering material-press member 139 may be further configured to press and hold the film-adhered battery 100 to implement the following stable coating process with the insulating film tape, so as to avoid bubbles and wrinkles.

Figure 13:
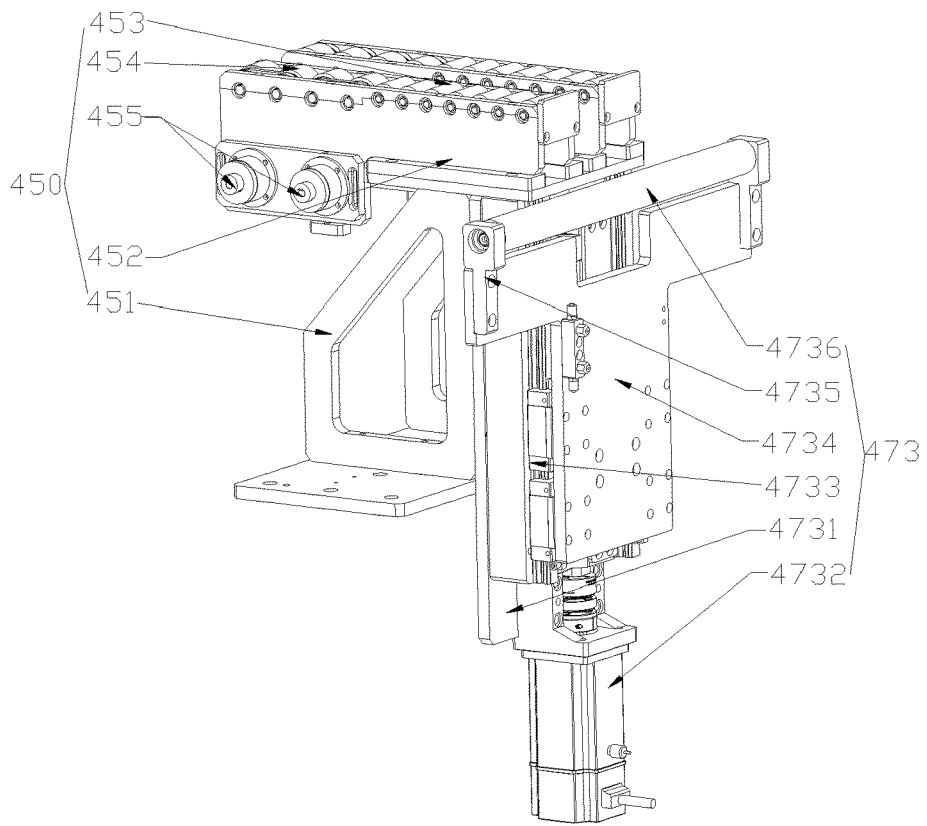
FIG. 13 is a schematic diagram illustrating a structure of a film adhering and receiving mechanism and a structure of a first lower folding and adhering module according to some embodiments of the present disclosure.

FIG. 13 is a schematic diagram illustrating a structure of a film adhering and receiving mechanism and a structure of a first lower folding and adhering module according to some embodiments of the present disclosure.

In some embodiments, as shown in FIG. 13, the film adhering and receiving mechanism 450 may include a film adhering and receiving bracket 451, a film adhering and receiving roller bracket 452, a plurality of film adhering and receiving rollers 453, a film adhering and receiving brake roller 454, and a receiving brake 455. The film adhering and receiving roller bracket 452 may be fixed to the film adhering and receiving bracket 451, and the plurality of film adhering and receiving rollers 453 and the film adhering and receiving brake roller 454 may be uniformly arranged on the film adhering and receiving roller bracket 452. The receiving brake 455 may be fixed outside the film adhering and receiving roller bracket 452, and may be connected to the receiving brake roller 454. The film adhering and receiving roller 453 may be provided opposite to the upper film adhering material-press member 439, and the film adhering and receiving brake roller 454 may be used to brake the battery 100, which controls a movement of the battery 100 in real time.

Figure 14:
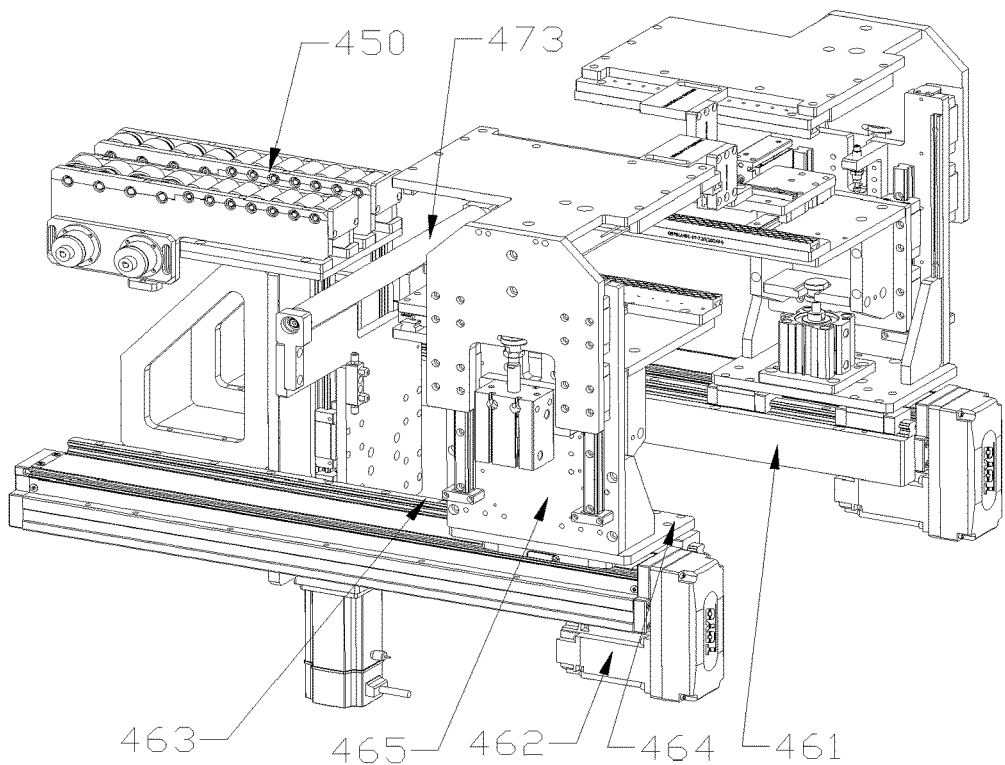
FIG. 14 is a schematic diagram illustrating a clamping of two folding and adhering clamping mechanism according to some embodiments of the present disclosure.
Figure 15:
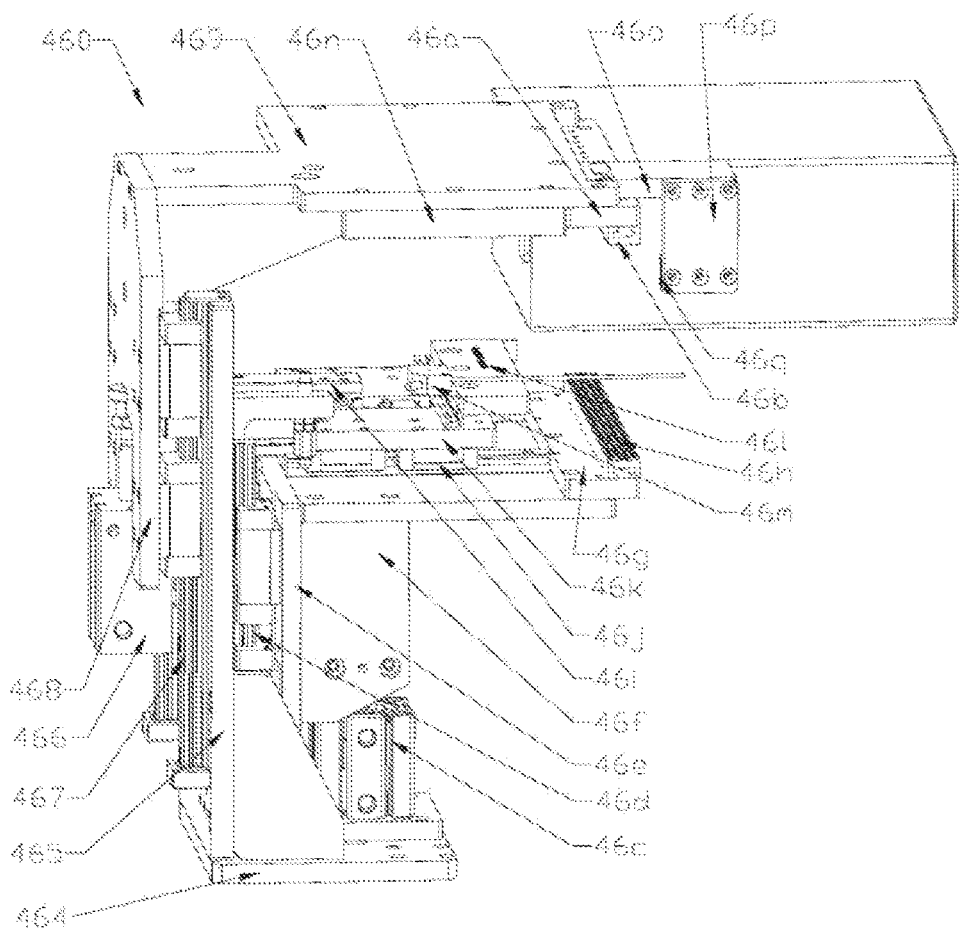
FIG. 15 is a schematic diagram illustrating a partial structure of a folding and adhering clamping mechanism according to some embodiments of the present disclosure.

FIG. 14 is a schematic diagram illustrating a clamping of two folding and adhering clamping mechanism according to some embodiments of the present disclosure. FIG. 15 is a schematic diagram illustrating a partial structure of a folding and adhering clamping mechanism according to some embodiments of the present disclosure.

In some embodiments, as shown in FIGS. 14-15, two groups of folding and adhering clamping mechanisms 460 may be disposed symmetrically and may enter the first folding and adhering station 471 to grip the battery 100 for the folding and adhering of the back side 13 of the battery 100. The battery 100 may be gripped to be retreated forward out of the first folding and adhering station 471. Each of the two groups of folding and adhering clamping mechanisms 460 may include a folding and adhering clamping mounting member 461, a folding and adhering clamping front-rear translating drive module 462, a folding and adhering clamping front-rear translating slide group 463, a folding and adhering clamping front-rear translating slide plate 464, a folding and adhering clamping bracket 465, an upper clamp lifting driver 466, an upper clamp lifting slide group 467, an upper clamp lifting slide plate 468, an upper clamp bracket 469, an upper clamp 46a, an upper clamp soft palm 46b, a lower clamp lifting driver 46c, a lower clamp lifting slide group 46d, a lower clamp lifting slide plate 46e, a lower clamp bracket 46f, a lower clamp 46g, and a lower clamp soft palm 46h.

Slide rails of the folding and adhering clamping front-rear translating drive module 462 and the folding and adhering clamping front-rear translating slide group 463 may be fixed to the folding and adhering clamping mounting member 461, and the folding and adhering clamping front-rear translating slide plate 464 may be fixed to a free end of the folding and adhering clamping front-rear translating drive module 462 and to a slide block of the folding and adhering clamping front-rear translating slide plate 463.

Slide rails of the upper clamp lifting driver 466 and the upper clamp lifting slide group 467 may be fixed to an outside of the folding and adhering clamping bracket 465, and the upper clamp lifting slide plate 468 may be fixed to a free end of the upper clamp lifting driver 466 and to a slide block of the upper clamp lifting slide group 467. The upper clamp bracket 469 may be fixed to the upper clamp lifting slide plate 468, the upper clamp 46a may be fixed to the upper clamp bracket 469 with a clamp opening facing downward, and the upper clamp soft palm 46b may be fixed under the upper clamp 46a.

The lower clamp lifting driver 46c and a slide rail of the lower clamp lifting slide group 46d may be fixed to an inner side of the folding and adhering clamping bracket 465, and the lower clamp lifting slide plate 46e may be fixed to a free end of the lower clamp lifting driver 46c and to the slide block of the lower clamp lifting slide group 46d. The lower clamp bracket 46f may be fixed to the lower clamp lifting slide plate 46e, the lower clamp 46g may be fixed to the lower clamp bracket 46f with the clamp opening facing upward, and the lower clamp soft palm 46h may be fixed to the lower clamp 46g.

Taking a hollow-square-shaped coating battery as an example, the upper clamp 46a and the lower clamp 46g may be closed relative to each other to clamp a top side end or a bottom side end of the left side 12 and the right side (not shown) of the battery 100. The upper clamp 46a and the lower clamp 46g of one of two groups of the folding and adhering clamping mechanisms 460 symmetrically disposed at left and right may be closed relative to each other to hold the top side end and the bottom side end of the left side 12 and the top side end and the bottom side end of the right side (not shown) of the battery 100. The upper clamp 46a and the lower clamp 46g of the other of the two groups of the folding and adhering clamping mechanisms 460 may be closed relative to each other to hold the bottom side end or the top side end of the left side 12 and the bottom side end and the top side end of the right side (not shown) of the battery 100.

In some embodiments, the folding and adhering clamping mechanism 460 may further include a lower clamp left-right translating driver 46i, a lower clamp left-right translating slide group 46j, a lower clamp left-right translating slide plate 46k, a lower clamp left-right clamp 461, and a lower clamp material sensor. Slide rails of the lower clamp left-right translating driver 46i and the lower clamp left-right translating slide group 46j may be fixed on the lower clamp bracket 46f. The lower clamp left-right translating slide plate 46k may be fixed to a free end of the lower clamp left-right translating driver 46i and the slide block of the lower clamp left-right translating slide group 46j. The lower clamp left-right clamp 461 may be fixed to the lower clamp left-right translating slide plate with a clamp opening facing to the left or to the right, and the lower clamp material sensor 46m may be fixed to the lower clamp left-right translating slide plate with the clamping facing to the left or to the right.

Taking the hollow-square-shaped coating battery as an example, the lower clamp left-right clamps 461 of two groups of the lower clamps symmetrically disposed left and right may be configured to grip the top side 11 and the bottom side (not shown) of the battery 100 when the lower clamp left-right clamps 461 are closed relative to each other left and right.

In some embodiments, the folding and adhering clamping mechanism 460 may further include a lower clamp side abutting driver 46n, a lower clamp side abutting bracket 460, a lower clamp side abutting clamp body 46p, and a lower clamp side abutting soft palm 46q. The lower clamp side abutting driver 46n may be fixed to the upper clamp bracket 469. The lower clamp side abutting bracket 460 may be fixed to a free end of the lower clamp side abutting driver 46n. The lower clamp side abutting clamp body 46p may be fixed to the lower clamp side abutting bracket 460 with a clamping opening facing backward. The lower clamp side abutting soft palm 46q may be fixed to the lower clamp side abutting clamp body 46p.

Taking the hollow-square-shaped coating battery as an example, two groups of the lower clamp side abutting clamp bodies 46p symmetrically disposed on left and right may be configured to abut against the top side end and the bottom side end of the front side (not shown) of the battery 100 in a same direction.

In some embodiments, a first upper folding and adhering module 472 may include a first upper folding and adhering roller lifting driver 4721, a first upper folding and adhering roller lifting slide group 4722, a first upper folding and adhering roller lifting slide plate 4723, two first upper folding and adhering roller brackets 4724, and a first upper folding and adhering roller 4725. The first upper folding and adhering roller lifting driver 4721 and the slide rail of the first upper folding adhering roller lifting slide group 4722 may be fixed on the upper film adhering material-press lifting slide plate 438, the first upper folding and adhering roller lifting slide plate 4723 may be fixed on the free end of the first upper folding and adhering roller lifting driver 4721 and the slide block of the first upper folding and adhering roller lifting slide group 4722, the two first upper folding and adhering roller brackets 4724 may be fixed on two sides of the first upper folding and adhering roller lifting slide plate 4723, the first upper folding and adhering roller 4725 may be rotatably arranged between the two first upper folding and adhering roller brackets 4724, and the first upper folding and adhering roller 4725 may be disposed on an upper portion of the first folding and adhering station 471.

In some embodiments, a first lower folding and adhering module 473 may include a first lower folding and adhering mounting plate 4731, a first lower folding and adhering roller lifting drive module 4732, a first lower folding and adhering roller lifting slide group 4733, a first lower folding and adhering roller lifting slide plate 4734, two first lower folding and adhering roller brackets 4735, and a first lower folding and adhering roller 4736. The first lower folding and adhering mounting plate 4731 may be fixed on the film adhering and receiving mechanism 450. The first lower folding and adhering roller lifting drive module 4732 and slide rails of the first lower folding and adhering roller lifting slide group 4733 may be fixed on the first lower folding and adhering mounting plate 4731. The first lower folding and adhering roller lifting slide plate 4734 may be fixed on the free end of the first lower folding and adhering roller lifting drive module 4732 and the slide block of the first lower folding and adhering roller lifting slide group 4733. The two first lower folding and adhering roller brackets 495 may be fixed on two sides of the first lower folding and adhering roller lifting slide plate 4734. The first lower folding and adhering roller 4736 may be rotatably arranged between the two first lower folding and adhering roller brackets 4735. The first lower folding and adhering roller 4736 may be located on a lower position of the first folding and adhering station 471 relative to the first upper folding and adhering roller 4725. The first upper folding and adhering roller 4725 may be driven by the first upper folding and adhering roller lifting driver 4721, and may be configured to fold and adhere a tape tail of the insulating film tape. The first lower folding and adhering roller 4736 may be driven by the first lower folding and adhering roller lifting drive module 4732, and may be configured to fold and adhere a tape head of the insulating film tape. The tape head and the tape tail of the insulating film tape may be respectively folded and adhered on the back side 13 of the battery 100 to implement the coating of the back side 13 of the battery.

Taking the hollow-square-shaped coating battery as an example, the two folding and adhering clamping front-rear translating drive modules 462 of the two folding and adhering clamping mechanisms 460 may be configured to simultaneously drive the two folding and adhering clamping brackets 465 to move backward with the upper clamp 46a, the lower clamp 46g, the lower clamp left-right clamp 461, and the lower clamp side abutting clamp body 46p to above the film adhering and receiving mechanism 450. The two upper clamp lifting drivers 466 may be configured to drive the two upper clamps 46a to move down, and the two lower clamp lifting drivers 46c may be configured to drive the two lower clamps 46g to move up to clamp top side edges and bottom side edges of the left side 12 and the right side (not shown) of the hollow-square-shaped coating battery 100. At the same time, the two lower clamp left-right translating drivers 46i may be configured to drive the two lower clamp left-right clamps 461 to clamp a top side 11 and the bottom side (not shown) of the hollow-square-shaped coating battery 100. Meanwhile, the two lower clamp side abutting drivers 46n may be configured to drive the two lower clamp side abutting clamp bodies 46p to extend out in the same direction to hold and abut against the top side edges and bottom side edges of the front side (not shown) of the hollow-square-shaped coating battery 100. The two folding and adhering clamping front-rear translating drive modules 462 of the two folding and adhering clamping mechanisms 460 may be configured to simultaneously drive the two folding and adhering clamping brackets 465 to move forward with the upper clamp 46a, the lower clamp 46g, the lower clamp left-right clamp 461, the lower clamp side abutting clamp body 46p, and the held or abutted hollow-square-shaped coating battery 100, so that the hollow-square-shaped coating battery 100 may be moved to the first folding and adhering station 471, and the back side 13 of the hollow-square-shaped coating battery 100 may be aligned with the first upper folding and adhering roller 4725 of the first upper folding and adhering module 472 and the first lower folding and adhering roller 4736 of the first lower folding and adhering module 473. Furthermore, the first folding and adhering mechanism 470 may be configured to fold and adhere the back side 13 of the hollow-square-shaped coating battery 100. The folding and adhering clamping mechanism 460 may be moved to a position above the transferring and positioning device 500, and the folding and adhering clamping mechanism 460 may be pulled down to place the battery 100 whose back side is folded and adhered on the transferring and positioning device 500. It should be noted that the hollow-square-shaped adhering film and the film adhering device 400 may be used in the U-shaped coating process. In the U-shaped coating process, the first upper folding and adhering module 472 and the first lower folding and adhering module 473 may be shielding mechanisms, which do not function. In the U-shaped coating process, the battery 100 may be configured to enter the paving channel 420 with the bottom side (not shown) facing forward and the left side 12 facing upward, so as to realize the pavings of the bottom side (not shown), the left side 12, and the right side (not shown). After the paving operation, the U-shaped coating battery 100 may also fall on the film adhering and receiving mechanism 450, and the two folding and adhering clamping front-rear translating drive modules 462 of the two folding and adhering clamping mechanisms 460 may be configured to simultaneously drive the two folding and adhering clamping brackets 465 to move backward with the upper clamp 46a, the lower clamp 46g, the lower clamp left-right clamp 461, and the lower clamp side abutting clamp body 46p to above the film adhering and receiving mechanism 450. The two upper clamp lifting drivers 466 may be configured to drive the two upper clamps 46a to move down, and the two lower clamp lifting drivers 46c may be configured to drive the two lower clamps 46g to move up to clamp left side edges and right side edges of the left side 12 and the right side (not shown) of the U-shaped coating battery 100. At the same time, the two lower clamp left-right translating drivers 46i may be configured to drive the two lower clamp left-right clamps 461 to clamp a front side (not shown) and the back side 13 of the U-shaped coating battery 100. Meanwhile, the two lower clamp side abutting drivers 46n may be configured to drive the two lower clamp side abutting clamp bodies 46p to extend out in the same direction to hold the left side edges and the right side edges of the bottom side (not shown) of the U-shaped coating battery 100. The two folding and adhering clamping front-rear translating drive modules 462 of the two folding and adhering clamping mechanisms 460 may be configured to simultaneously drive the two folding and adhering clamping brackets 465 to move forward with the upper clamp 46a, the lower clamp 46g, the lower clamp left-right clamp 461, the lower clamp side abutting clamp body 46p, and the held or abutted hollow-square-shaped coating battery 100, which may pass the first folding and adhering station 471, move forward to a position above the transferring and positioning device 500, and move down to place the U-shaped coating battery 100 on the transferring and positioning device 500.

Figure 16:
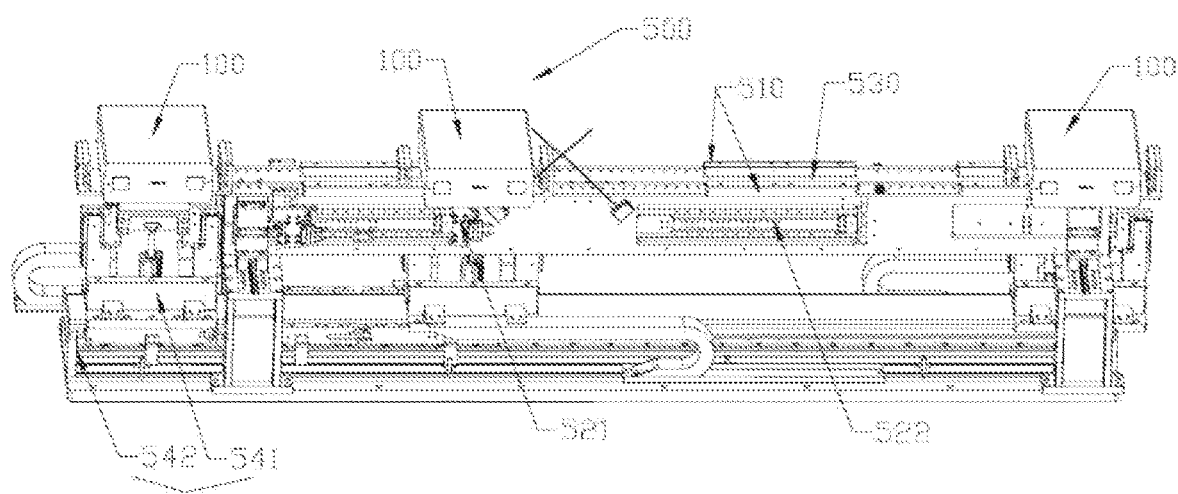
FIG. 16 is a schematic diagram illustrating a structure of a transferring and positioning device according to some embodiments of the present disclosure.
Figure 17:
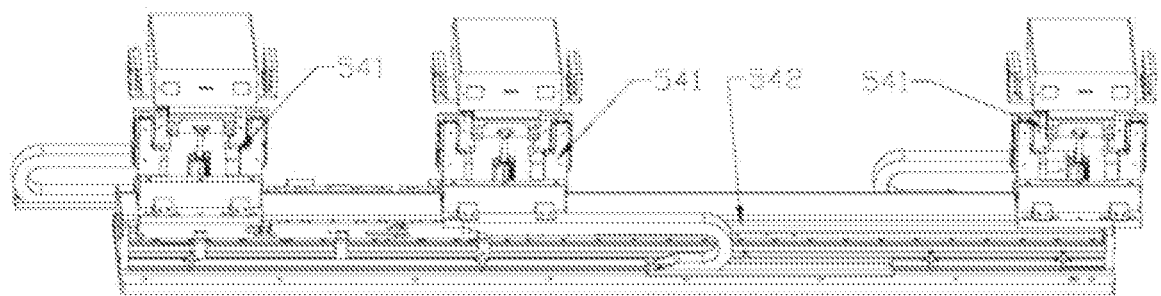
FIG. 17 is a schematic diagram illustrating a structure of a transferring mechanism according to some embodiments of the present disclosure.
Figure 18:
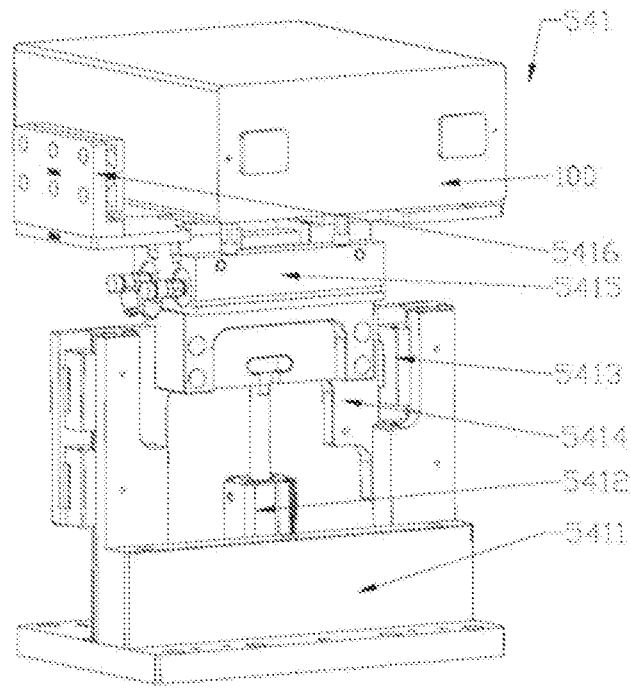
FIG. 18 is a schematic diagram illustrating a structure of a transferring carrier according to some embodiments of the present disclosure.
Figure 19:
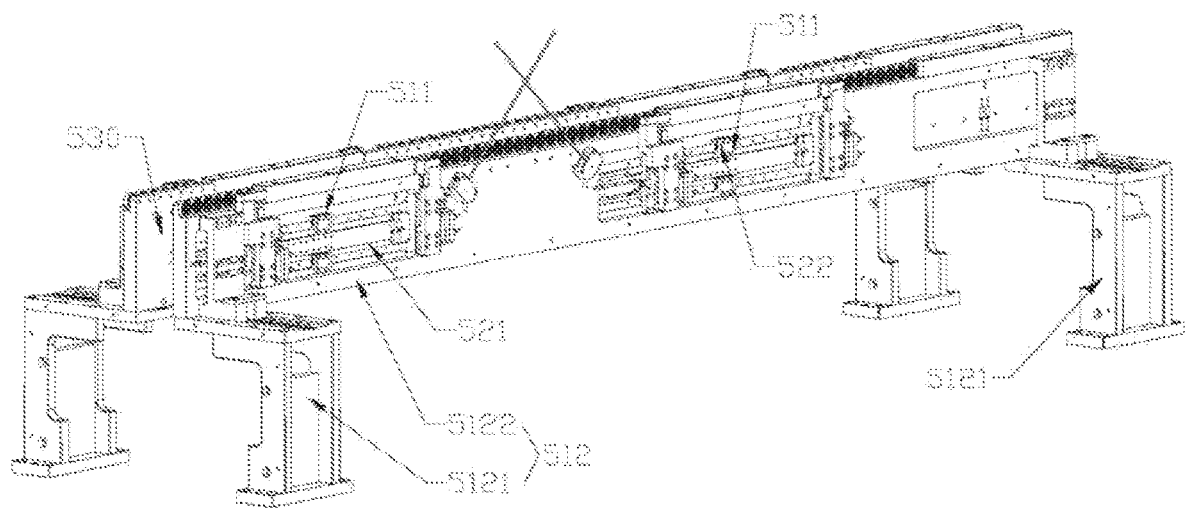
FIG. 19 is a schematic diagram illustrating a structure of a coating and positioning mechanism according to some embodiments of the present disclosure.
Figure 20:
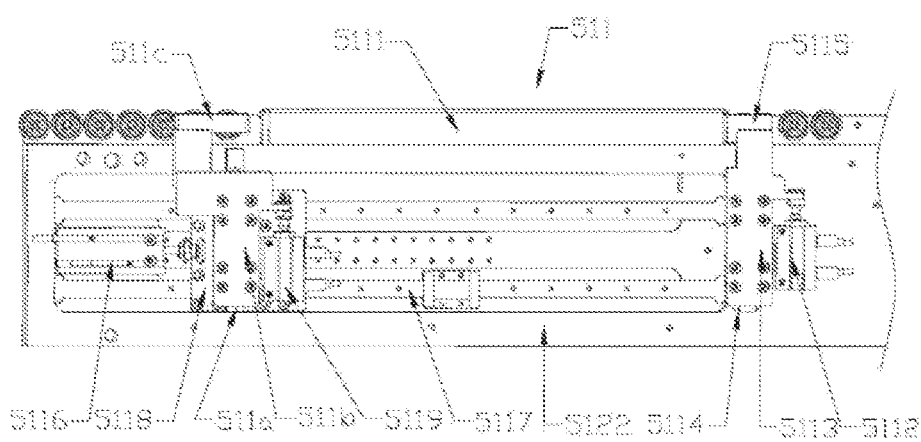
FIG. 20 is a schematic diagram illustrating a partial structure of a coating and positioning mechanism according to some embodiments of the present disclosure.

FIG. 16 is a schematic diagram illustrating a structure of a transferring and positioning device according to some embodiments of the present disclosure. FIG. 17 is a schematic diagram illustrating a structure of a transferring mechanism according to some embodiments of the present disclosure. FIG. 18 is a schematic diagram illustrating a structure of a transferring carrier according to some embodiments of the present disclosure. FIG. 19 is a schematic diagram illustrating a structure of a coating and positioning mechanism according to some embodiments of the present disclosure. FIG. 20 is a schematic diagram illustrating a partial structure of a coating and positioning mechanism according to some embodiments of the present disclosure.

In some embodiments, as shown in FIGS. 16-20, the transferring and positioning device 500 may include two coating positioning mechanisms 510, a transferring mechanism 540, and two top pressing mechanisms 550 in an one-to-one correspondence to the edge cutting and second folding and adhering station 521 and the third folding and adhering station 522. The two coating positioning mechanisms 510 may be symmetrically fixed to the machine 200 on the left side and the right side, and each coating positioning mechanism 510 may include a coating positioning bracket 512 and a plurality of positioning fixtures 511 disposed on the coating film positioning bracket 512. An edge cutting and second folding and adhering station 521 and a third folding and adhering station 522 may be formed on the plurality of positioning fixtures 511 arranged symmetrically in pairs. A transferring channel 530 determining a transferring direction of the battery 100 may be formed between two coating positioning mechanisms 510. The two coating positioning mechanisms 510 may be configured to clamp and locate the battery 100 on the edge cutting and second folding and adhering station 521 and the third folding and adhering station 522 for coating.

In some embodiments, as shown in FIGS. 16-17, the transferring mechanism 540, which is fixed to the machine station 200 and within the transfer channel 530, may include a plurality of transferring carriers 541 for stably clamping the battery 100. A transferring linear module 542 may be fixed on the machine station 200 and located between the two coating film positioning brackets 512. The three transferring carriers 541 may be fixed on the three independent slide blocks of the transferring linear module 542 in a one-to-one correspondence. A transferring carrier 541 on an end where the battery comes may be configured to be connected to the first folding and adhering mechanism 470 of the film adhering device 400 to form a transferring charging station. The battery 100 may be transferred from the transferring charging station to the edge cutting and second folding and adhering station 521. A transferring carrier 541 on an end where the battery leaves may be configured to be connected to a blanking and handling device 1700 to form a transferring blanking station. The battery 100 may be transferred from the third folding and adhering station 522 to the transferring blanking station. A transferring carrier 541 located in the middle may be configured to transfer the battery 100 from the edge cutting and second folding and adhering station 521 to the third folding and adhering station 522.

In some embodiments, as shown in FIG. 19, each of the coating positioning brackets 512 may include two coating positioning bases 5121 at a front side and backside and a coating positioning longitudinal beam 5122. A head end and a tail end of the coating positioning longitudinal beam 5122 may be fixed to the two coating positioning bases 5121 at the front side and backside, respectively. The plurality of positioning fixtures 511 may be spaced apart on a length direction of the coating positioning longitudinal beam 5122. The coating positioning longitudinal beam 5122 may be used to fix the plurality of positioning fixtures 511. The plurality of positioning fixtures 511 on two coating positioning longitudinal beams 5122 may be respectively disposed on an outer side of the corresponding coating positioning longitudinal beams 5122.

In some embodiments, as shown in FIG. 20, for each of the plurality of positioning fixtures 511, the positioning fixture 511 may include a bottom tray plate 5111, a front positioning vertical driver 5112, a front positioning vertical slide group 5113, a front positioning vertical slide plate 5114, a front positioning clamp 5115, a rear positioning longitudinal driver 5116, a rear positioning longitudinal slide group 5117, a rear positioning longitudinal slide plate 5118, a rear positioning vertical driver 5119, a rear positioning vertical slide group 511a, a rear positioning vertical slide plate 511b, and a rear positioning clamp 511c. The bottom tray plate 5111 may be fixed on a top of the coating positioning longitudinal beam 5122 to carry the battery 100. The front positioning vertical driver 5112, a slide rail of the front positioning vertical driver 5113, the rear positioning longitudinal driver 5116, and a slide rail of the rear positioning longitudinal slide group 5117 may be fixed to an outer sidewall of the coating positioning longitudinal beam 5122.

The front positioning vertical slide plate 5114 may be fixed to a free end of the front positioning vertical driver 5112 and to a slide block of the front positioning vertical slide group 5113. A front positioning clamp 5115 may be fixed to the top of the front positioning vertical slide plate 5114.

The rear positioning longitudinal slide plate 5118 may be fixed to a free end of the rear positioning longitudinal driver 5116 and a slide block of the rear positioning longitudinal slide group 5117. The rear positioning vertical driver 5119 and a slide rail of the rear positioning vertical slide group 511a may be fixed on the rear positioning longitudinal slide plate 5118. The rear positioning vertical slide plate 511b may be fixed to the free end of the rear positioning vertical driver 5119 and the slide block of the rear positioning vertical slide group 511a. The rear positioning clamp 511c may be fixed on the top of the rear positioning vertical slide plate 511b.

The battery 100 may be clamped between the front positioning clamp 5115 and the rear positioning clamp 511c.

In some embodiments, the transferring carrier 541 may include a transferring carrier bracket 5411, a transferring lifting driver 5412, a transferring lifting slide group 5413, a transferring lifting slide bracket 5414, a transferring gripper driver 5415, and two transferring grippers 5416. The transferring carrier bracket 5411 may be fixed to a slide block of the transferring linear module 542. A slide rail of the transferring lifting slide group 5413 and the transferring lifting driver 5412 may be fixed to the transferring carrier bracket 5411. The transferring lifting slide bracket 5414 may be fixed on a free end of the transferring lifting driver 5412 and on the slide block of the transferring lifting slide group 5413. The transferring gripper driver 5415 of the transferring grippers 5416 may be fixed to a top end of the transferring lifting slide bracket 5414. The two transferring grippers 5416 may be fixed to two free ends of the transferring gripper driver 5415 of the transferring grippers 5416. The two transferring grippers 5416 may be configured to clamp a front end surface and a back end surface of the battery 100. The transferring lifting driver 5412 may be configured to drive the transferring lifting slide bracket 5414 to move up or down. At a high position, the transferring lifting slide bracket 5414 may be driven by the transferring lifting driver 541 to move to the corresponding edge cutting and second folding and adhering station 521 or the third folding and adhering station 522. After arriving at the corresponding edge cutting and second folding and adhering station 521 or the third folding and adhering station 522, the transferring gripper driver 5415 may be configured to drive the two transferring grippers 5416 to release the battery 100. The transferring lifting driver 5412 may be configured to drive the transferring lifting slide bracket 5414 down to a low position, so that the battery 100 falls into the positioning fixture 511. The positioning fixture 511 may be configured to adjust a specific position of the battery 100 and clamp the battery 100 for coating. After the coating is completed, the transferring lifting driver 5412 may be configured to rise, and the transferring gripper driver 5415 may be configured to drive the two transferring grippers 5416 to clamp the battery 100 and move the battery 100 to the edge cutting and second folding and adhering station 521 or the third folding and adhering station 522, or leave the coating positioning mechanism 510 driven by the transferring linear module 542.

Figure 21:
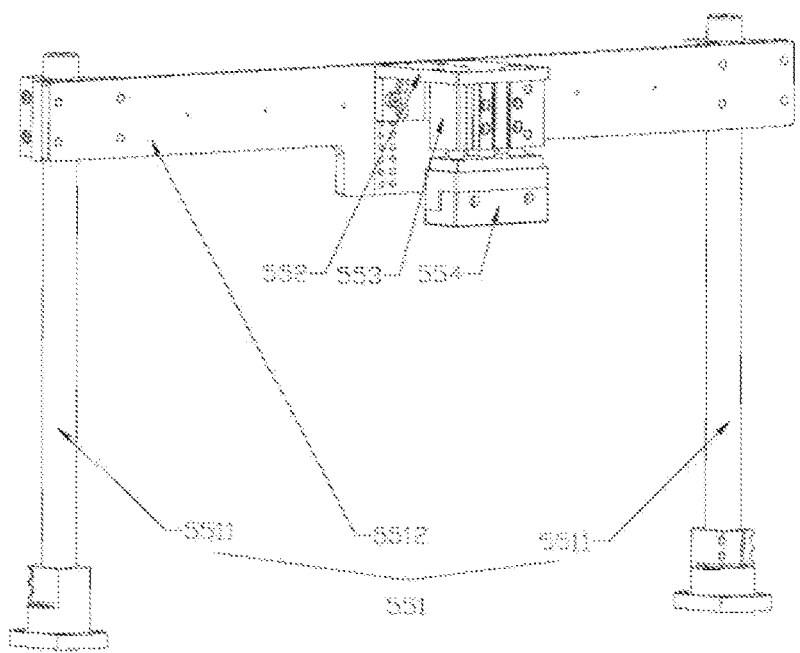
FIG. 21 is a schematic diagram illustrating a structure of a top pressing mechanism according to some embodiments of the present disclosure.

FIG. 21 is a schematic diagram illustrating a structure of a top pressing mechanism according to some embodiments of the present disclosure In some embodiments, as shown in FIG. 21, the two top pressing mechanisms 550 may be in the one to one correspondence with the edge cutting and second folding and adhering station 521 and the third folding and adhering station 522, respectively. Each of the two top pressing mechanisms 550 may include a top pressing bracket 551, a top pressing driver bracket 552, a top pressing driver 553, and a top pressing palm 554. The top pressing bracket 551 may include two top pressing bracket columns 5511 and a top pressing bracket beam 5512. The top pressing driver bracket 552 may be fixed to the top pressing bracket beam 5512. The top pressing driver 553 may be fixed on the top pressing driver bracket 552. The top pressing palm 554 may be fixed to a free end of the top pressing driver 553, and faced downward to the edge cutting and second folding and adhering station 521 or the third folding and adhering station 522. The top pressing mechanism 550 and the coating positioning mechanism 510 may be configured to work together to fix the battery 100 on the edge cutting and second folding and adhering station 521 and the third folding and adhering station 522.

Figure 22:
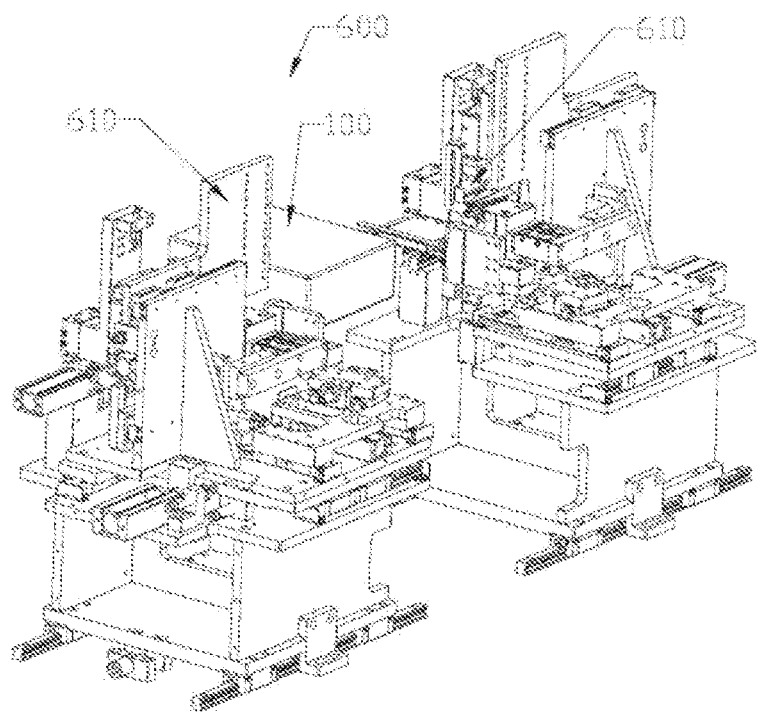
FIG. 22 is a schematic diagram illustrating a structure of an edge cutting device of a battery according to some embodiments of the present disclosure.
Figure 23:
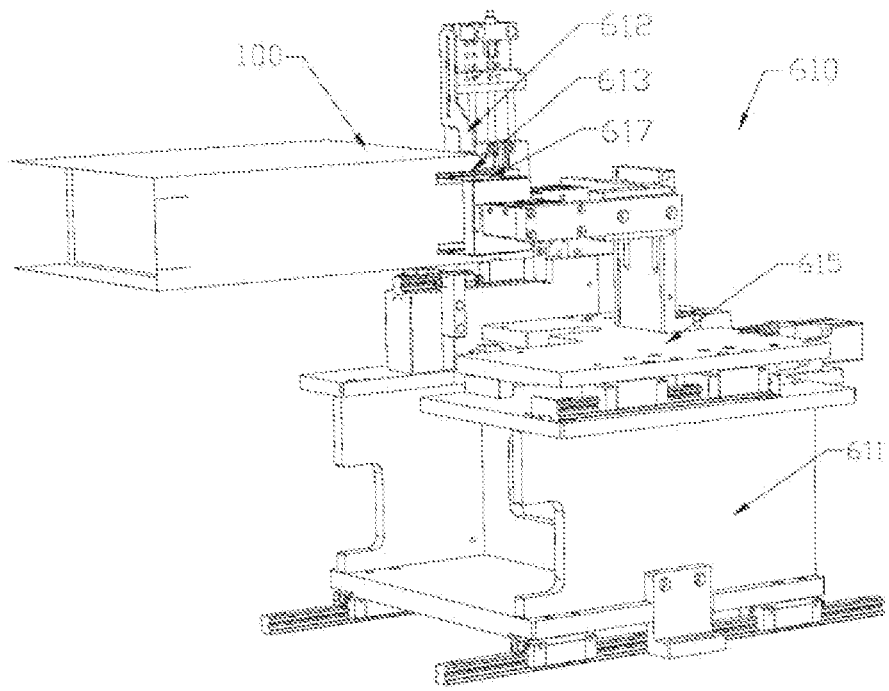
FIG. 23 is a schematic diagram illustrating a structure of a first edge cutting mechanism according to some embodiments of the present disclosure.
Figure 24:
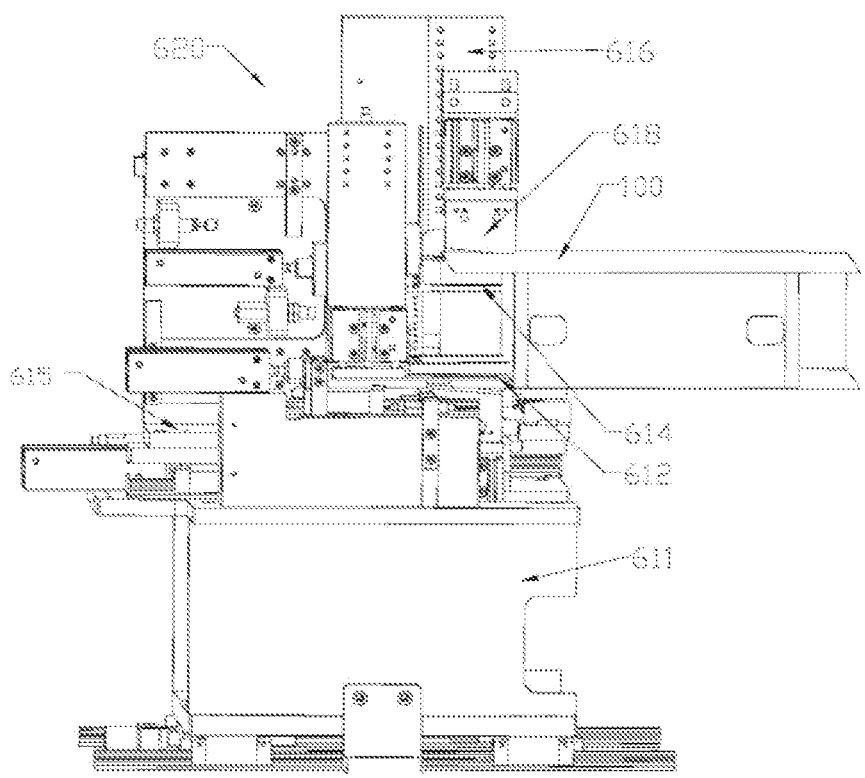
FIG. 24 is a schematic diagram illustrating a structure of a second edge cutting mechanism according to some embodiments of the present disclosure.

FIG. 22 is a schematic diagram illustrating a structure of an edge cutting device of a battery according to some embodiments of the present disclosure. FIG. 23 is a schematic diagram illustrating a structure of a first edge cutting mechanism according to some embodiments of the present disclosure. FIG. 24 is a schematic diagram illustrating a structure of a second edge cutting mechanism according to some embodiments of the present disclosure.

In some embodiments, as shown in FIGS. 22-24, the edge cutting device 600 may include a first edge cutting mechanism 610 and a second edge cutting mechanism 620 that are used interchangeably. Each of the first edge cutting mechanism 610 and the second edge cutting mechanism 620 may include an edge cutting bracket module 611, a first film abutting and edge cutting forward-backward module 615, and a film shouldering module 612.

In some embodiments, as shown in FIG. 23, the first edge cutting mechanism 610 may further include a first film abutting module 613 and a first edge cutting module 617. The first film abutting module 613 and the first edge cutting module 617 may be a single unit for easy replacement. The first edge cutting mechanism 610 may be used to cut edges of the bottom side of the U-shaped coating battery, or cut edges of the front side and edges of the back side of the hollow-square-shaped coating battery.

In some embodiments, as shown in FIG. 24, the second edge cutting mechanism 620 may further include a second film abutting and edge cutting forward-backward module 616, a second film abutting module 614 and a second edge cutting module 618. The second film abutting and edge cutting forward-backward module 616, the second film abutting module 614, and the second edge cutting module 618 may be a single integral unit for easy replacement. The second edge cutting mechanism 620 may be configured to cut the edges of the left side and the edges the of right side of the U-shaped coating battery, and cut the edges of the left side and the edges of the right side of the hollow-square-shaped coating battery.

As shown in FIGS. 23-24, the edge cutting bracket module 611 may be disposed on the machine station 200 and aligned with the edge cutting and second folding and adhering station 521. The edge cutting bracket module 611 may be configured to install the first film abutting and edge cutting forward-backward module 615 and the film shouldering module 612.

As shown in FIGS. 23 and 24, the first film abutting and edge cutting forward-backward module 615 may be configured to install a second film abutting and edge cutting forward-backward module 616, the first film abutting module 613, and the first edge cutting module 617.

As shown in FIG. 24, the second film abutting and edge cutting forward-backward module 616 may be configured to install the second film abutting module 614 and the second edge cutting module 618.

The film shouldering module 612 may be configured to support the insulating film extending out from the left side 12 and the right side (not shown) of the battery 100 to keep the insulating film extending outside the left side 12 and the right side (not shown) of the battery 100 to be flat. Accordingly, when cutting the edges of the left side and the edges of the right side, that is, when cutting the edges of the insulating film extended outside the left side 12 and the right side (not shown), or when cutting the edges of the front side and the edges of the back side, that is, when cutting the edges of the insulating film extended outside the front side (not shown) and the back side 13, or when cutting the edges of the bottom side, that is, when cutting the edges of the insulating film extended outside the bottom side (not shown), the film shouldering module 612 may make the insulating film extended outside the left side 12 and the right side (not shown) not droop to hinder the edge cutting.

The first film abutting module 613 may be configured to abut against and hold the insulating film out of the bottom side of the U-shaped battery 100 at an edge cutting position when cutting the edges of the bottom side of the U-shaped coating battery 100, such that a concavity of the insulating film does not occur to affect the edge cutting when edges of the insulating film are cut, or abut against and hold the insulating film out of the front side and the back side of the hollow-square-shaped coating battery 100 at an edge cutting position when cutting the edges of the front side and the edges of the back side of the hollow-square-shaped coating battery 100, such that the concavity of the insulating film does not occur to affect the edge cutting when edges of the insulating film are cut.

The second film abutting module 614 may be configured to abut against and hold the insulating film out of the left side and the right side of the U-shaped coating battery 100 at the edge cutting position when cutting the edges of the left side and the edges of the right side of the U-shaped coating battery 100, such that the concavity of the insulating film does not occur to affect the edge cutting when edges of the insulating film are cut, or abut against and hold the insulating film out of the left side and the right side of the hollow-square-shaped coating battery 100 at the edge cutting position when cutting the edges of the front side and the edges of the back side of the hollow-square-shaped coating battery 100, such that the concavity of the insulating film does not occur to affect the edge cutting when edges of the insulating film are cut.

The first edge cutting module 617 may be configured to cut a preset length at a preset position of the insulating film extending outside the bottom side of the U-shaped coating battery 100 when cutting the edges of the bottom side of the U-shaped coating battery 100, or cut a preset length at a preset position of the insulating film extending outside of the front side and the back side of the hollow-square-shaped coating battery 100 when cutting the edges of the front side and the edges of the back side of the hollow-square-shaped coating battery 100.

The second edge cutting module 618 may be configured to cut a preset length at a preset position of the insulating film extending outside the right side and the left side of the U-shaped coating battery 100 when cutting the edges of the right side and the edges of the left side of the U-shaped coating battery 100, or cut a preset length at a preset position of the insulating film extending outside the right side and the left side of the hollow-square-shaped coating battery 100 when cutting the edges of the right side and the edges of the left side of the hollow-square-shaped coating battery 100.

In some embodiments, referring to FIG. 23, the first edge cutting mechanism 610 may be configured to use the first film abutting module 613 and the first edge cutting module 617 to cooperate with each other to cut the edges of the bottom side of the U-shaped battery 100, and cut the edges of the front side and the edges of the back side of the hollow-square-shaped coating battery 100. As shown in FIG. 24, the second edge cutting mechanism 620 may be configured to use the second film abutting module 614 and the second edge cutting module 618 to cooperate with each other to cut the edges of the left side and the edges of the right side of the U-shaped battery 100, and cut the edges of the left side and the edges of the right side of the hollow-square-shaped coating battery 100.

Figure 25:
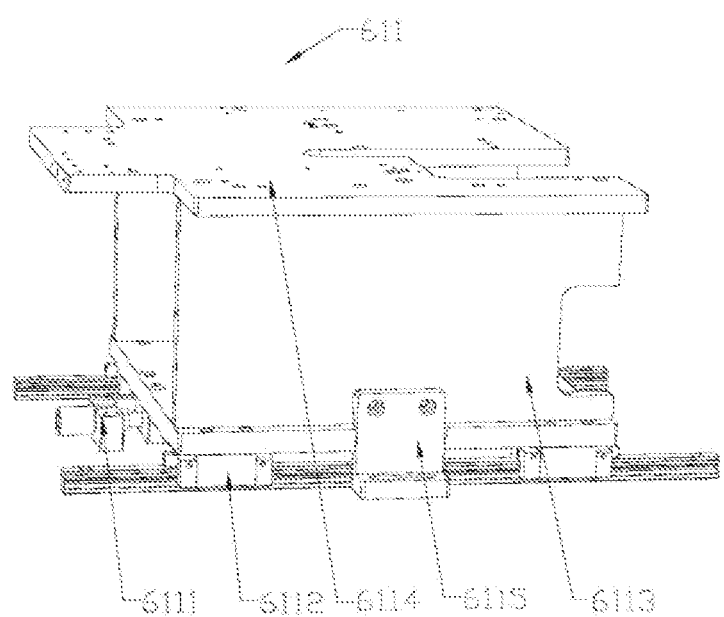
FIG. 25 is a schematic diagram illustrating a structure of an edge cutting bracket module according to some embodiments of the present disclosure.

FIG. 25 is a schematic diagram illustrating a structure of an edge cutting bracket module according to some embodiments of the present disclosure.

In some embodiments, as shown in FIG. 25, the edge cutting bracket module 611 may include an edge cutting bracket adjusting driver 6111, an edge cutting bracket adjusting slide group 6112, an edge cutting bracket 6113, and an edge cutting bracket locking member 6115. The edge cutting bracket 6113 may include an edge cutting bracket top plate 6114. The edge cutting bracket adjusting driver 6111 and a slide rail of the edge cutting bracket adjusting slide group 6112 may be fixed on the machine station 200. The edge cutting bracket 6113 may be fixed on a free end of the edge cutting bracket adjusting driver 6111 and a slide block of the edge cutting bracket adjusting slide group 6112. The edge cutting bracket locking member 6115 may be fixed to the edge cutting bracket 6113 and may be locked on the machine station 200. The edge cutting bracket 6113 may be configured to move forward-backward driven by the edge cutting bracket adjusting driver 6111 and may be locked by the edge cutting bracket locking member 6115 to adjust and fix a position of the edge cutting bracket 6113.

Figure 26:
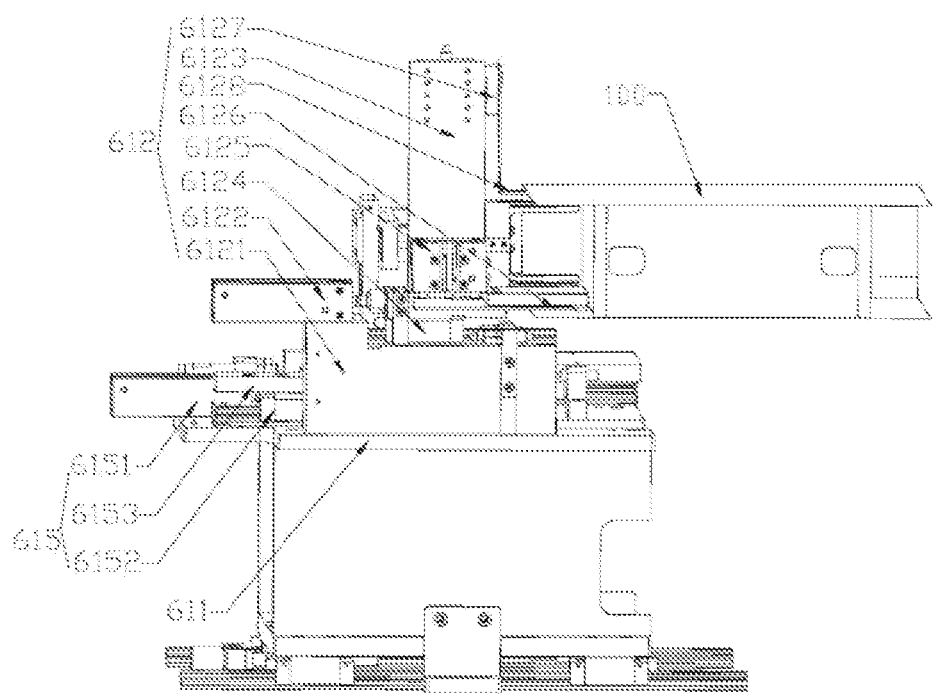
FIG. 26 is a schematic diagram illustrating a structure of a first film abutting, an edge cutting forward-backward module, and a film shouldering module according to some embodiments of the present disclosure.

FIG. 26 is a schematic diagram illustrating a structure of a first film abutting, an edge cutting forward-backward module, and a film shouldering module according to some embodiments of the present disclosure.

In some embodiments, as shown in FIG. 26, the first film abutting and edge cutting forward-backward module 615 may include a first film abutting and edge cutting forward-backward driver 6151, a first film abutting and edge cutting forward-backward slide group 6152, and a first film abutting and edge cutting forward-backward slide plate 6153. A slide rail of the first film abutting and edge cutting forward-backward driver 6151 and a slide rail of the first film abutting and edge cutting forward-backward slide group 6152 may be fixed on the edge cutting bracket module 611. The first film abutting and edge cutting forward-backward slide plate 6153 may be fixed on a free end of the first film abutting and edge cutting forward-backward driver 6151 and a slide block of the first film abutting and edge cutting forward-backward slide group 6152. The first film abutting and edge cutting forward-backward module 615 may be configured to cooperate with the first film abutting module 613 and the first edge cutting module 617 to move forward for edge cutting and to move backward for releasing the battery 100.

In some embodiments, as shown in FIG. 26, the film shouldering module 612 may include a left-right side film shouldering base 6121, a left-right side film shouldering forward-backward driver 6122, a left-right side film shouldering forward-backward slide bracket 6123, a left-right side film shouldering forward-backward slide group 6124, a right side film shouldering driver 6125, a right side shouldering film palm 6126, a left side film shouldering driver 6127, and a left side shouldering film palm 6128. The left-right side film shouldering base 6121 may be fixed on the edge cutting bracket module 611. The left-right side film shouldering forward-backward driver 6122 and a slide rail of the left-right side film shouldering forward-backward slide group 6124 may be fixed on the left-right side film shouldering base 6121. The left-right side film shouldering forward-backward slide bracket 6123 may be fixed on a free end of the left-right side film shouldering forward-backward driver 6122 and a slide block of the left-right side film shouldering forward-backward slide group 6124. The right side film shouldering driver 6125 and the left side film shouldering driver 6127 may be fixed on the left-right side film shouldering forward-backward slide bracket 6123. The right side shouldering film palm 6126 may be fixed on a free end of the right side film shouldering driver 6125, and the left side shouldering film palm 6128 may be fixed on a free end of the left side film shouldering driver 6127. The film shouldering module 612 may be configured to drive the right side shouldering film palm 6126 to move up and down through the right side film shouldering driver 6125, and the left side film shouldering driver 6127 may be configured to drive the left side shouldering film palm 6128 to move up and down, so that the right side shouldering film palm 6126 and the left side shouldering film palm 6128 may respectively support the insulating film extended form the left side 12 and the right side (not shown) of the battery 100.

Figure 27:
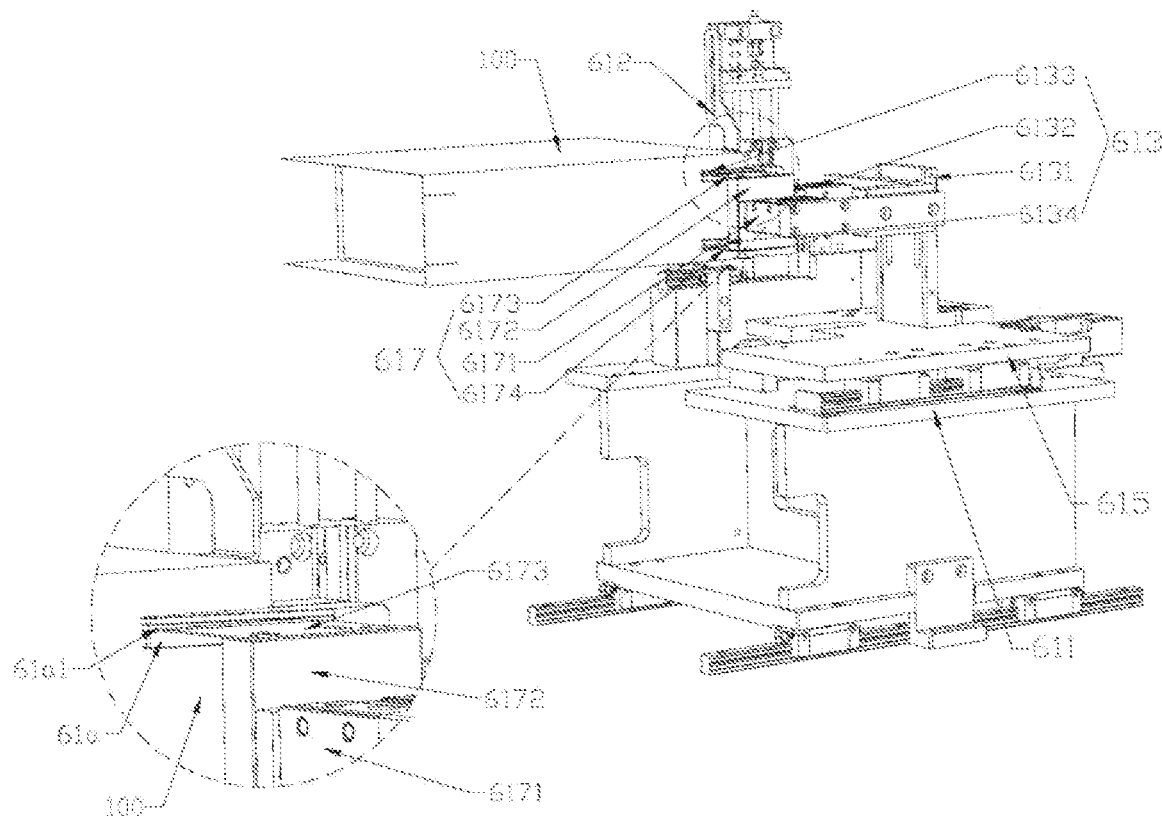
FIG. 27 is a schematic diagram illustrating a partial structure of a first edge cutting mechanism according to some embodiments of the present disclosure.

FIG. 27 is a schematic diagram illustrating a partial structure of a first edge cutting mechanism according to some embodiments of the present disclosure.

In some embodiments, as shown in FIG. 27, the first film abutting module 613 may include a first film abutting and edge cutting bracket 6131, a first film abutting driver 6132, a first upper film abutting palm 6133, and a first lower film abutting palm 6134. The first film abutting and edge cutting bracket 6131 may be fixed on the first film abutting and edge cutting forward-backward slide plate 6153. The first film abutting driver 6132 may be fixed on the first film abutting and edge cutting bracket 6131. The first upper film abutting palm 6133 and the first lower film abutting palm 6134 may be fixed on two free ends of the first film abutting driver 6132, respectively. Each of the first upper film abutting palm 6133 and the first lower film abutting palm 6134 may include a plurality of clamp fingers 61a, and for each of the plurality of clamp fingers 61a, the clamp finger 61a may be provided with a clamp finger slot 61a1 used to cut through the insulating film when the first edge cutting module 617 is used to cut the edges. A slot opening of the clamp finger slot 61a1 may have a same direction and position with an incision of the first upper blade 6173 and the first lower blade 6174, so as to abut against the insulating film to prevent the insulating film from being collapsed and deformed during the edge cutting process.

In some embodiments, as shown in FIG. 27, the first edge cutting module 617 may include a first edge cutting driver 6171, a first cutter bracket 6172, the first upper blade 6173, and the first lower blade 6174. The first edge cutting driver 6171 may be fixed to the first film abutting and edge cutting bracket 6131. The first cutter bracket 6172 may be fixed to a free end of the first edge cutting driver 6171. The first upper blade 6173 and the first lower blade 6174 may be fixed to the first cutter bracket 6172.

In some embodiments, as shown in FIG. 24, the second edge cutting mechanism 620 may include the edge cutting bracket module 611, the first film abutting and edge cutting forward-backward module 615, the film shouldering module 612, the second film abutting and edge cutting forward-backward module 616, the second film abutting module 614, and the second edge cutting module 618. The edge cutting bracket module 611, the first film abutting and edge cutting forward-backward module 615, and the film shouldering module 612 may be identical to those in the first edge cutting mechanism 610.

Figure 28:
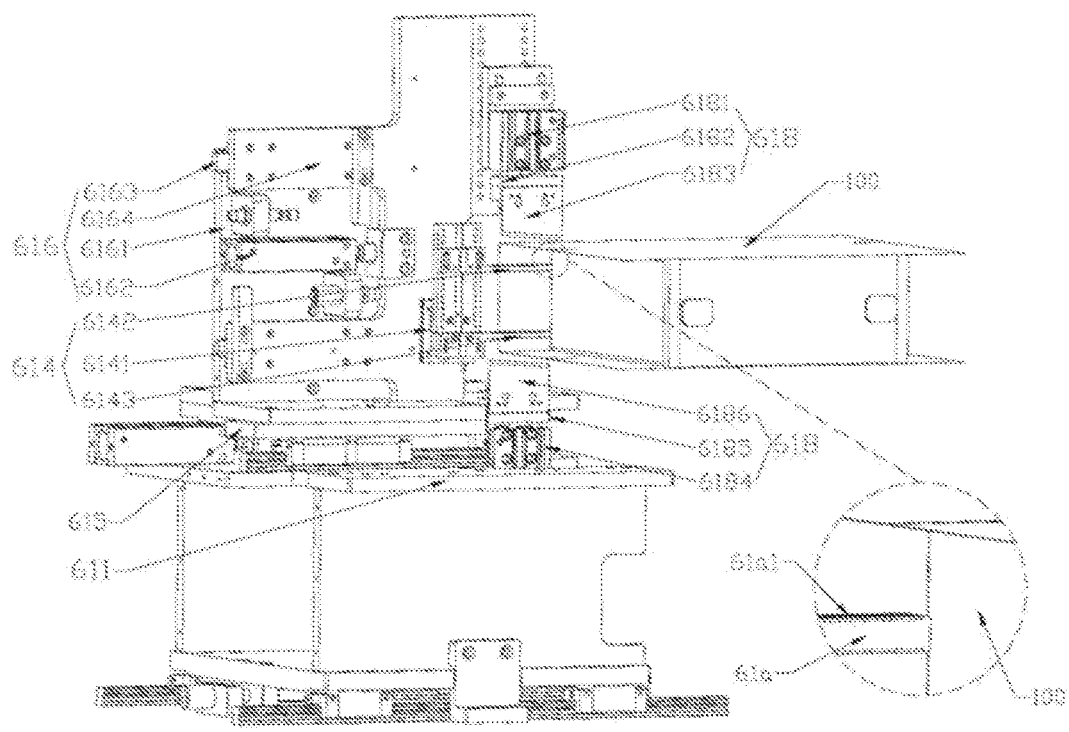
FIG. 28 is a schematic diagram illustrating a partial structure of a second edge cutting mechanism according to some embodiments of the present disclosure.

FIG. 28 is a schematic diagram illustrating a partial structure of a second edge cutting mechanism according to some embodiments of the present disclosure.

In some embodiments, as shown in FIG. 28, the second film abutting and edge cutting forward-backward module 616 may include the second film abutting and edge cutting forward-backward bracket 6161, the second film abutting and edge cutting forward-backward driver 6162, the second film abutting and edge cutting forward-backward slide group 6163, and the second film and edge cutting forward-backward slide plate 6164. The second film abutting and edge cutting forward-backward bracket 6161 may be fixed to the first film abutting and edge cutting forward-backward slide plate 6153. The second film abutting and edge cutting forward-backward driver 6162 and a slide rail of the second film abutting and edge cutting forward-backward slide group 6163 may be fixed on the second film abutting and edge cutting forward-backward bracket 6161. The second film and edge cutting forward-backward slide plate 6164 may be fixed to a free end of the second film abutting and edge cutting forward-backward driver 6162 and the slide block of the second film abutting and edge cutting forward-backward slide group 6163. The second film abutting and edge cutting forward-backward module 616 may be configured to cooperate with the second film abutting module 614 and the second edge cutting module 618 to move forward for edge cutting and move backward for releasing the battery 100.

In some embodiments, as shown in FIG. 28, the second film abutting module 614 may include a second film abutting driver 6141, a second upper film abutting palm 6142, and a second lower film abutting palm 6143. The second film abutting driver 6141 may be fixed to the second film and edge cutting forward-backward slide plate 6164. The second upper film abutting palm 6142 and the second lower film abutting palm 6143 may be respectively fixed to two free ends of the second film abutting driver 6141. The second upper film abutting palm 6142 and the second lower film abutting palm 6143 may include a plurality of clamp fingers 61a, and for each of the plurality of clamp fingers 61a, the clamp finger 61a may be provided with a clamp finger slot 61a1 used to cut through the insulating film when the second edge cutting module 618 is used to cut the edges. A slot opening of the clamp finger slot 61a1 may have a same direction and position with an incision of the second upper blade 6183 and the second lower blade 6186, so as to abut against and hold the insulating film to prevent the insulating film from being collapsed and deformed during the edge cutting process.

In some embodiments, as shown in FIG. 28, the second edge cutting module 618 may include a second upper edge cutting driver 6181, a second upper cutter bracket 6182, a second upper blade 6183, a second lower edge cutting driver 6184, a second lower cutter bracket 6185, and a second lower blade 6186. The second upper edge cutting driver 6181 and the second lower edge cutting driver 6184 may be fixed on the second film and edge cutting forward-backward slide plate 6164. The second upper cutter bracket 6182 may be fixed on a free end of the second upper edge cutting driver 6181. The second lower cutter bracket 6185 may be fixed on a free end of the second lower edge cutting driver 6184. The second upper blade 6183 may be fixed on the second upper blade bracket 6182, and the second lower blade 6186 may be fixed to the second lower blade bracket 6185.

Figure 29:
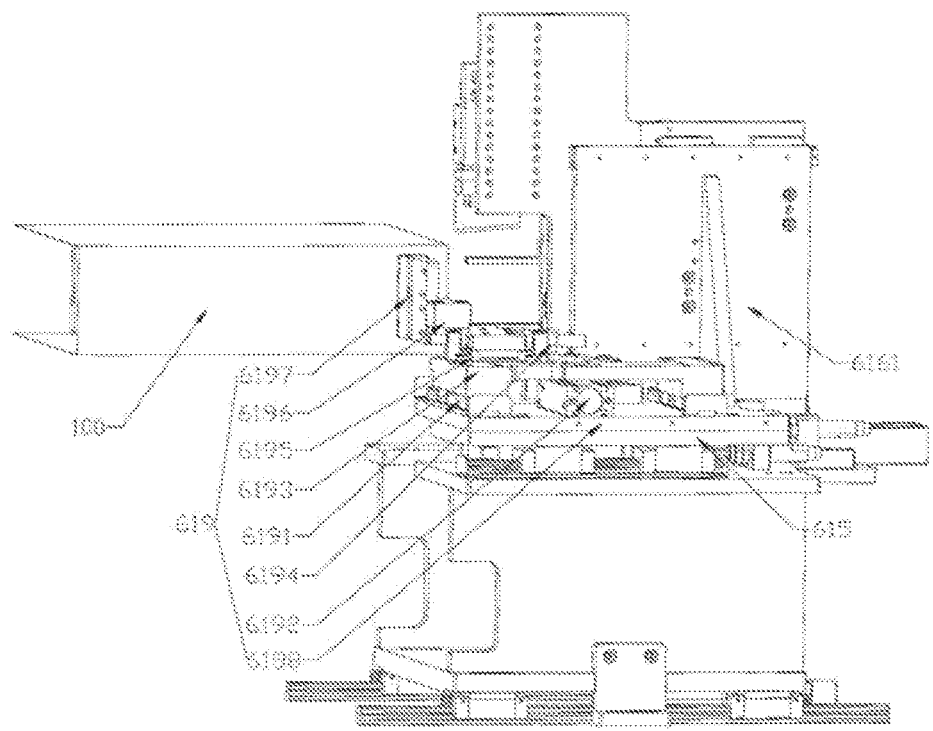
FIG. 29 is a schematic diagram illustrating a structure of a first middle folding and adhering module according to some embodiments of the present disclosure.

FIG. 29 is a schematic diagram illustrating a structure of a first middle folding and adhering module according to some embodiments of the present disclosure.

In some embodiments, as shown in FIG. 29, the edge cutting device 600 for the battery coating may further include a first middle folding and adhering module 619. The first middle folding and adhering module 619 may include a first middle folding and adhering module mounting plate 6198, a first middle folding and adhering front-rear translating slide group 6191, a first middle folding and adhering front-rear translating driver 6192, a first middle folding and adhering front-rear translating slide plate 6193, a first middle folding and adhering front-rear position adjusting member 6194, a first middle folding and adhering front-rear position adjusting slide group 6195, a first middle folding and adhering press bracket 6196, and a first middle folding and adhering press member 6197. The first middle folding and adhering module mounting plate 6198 may be fixed on the first film abutting and edge cutting forward-backward slide plate 6153. The first middle folding and adhering front-rear translating driver 6192 and a slide rail of the first middle folding and adhering front-rear translating slide group 6191 may be fixed on the first middle folding and adhering module mounting plate 6198. The first middle folding and adhering front-rear translating slide plate 6193 may be fixed to a free end of the first middle folding and adhering front-rear translating driver 6192 and a slide block of the first middle folding and adhering front-rear translating slide group 6191. The first middle folding and adhering front-rear position adjusting member 6194 and the slide rail of the first middle folding and adhering front-rear position adjusting slide group 6195 may be fixed to the first middle folding and adhering front-rear translating slide plate 6193. The first middle folding and adhering press bracket 6196 may be fixed to a free end of the first middle folding and adhering front-rear position adjusting member 6194 and a slide block of the first middle folding and adhering front-rear position adjusting slide group 6195. The first middle folding and adhering press member 6197 may be fixed to the first middle folding and adhering press bracket 6196. A pressing and adhering direction of the first middle folding and adhering press member 6197 may be opposite to a conveying direction of the battery 100, and a projection of the first middle folding and adhering press member 6197 in the pressing and adhering direction may be located on the insulating film extending out of the bottom side of the battery 100.

Exemplarily, a specific process for cutting the edges of the U-shaped coating battery may be as follows.

When the edge cutting device 600 for the battery is configured to cut the edges of the U-shaped coating battery 100, and when the edges of the bottom side need to be cut, two left and right first edge cutting mechanisms 610 may be adopted. Two left and right first film abutting modules 613 and two left and right first edge cutting modules 617 may be used in cooperation for the front side (not shown) and the back side 13 of the battery 100 to cut the edges of the bottom side (not shown). When the edges of the left side and the edges of the right side are need to be cut, another two left and right second edge cutting mechanisms 620 may be adopted, and two left and right second film abutting modules 614 and two left and right second edge cutting modules 618 may be used in cooperation for the front side (not shown) and the back side 13 of the battery 100 to cut the edges of the left side 12 and the edges of the right side (not shown). Alternatively, the two left and right first edge cutting mechanisms 610 may be replaced by the two left and right second edge cutting mechanisms 620. That is, the first edge cutting mechanism 610 may be used to release and take the first film abutting and edge cutting bracket 6131 off from the first film abutting and edge cutting forward-backward module 615. That is, the single integral unit formed by the first film abutting module 613 and the first edge cutting module 617 may be dismantled, and the second film abutting and edge cutting forward-backward bracket 6161 may be mounted on the first film abutting and edge cutting forward-backward module 615, so that the second film abutting and edge cutting forward-backward module 616, and the single integral unit formed by the second film abutting module 614 and the second edge cutting module 617 may be replaced. The integral replacement may take less time, and have smaller impact on a production capacity of the edge cutting of the U-shaped coating battery. The edge cutting and the edge replacement of the U-shaped coating battery 100 may be facilitated, which saves duplicate investments of the first film abutting and edge cutting forward-backward module 615 and the film shouldering module 612, and an occupied area taken by the battery coating device.

Exemplarily, a specific process for cutting the edges of the hollow-square-shaped coating battery may be as follows.

When the edge cutting device 600 for the battery is configured to cut the edges of the hollow-square-shaped coating battery 100, and when the edges of the front side and the edges of the back side need to be cut, two front and rear first edge cutting mechanisms 610 may be adopted. Two front and rear first edge cutting modules 613 and two front and rear first edge cutting modules 617 may be used in cooperation for the bottom side (not shown) of the battery 100 to cut the edges of the front side (not shown) and the edges of the back side 13, respectively. When the edges of the left side and the edges of the right side need to be cut, another two front and rear edge cutting mechanisms 620 may be adopted. Two front and rear second film abutting modules 614 and two front and rear second edge cutting modules 618 may be used in cooperation for the bottom side (not shown) of the battery 100 to cut the edges at two front and rear positions on the left side 12 and the right side (not shown), respectively. Alternatively, the two front and rear first edge cutting mechanisms 610 may also be replaced by the two front and rear second edge cutting mechanisms 620. That is, the first edge cutting mechanism 610 may be used to release and dismantle the first edge cutting module 6131 from the first film abutting and edge cutting forward-backward module 615. That is, the single integral unit formed by the first film abutting module 613 and the first edge cutting module 617 may be dismantled, and the second film abutting and edge cutting forward-backward bracket 6161 may be mounted on the first film abutting and edge cutting forward-backward module 615, so that the second film abutting and edge cutting forward-backward module 616 and the single integral unit formed by the second film abutting module 614 and the second edge cutting module 618 may be replaced. The integral replacement may take less time, and have smaller impact on a production capacity of the edge cutting of the hollow-square-shaped coating battery. The edge cutting and the edge replacement of the hollow-square-shaped coating battery 100 may be facilitated, which saves duplicate investments of the first film abutting and edge cutting forward-backward module 615 and the film shouldering module 612, and an occupied area taken by the battery coating device.

Figure 30:
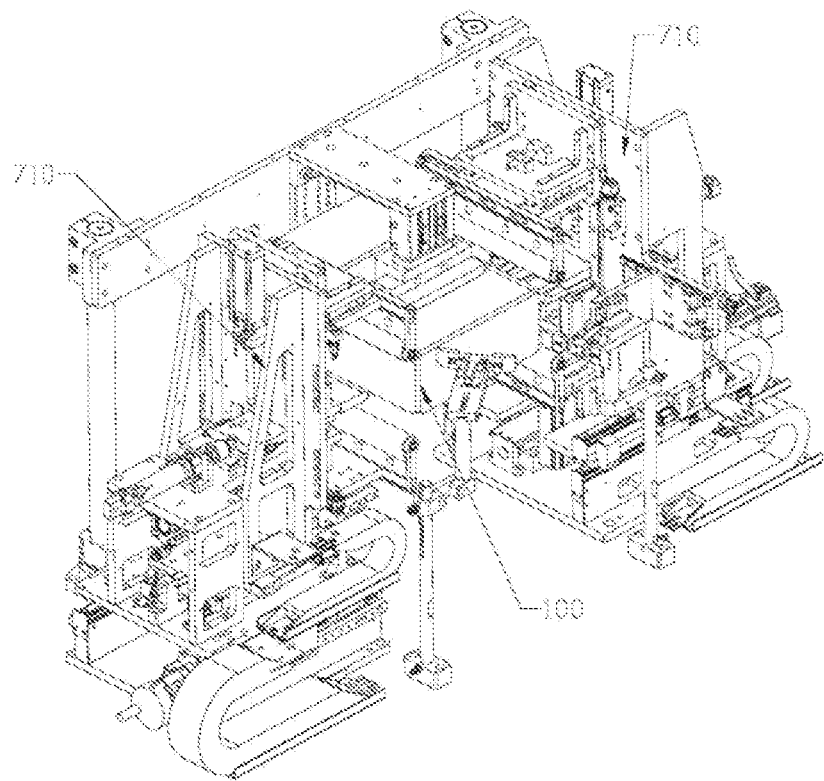
FIG. 30 is a schematic diagram illustrating a structure of a folding and adhering device according to some embodiments of the present disclosure.
Figure 31:
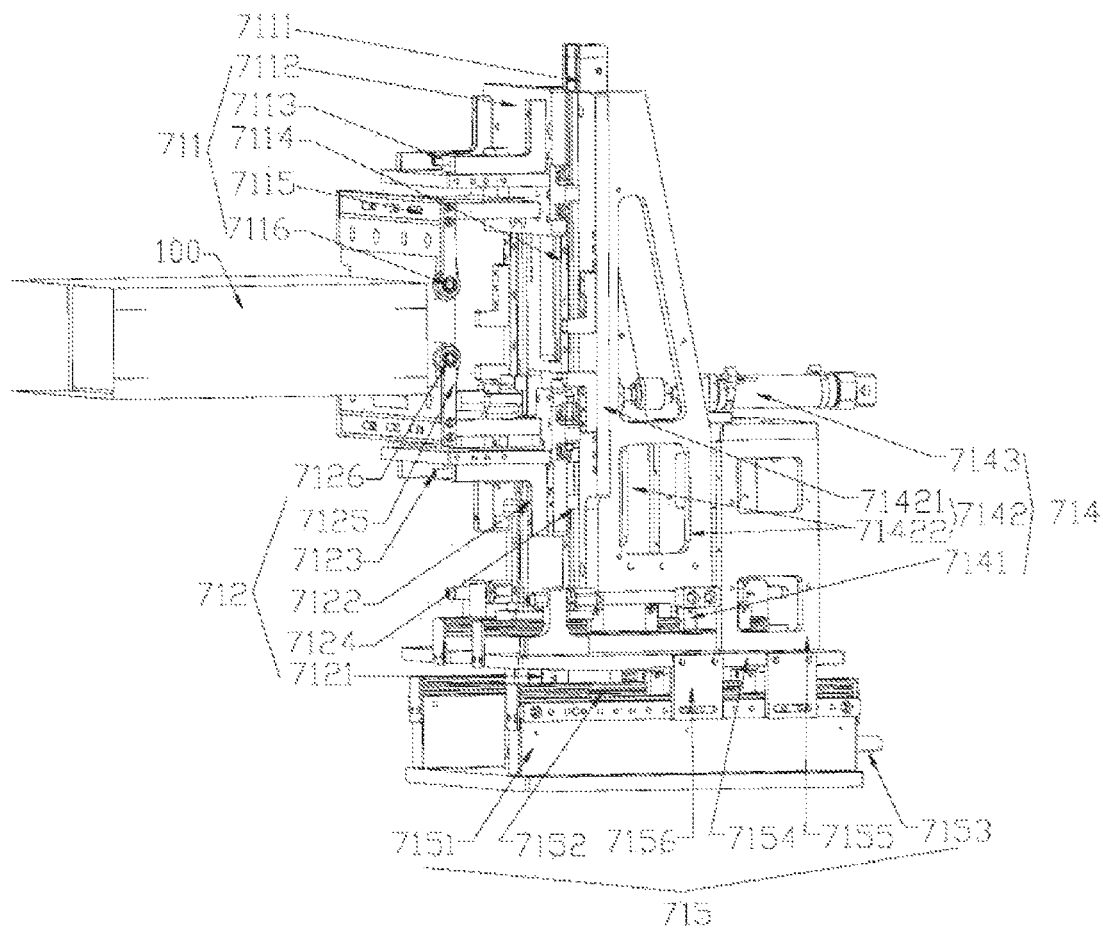
FIG. 31 is a schematic diagram illustrating a structure of a second folding and adhering mechanism according to some embodiments of the present disclosure.
Figure 32:
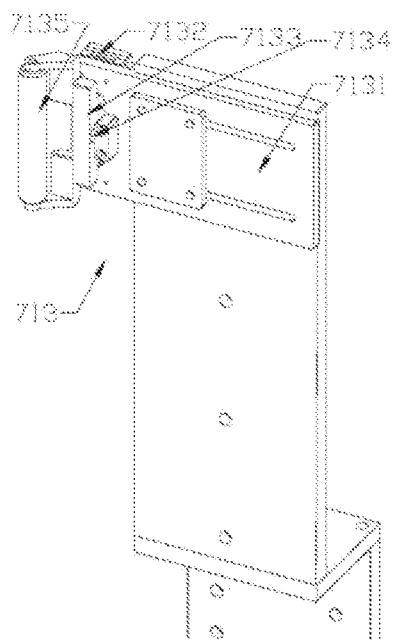
FIG. 32 is a schematic diagram illustrating a structure of a second middle folding and adhering module according to some embodiments of the present disclosure.

FIG. 30 is a schematic diagram illustrating a structure of a folding and adhering device according to some embodiments of the present disclosure. FIG. 31 is a schematic diagram illustrating a structure of a second folding and adhering mechanism according to some embodiments of the present disclosure. FIG. 32 is a schematic diagram illustrating a structure of a second middle folding and adhering module according to some embodiments of the present disclosure.

In some embodiments, as shown in FIGS. 30-32, a folding and adhering device 700 may include one to two second folding mechanisms 710, each of which includes a second upper folding and adhering module 711, a second lower folding and adhering module 712, a second middle folding and adhering module 713, a second folding and adhering forward-backward module 714, and a second folding and adhering support 715.

The folding and adhering device 700 may be used to fold and adhere the insulating film extending from the left side, the right side, and the bottom side (not shown) onto the front side and the rear side of the U-shaped coating battery with the cooperation of the coating positioning mechanism 510, and the insulating film extending out from the bottom side (not shown) may be folded and adhered onto the front side and the rear side of the battery before or after the folding and adhering operation mentioned above. Alternatively, for the hollow-square-shaped coating battery, the insulating film extending from the left side, the right side, the front side, and the back side of the battery may be folded and adhered onto the bottom side (not shown) of the battery, and the insulating film extending from the front side and the back side may be folded and adhered onto the bottom side (not shown) of the battery.

The second upper folding and adhering module 711 may be configured to fold and adhere the insulating film extending outside the left side 12 of the battery to the front side (not shown) or the back side 13 of the battery from top to bottom under the U-shaped coating manner, or fold and adhere the insulating film extending outside the left side 12 of the battery to the bottom side (not shown) of the battery from top to bottom under the hollow-square-shaped coating manner. The second lower folding and adhering module 712 may be configured to hold and adhere the insulating film extending outside the right side (not shown) of the battery to the front side (not shown) or the back side 13 of the battery from bottom to top under the U-shaped coating manner, or fold and adhere the insulating film extending outside the right side (not shown) of the battery to the bottom side (not shown) of the battery from bottom to top under the hollow-square-shaped coating manner. The second upper folding and adhering module 711 and the second lower folding and adhering module 712, combined with the transferring and positioning device 500, may be configured to form the third folding and adhering station 522 configured to fold and adhere the coating of the battery 100. The second middle folding and adhering module 713 may be configured to fold and adhere the insulating film extending outside the bottom side (not shown) of the battery in a horizontal backward direction to the back side 13 of the battery under the U-shaped coating manner, or fold and adhere the insulating film extending outside the front side (not shown) or the back side 13 of the battery in a horizontal forward or backward direction to the bottom side (not shown) of the battery under the hollow-square-shaped coating manner.

The second folding and adhering forward-backward module 714 may be configured to install the second upper folding and adhering module 711, the second lower folding and adhering module 712, and the second middle folding and adhering module 713. The second folding and adhering forward-backward module 714 may be able to drive the second upper folding and adhering module 711, the second lower folding and adhering module 712, and the second middle folding and adhering module 713 to move forward-backward in a left-right direction. The second folding and adhering support 715 may be configured to install the second folding and adhering forward-backward module 714, and adjust and locate the second folding and adhering forward-backward module 714.

In some embodiments, as shown in FIG. 31, the second upper folding and adhering module 711 may include a second upper folding and adhering lifting driver 7111, a second upper folding and adhering lifting slide bracket 7112, a second upper folding and adhering adjustment assembly 7113, a second upper folding and adhering lifting slide group 7114, a second upper folding and adhering press roller bracket 7115, and a second upper folding and adhering press roller 7116. The second upper folding and adhering lifting driver 7111 and a slide rail of the second upper folding and adhering lifting slide group 7114 may be fixed on the second folding and adhering forward-backward module 714. The second upper folding and adhering lifting slide bracket 7112 may be fixed on a free end of the second upper folding and adhering lifting driver 7111 and on a slide block of the second upper folding and adhering lifting slide group 7114. The second upper folding and adhering adjustment assembly 7113 may be fixed on the second upper folding and adhering lifting slide bracket 7112. The second upper folding and adhering press roller bracket 7115 may be fixed on the second upper folding and adhering adjustment assembly 7113. The second upper folding and adhering press roller 7116 may be fixed on the second upper folding and adhering press roller bracket 7115 and extend toward the insulating film extending outside the front side (not shown) or the back side of the battery 13 on the left side 12 of the battery under the U-shaped coating manner, or extend toward the insulating film extending outside the bottom side (not shown) of the battery on the left side 12 of the battery under the hollow-square-shaped coating manner.

In some embodiments, as shown in FIG. 31, the second lower folding and adhering module 712 may include a second lower folding and adhering lifting driver 7121, a second lower folding and adhering lifting slide bracket 7122, a second lower folding and adhering adjustment assembly 7123, a second lower folding and adhering lifting slide group 7124, a second lower folding and adhering press roller bracket 7125, and a second lower folding and adhering roller 7126. The second lower folding and adhering lifting driver 7121 and a slide rail of second lower folding and adhering lifting slide group 7124 may be fixed on the second folding and adhering forward-backward module 714. The second lower folding and adhering lifting slide bracket 7122 may be fixed on a free end of the second lower folding and adhering lifting driver 7121 and on a slide block of the second lower folding and adhering lifting slide group 7124. The second lower folding and adhering adjustment assembly 7123 may be fixed on the second lower folding and adhering lifting slide bracket 7122. The second lower folding and adhering press roller bracket 7125 may be fixed on the second lower folding and adhering adjustment assembly 7123. The second lower folding and adhering roller 7126 may be fixed on the second lower folding and adhering press roller bracket 7125 and extend toward the insulating film extending outside the front side (not shown) or the back side of the battery 13 on the right side (not shown) of the battery under the U-shaped coating manner, or extend toward the insulating film extending outside the bottom side (not shown) of the battery on the right side (not shown) under the hollow-square-shaped coating manner.

The second upper folding and adhering lifting driver 7111 may be configured to drive the second upper folding and adhering press roller 7116. The second lower folding and adhering lifting driver 7121 may be configured to drive the second lower folding and adhering roller 7126. The second upper folding and adhering press roller 7116 and the second lower folding and adhering roller 7126 may be located in a same vertical side and may be tangent to the front side (not shown) or the back side 13 of the battery 100 under the U-shaped coating manner, or may be tangent to the bottom side (not shown) of the battery 100 under the hollow-square-shaped coating manner. In a second folding and adhering process, the second upper folding and adhering press roller 7116 or the second lower folding and adhering roller 7126 may be configured to perform the second folding and adhering operation in a staggered time, so as to avoid a collision of the two rollers and ensure a stable joint of the edges of the insulating film.

In some embodiments, as shown in FIG. 32, the second middle folding and adhering module 713 may include a second middle folding and adhering bracket 7131, a second middle folding and adhering slide group 7132, a second middle folding and adhering press roller slide bracket 7133, a second middle folding and adhering buffer member 7134, and a second middle folding and adhering press roller 7135. The second middle folding and adhering bracket 7131 may be fixed on the second folding and adhering forward-backward module 714. A slide rail of the second middle folding and adhering slide group 7132 may be fixed to the second middle folding and adhering bracket 7131. The second middle folding and adhering press roller slide bracket 7133 may be fixed to a slide block of the second middle folding and adhering slide group 7132. The second middle folding and adhering buffer member 7134 may be fixed between the second middle folding and adhering press roller slide bracket 7133 and the second middle folding and adhering bracket 7131. The second middle folding and adhering press roller 7135 may be fixed on the second middle folding and adhering press roller slide bracket 7133, and extend toward the insulating film extending outside the front side (not shown) or the back side 13 of the battery on the bottom side (not shown) of the battery under the U-shaped coating manner, or extend toward the insulating film extending outside the bottom side (not shown) of the battery on the back side 13 under the hollow-square-shaped coating manner. The second middle folding and adhering module 713 may be further configured to fold and adhere the insulating film extending from the bottom side (not shown) of the battery 100 to the front side (not shown) or the back side 13 of the battery 100 under the U-shaped coating, or may fold and adhere the insulating film extending from the front side (not shown) or the back side of the battery 100 to the bottom side (not shown) of the battery 100 under the hollow-square-shaped coating manner.

A relative movement of the battery 100 to the second middle folding and adhering module 713 may be that the transferring mechanism 540 drives the battery 100 to pass through the second middle folding and adhering module 713, and cause the insulating film extending outside the bottom side (not shown) of the battery to be folded and adhered to the front side (not shown) or the back side 13 of the battery from front to rear under a roller pressure of the second middle folding and adhering press roller 7135 in the U-shaped coating manner, or cause the insulating film extending outside the front side (not shown) of the battery to be folded and adhered to the bottom side (not shown) of the battery 100 from front to rear under the roller pressure of the second middle folding and adhering press roller 7135, or cause the insulating film extending outside the back side 13 of the battery to be folded and adhered to the bottom side (not shown) of the battery 100 from rear to front under the roller pressure of the second middle folding and adhering press roller 7135 in the hollow-square-shaped coating manner.

In the U-shaped coating process, two second folding and adhering mechanisms 710 may be arranged symmetrically on the left and right outside the front side (not shown) and the back side 13 of the battery 100. Each of the second upper folding and adhering modules 711 and each of the second lower folding and adhering modules 712 on the left side and the right side may be configured to fold and adhere the insulating film on the left side 12 and the right side (not shown) of the battery 100 that extends outside the front side (not shown) and the back side 13 of the battery 100 onto the front side (not shown) and the back side 13 of the battery 100, respectively. Each of the second middle folding and adhering modules 713 on the left side and the right side may be located in front of or behind the second upper folding and adhering modules 711 and the second lower folding and adhering modules 712. Before or after the second folding and adhering operation is performed on the front side and the back side, the insulating film extending from two side edges of the bottom side (not shown) of the battery 100 may be folded and adhered onto the front side (not shown) and the back side 13 of the battery 100 from front to rear along a movement direction of the battery, respectively.

In the hollow-square-shaped coating process, one second folding and adhering mechanism 710 may be arranged outside the bottom side (not shown) of the battery 100, and one second upper folding and adhering module 711 and one second lower folding and adhering module 712 may be configured to fold and adhere the insulating film on the left side 12 and the right side (not shown) that extends out of the bottom side (not shown) of the battery 100 onto the bottom side (not shown) of the battery 100, respectively. The two second middle folding and adhering modules 713 may be respectively disposed before and after the second upper folding and adhering module 711 and the second lower folding and adhering module 712. Before or after the folding and adhering operation is performed on the front side and the back side of the battery 100, the insulating film on the front side (not shown) of the battery 100 that extends out of the bottom side (not shown) of the battery 100 may be folded and adhered horizontally backward to the bottom side (not shown) of the battery 100, and the insulating film on the back side 13 of the battery 100 that extends out of the bottom side (not shown) of the battery 100 may be folded horizontally forward to the bottom side (not shown) of the battery 100.

In some embodiments, as shown in FIG. 31, the second folding and adhering support 715 may include a second folding and adhering base 7151, a second folding and adhering support slide group 7152, a second folding and adhering support drive assembly 7153, a second folding and adhering support slide plate 7154, a second folding and adhering support upper bracket 7155, and a second folding and adhering support locking member 7156. The second folding and adhering base 7151 may be fixed to the machine station 200. The second folding and adhering support drive assembly 7153 and a slide rail of the second folding and adhering support slide group 7152 may be fixed on the second folding and adhering base 7151. The second folding and adhering support slide plate 7154 may be fixed on a free end of the second folding and adhering support drive assembly 7153 and a slide block of the second folding and adhering support slide group 7152, and may be locked on the second folding and adhering base 7151. The second folding and adhering support upper bracket 7155 may be fixed on the second folding and adhering support slide plate 7154. The second folding and adhering support drive assembly 7153 may be configured to adjust a left position and a right position of the second folding and adhering support slide plate 7154 to adapt to batteries 100 with different sizes, and the second folding and adhering support locking member 7156 may be configured to lock the second folding and adhering support slide plate 7154 onto the second folding and adhering base 7151.

In some embodiments, as shown in FIG. 31, the second folding and adhering forward-backward module 714 may include a second folding and adhering forward-backward slide group 7141, a second folding and adhering forward-backward slide bracket 7142, and a second folding and adhering forward-backward driver 7143. The second folding and adhering forward-backward slide bracket 7142 may further include two vertical panels 71422 and a side panel 71421. The side panel 71421 may be oriented toward the edge cutting and second folding and adhering station 521. A slide rail of the second folding and adhering forward-backward slide group 7141 may be fixed to the second folding and adhering support slide plate 7154. The second folding and adhering forward-backward driver 7143 may be fixed on the second folding and adhering support upper bracket 7155. The second folding and adhering forward-backward slide bracket 7142 may be fixed on a free end of the second folding and adhering forward-backward driver 7143 and on a slide block of the second folding and adhering forward-backward slide group 7141. The second folding and adhering forward-backward driver 7143 may be configured to drive the second folding and adhering forward-backward slide bracket 7142 to carry the second upper folding and adhering module 711, the second lower folding and adhering module 712, and the second middle folding and adhering module 713 to move to left and right relative to the front side (not shown) or the back side 12 of the battery under the U-shaped coating manner, or to move left and right relative to the bottom side (not shown) of the battery under the hollow-square-shaped coating manner. When the second folding and adhering forward-backward slide bracket 7142 approaches the battery 100, the front side and the back side of the battery 100 may be folded and adhered under the U-shaped coating manner, or the bottom side of the battery 100 may be folded and adhered under the hollow-square-shaped coating manner. When the second folding and adhering forward-backward slide bracket 7142 leaves the battery 100, the coated battery 100 may be released.

When the first edge cutting mechanism 610 is configured to cut edges of the U-shaped coating semi-finished battery 100, if the edges of the bottom side are cut, the edge cutting device 600 may be configured to use the first film abutting module 613 and the first edge cutting module 617 to cooperate with each other in edge cutting, and at this time, the first middle folding and adhering module 619 may not work, and the folding and adhering of the left side and the right side may be implemented on the second upper folding and adhering module 711 and the second lower folding and adhering module 712. The folding and adhering of the bottom side may be implemented on the second middle folding and adhering module 713 of the folding and adhering device 700. If the edges of the left side and the edges of the right side are cut, the edge cutting device 600 may be configured to use the second film abutting module 614 and the second edge cutting module 618 to cooperate with each other in edge cutting. After the edge cutting is finished, the bottom side may be folded and adhered on the first middle folding and adhering module 619, and the left side and the right side may be folded and adhered on the folding and adhering device 700.

When the battery edge cutting device 600 is configured to cut the edges of the hollow-square-shaped coating battery 100, if edges of a side surface are cut, two sets of the first edge cutting mechanisms 610 may be arranged outside the bottom side (not shown) of the battery on a front side and a rear side. Each of the first edge cutting mechanisms 610 may be configured to use the first film abutting module 613 and the first edge cutting module 617 to cooperate with each other to cut the edges of the insulating film on the front side and the back side of the battery that extends out of the bottom side (not shown) of the battery. At this time, the first middle folding and adhering module 619 may not work, and the folding and adhering of the left side and the right side may be implemented on the second upper folding and adhering module 711 and the second lower folding and adhering module 712, and the folding and adhering of the front side and the back side may be implemented on the second middle folding and adhering module 713 of the folding and adhering device 700. If the edges of the left side and the right side are cut, two sets of the second edge cutting mechanisms 620 may be arranged outside the bottom side (not shown) of the battery on a front side and a rear side. Each of the second edge cutting mechanisms 610 may be configured to use the second film abutting module 614 and the second edge cutting module 618 to cooperate with each other to cut the edges of the insulating film on the left side and the right side that extends out of the bottom side (not shown) of the battery. After the edge cutting is finished, the two second edge cutting modules 618 may be configured to fold and adhere the insulating film on the front side and the back side that extends out of the bottom side (not shown) onto the bottom side of the battery. The folding and adhering of the left side and the right side may be implemented on the folding and adhering device.

The foregoing is only a preferred embodiment of the present disclosure, and is not intended to limit the present disclosure. Any modifications, equivalent substitutions, and improvements, etc., within the spirit and principles of the present disclosure shall be included in the scope of protection of the present disclosure.

The basic concepts have been described above, and it may be apparent to those skilled in the art that the detailed disclosure provided above is intended as an example only and does not constitute a limitation of the present disclosure. While not expressly stated herein, various modifications, improvements, and amendments may be made to the present disclosure by those skilled in the art. Such modifications, improvements, and amendments are suggested in the present disclosure, and therefore, they remain within the spirit and scope of the exemplary embodiments of the present disclosure.

Also, the present disclosure uses specific terms to describe embodiments of the present disclosure. For example, "an embodiment", "one embodiment", and/or "some embodiments" refer to a feature, structure, or characteristic associated with at least one embodiment of the present disclosure. Therefore, it should be emphasized and noted that "one embodiment", "an embodiment", or "an alternative embodiment" mentioned at different places in the present disclosure may not necessarily refer to the same embodiment. In addition, certain features, structures, or characteristics in one or more embodiments of the present disclosure may be suitably combined.

Additionally, the order of processing elements and sequences, the use of numerical letters, or the use of other names described herein are not intended to limit the order of the processes and methods of the present disclosure, unless expressly stated in the claims. While some embodiments of the invention that are currently considered useful are discussed in the foregoing disclosure by way of various examples, it should be appreciated that such details serve only illustrative purposes, and that the appended claims are not limited to the disclosed embodiments, but rather, the claims are intended to cover all amendments and equivalent combinations that are consistent with the substance and scope of the embodiments of the present disclosure. For example, although the embodiment of various components described above may be embodied in a hardware device, it may also be implemented as a software only solution, e.g., install the described system on an existing server or mobile device Similarly, it should be noted that in order to simplify the disclosure of the present disclosure and aid in the understanding of one or more embodiments of the present disclosure, the foregoing descriptions of embodiments of the present disclosure sometimes group multiple features together in a single embodiment, accompanying drawings, or a description thereof. However, the mode of disclosure does not imply that the objects of the present disclosure require more features than those mentioned in the claims. Rather, the claimed subject matter may lie in less than all the features of a single disclosed embodiment.

Some embodiments use numbers to describe the quantity of components and attributes, and it should be understood that such numbers, used in the description of an embodiment, are modified in some embodiments by the modifiers "about," "approximately," or "substantially." Unless otherwise noted, the terms "about," "approximately," or "substantially" indicate that a variation of +20% in the stated number is allowed. Correspondingly, in some embodiments, the numerical parameters used in the present disclosure and the claims are approximations, which may vary depending on the desired features of individual embodiments. In some embodiments, the numerical parameters should consider the specified number of significant digits and employ general rounding practices. While the numerical ranges and parameters used to confirm a width of their ranges in some embodiments of the present disclosure are approximations, in specific embodiments, such values are set to be as precise as possible within a feasible range.

For each patent, patent application, patent application publication, and other material cited in the present disclosure, such as articles, books, manuals, publications, documents, etc., the entire contents of which are hereby incorporated by reference in their entirety. Except for application history documents that are inconsistent with or create a conflict with the contents of the present disclosure, and except for documents that limit the broadest scope of the claims of the present disclosure (currently or hereafter appended to the present disclosure). It should be noted that in the event of any inconsistency or conflict between the descriptions, definitions, and/or use of terminology in the materials appended to the present disclosure and those set forth in the present disclosure, the descriptions, definitions, and/or use of terminology in the present disclosure shall prevail.

Finally, it should be understood that the embodiments described in the present disclosure are only used to illustrate the principles of the embodiments of the present disclosure. Other deformations may also fall within the scope of the present disclosure. As such, alternative configurations of embodiments of the present disclosure may be viewed as consistent with the teachings of the present disclosure as an example, not as a limitation. Correspondingly, the embodiments of the present disclosure are not limited to the embodiments expressly presented and described herein.

What is claimed is:

1. A square housing battery coating device compatible with a plurality of coating manners, comprising: a machine station, a feeding line, a code scanning device, a charging turnover device, a charging and handling device, a pushing device, a feeding device, a film releasing device, a film sending device, a film adhering device, a transferring and positioning device, an edge cutting device, a folding and adhering device, a blanking turnover device, a blanking and handling device, a discharging transfer device, and a discharging line, wherein the machine station is disposed with a film adhering station, and the feeding line, the code scanning device, the charging turnover device, the charging and handling device, the pushing device, the feeding device, the film releasing device, the film sending device, the film adhering device, the transferring and positioning device, the edge cutting device, the folding and adhering device, the blanking turnover device, the blanking and handling device, the discharging transfer device, and the discharging line are fixed to the machine station according to a sequence of a coating process, wherein the square housing battery coating device is configured to perform a battery coating in a U-shaped coating manner or a hollow-square-shaped coating manner, the film sending device is disposed above the pushing device and disposed between the film releasing device and the film adhering device, and the film sending device is configured to send an insulating film tape on the film releasing device to the film adhering device, the film sending device including a film pulling mechanism configured to pull the insulating film tape to the film adhering station, and a film cutting mechanism configured to cut the insulating film tape on the film pulling mechanism into a plurality of insulating film tape sections;

the film adhering device is fixed to the film adhering station and disposed between the film sending device and the transferring and positioning device, and the film adhering device is configured to send a battery with a left side of the battery facing upward to the feeding device, and with a support of the film sending device inputting the plurality of insulating film tape sections, form a U-shaped coating semi-finished battery by paving an insulating film on a bottom side, the left side, and a right side of the battery input with the bottom side facing forward using the U-shaped coating manner, or form a hollow-square-shaped coating semi-finished battery by paving the insulating film on a front side, the left side, and the right side and paving a folding and adhering insulating film to a back side of the battery input with the front side facing forward using the hollow-square-shaped coating manner, the film adhering device being provided with a first folding and adhering station configured to fold and adhere the insulating film paved on the left side and the right side of a hollow-square-shaped coating battery to the back side;

the transferring and positioning device is disposed between the film adhering device and the blanking turnover device, and the transferring and positioning device is disposed with an edge cutting and second folding and adhering station, and a third folding and adhering station configured to transfer between the edge cutting and the second folding and adhering station and the third folding and adhering station in the coating process, and clamp and locate the U-shaped coating semi-finished battery or the hollow-square-shaped coating semi-finished battery at the edge cutting and second folding and adhering station and the third folding and adhering station;

the edge cutting device is disposed at the edge cutting and second folding and adhering station, and the edge cutting device is configured to cut, in a preset position and with an assistance of the transferring and positioning device, the insulating film extending outside the front side, the back side, or the bottom side of the U-shaped semi-finished battery, or cut, in the preset position, with the assistance of the transferring and positioning device, the insulating film extending outside the bottom side of the hollow-square-shaped semi-finished battery; and the folding and adhering device is disposed at the third folding and adhering station behind the edge cutting device, and the folding and adhering device is configured to fold and adhere the insulating film extending outside the front side, the back side, and the bottom side of the U-shaped coating semi-finished battery to the front side and the back side, or fold and adhere the insulating film extending outside the bottom side of the hollow-square-shaped coating semi-finished battery to the bottom side.

2. The device of claim 1, wherein the film sending device further includes a film sending bracket, a film holding mechanism, a light-curing mechanism, and a waste film recycling mechanism, wherein the film sending device is fixed to the machine station, and the film device is configured to lay the insulating film tape;

the film holding mechanism is fixed to the film sending bracket, and is disposed with a film sending channel, the film sending channel is configured to locate and input the insulating film tape;

the light-curing mechanism is fixed to a top of the film sending bracket, and is above the film holding mechanism, the light-curing mechanism is configured to carry out a light-curing process on a back-adhesive of the insulating film tape on the film holding mechanism;

the film pulling mechanism is fixed to the film sending bracket;

the film cutting mechanism is fixed inside the film sending bracket; and the waste film recycling mechanism is fixed under the film sending bracket, and the waste film recycling mechanism is configured to recycle a waste insulating film.

3. The device of claim 1, wherein the film adhering device includes a film adhering bracket, an upper paving mechanism, a lower paving mechanism, a film adhering and receiving mechanism, a folding and adhering clamping mechanism, and a first folding and adhering mechanism, wherein the film adhering bracket is fixed on the machine station and provided with a paving channel configured to pave the insulating film to the battery, the upper paving mechanism and the lower paving mechanism are fixed on the film adhering bracket, the upper paving mechanism is located on a top of the paving channel and configured to pave the insulating film to an upper half of the bottom side and the left side of the battery under the U-shaped coating manner, or pave the insulating film to an upper half of the front side and the left side of the battery under the hollow-square-shaped coating manner;

the lower paving mechanism is located at a bottom of the paving channel and is configured to pave the insulating film to a lower half of the bottom side and the right side of the battery under the U-shaped coating manner, or pave the insulating film to a lower half of the front side and the right side of the battery under the hollow-square-shaped coating manner;

the film adhering and receiving mechanism is disposed at an outlet end of the paving channel and is configured to receive the battery during and after a paving process;

the folding and adhering clamping mechanism is disposed at an output end of the film adhering and receiving mechanism and is configured to clamp the battery after the paving process, the first folding and adhering station configured to fold and adhere the back side of the hollow-square-shaped coating battery is formed between the film adhering and receiving mechanism and the folding and adhering clamping mechanism, the first folding and adhering mechanism includes a first upper folding and adhering module and a first lower folding and adhering module, the first upper folding and adhering module is fixed to the upper paving mechanism and located above the first folding and adhering station, the first upper folding and adhering module is configured to fold and adhere a tape end of each of the plurality of insulating film tape sections extending out of the left side of the hollow-square-shaped coating battery to the back side of the hollow-square-shaped coating battery from top to bottom;

the first lower folding and adhering module is fixed to the film receiving mechanism and located below the first folding and adhering station, and the first lower folding and adhering module is configured to fold and adhere a tape head of each of the plurality of insulating film tape sections extending out of the right side of the hollow-square-shaped coating battery to the back side of the hollow-square-shaped coating battery from bottom to top.

4. The device of claim 1, wherein the transferring and positioning device comprises:

two coating positioning mechanisms symmetrically fixed to a left side and a right side of the machine station, each coating positioning mechanism including a coating positioning bracket and a plurality of positioning fixtures disposed on the coating positioning bracket, the edge cutting and second folding and adhering station and the third folding and adhering station being formed on the plurality of positioning fixtures symmetrically disposed in pairs, a transferring channel configured to determine a conveying direction of the battery being formed between the two coating positioning mechanisms;

a transferring mechanism fixed to the machine station and disposed in the transferring channel, the transferring mechanism including a plurality of transferring carriers configured to clamp the battery stably and a transferring linear module with a plurality of slide blocks, the plurality of transferring carriers are configured to move to the battery, wherein the transferring linear module is fixed on the machine station and located between the two coating positioning brackets, the plurality of transfer carriers are fixed to the plurality of slide blocks of the transferring linear module, respectively; and two top pressing mechanisms corresponding to the edge cutting and second folding and adhering station and the third folding and adhering station, respectively, each top pressing mechanism including a top pressing bracket, a top pressing driver bracket, a top pressing driver, and a top pressing palm, wherein the top pressing bracket includes two top pressing bracket columns and a top pressing bracket beam, the top pressing driver bracket is fixed on the top pressing bracket beam, the top pressing driver is fixed on the top pressing driver bracket, and the top pressing palm is fixed on a free end of the top pressing driver, and faced downwardly towards the edge cutting and second folding and adhering station and the third folding and adhering station.

5. The device of claim 1, wherein the edge cutting device comprises two first edge cutting mechanisms and two second edge cutting mechanisms that are interchangeable with each other, wherein for each of the two first edge cutting mechanisms and each of the two second edge cutting mechanisms, the first edge cutting mechanism and the second edge cutting mechanism include an edge cutting bracket module, a first film abutting, an edge cutting forward-backward module, and a film-shouldering module;

the first edge cutting mechanism further includes a first film abutting module and a first edge cutting module, the first film abutting module and the first edge cutting module being an independent unit for easy replacement, the first edge cutting mechanism being configured to cut edges of the bottom side of the U-shaped coating battery, or cut edges of the front side and edges of the back side of the hollow-square-shaped coating battery;

the second edge cutting mechanism further includes a second film abutting and edge cutting forward-backward module, a second film abutting module, and a second edge cutting module, the second film abutting and edge cutting forward-backward module, the second film abutting module, and the second edge cutting module are an independent unit for easy replacement, the second edge cutting mechanism being configured to cut edges of the left side and edges of the right side of the U-shaped coating battery, or cut edges of the left side and edges of the right side of the hollow-square-shaped coating battery;

the edge cutting bracket module is disposed on the machine station and aligned with the edge cutting and second folding and adhering station, the edge cutting bracket module is configured to install the first film abutting and edge cutting forward-backward module and the film-shouldering module;

the first film abutting and edge cutting forward-backward module are configured to install the second film abutting and edge cutting forward-backward module, the first film abutting module, and the first edge cutting module;

the second film abutting and edge cutting forward-backward module are configured to install the second film abutting module and the second edge cutting module;

the film shouldering module is configured to support the insulating film extending from the left side and the right side of the battery to keep a smooth extension of an insulating film to be cut that is extended out of the left side and the right side;

the first film abutting module is configured to abut against and hold the insulating film out of the bottom side of the U-shaped battery at an edge cutting position when cutting the edges of the bottom side of the U-shaped coating battery, such that a concavity of the insulating film does not occur to affect the edge cutting when edges of the insulating film are cut, or abut against and hold the insulating film out of the front side and the back side of the hollow-square-shaped coating battery at an edge cutting position when cutting the edges of the front side and the edges of the back side of the hollow-square-shaped coating battery, such that the concavity of the insulating film does not occur to affect the edge cutting;

the second film abutting module is configured to abut against and hold the insulating film out of the left side and the right side of the U-shaped coating battery at the edge cutting position when cutting the edges of the left side and the right side of the U-shaped coating battery, such that the concavity of the insulating film does not occur to affect the edge cutting, or abut against and hold the insulating film out of the left side and the right side of the hollow-square-shaped coating battery at the edge cutting position when cutting the edges of the front side and the edges of the back side of the hollow-square-shaped coating battery, such that the concavity of the insulating film does not occur to affect the edge cutting;

the first edge cutting module is configured to cut a preset length at a preset position of the insulating film extending outside the bottom side of the U-shaped coating battery when cutting the edges of the bottom side of the U-shaped coating, or cut a preset length at a preset position of the insulating film extending outside of the front side and the back side of the hollow-square-shaped coating battery when cutting the edges of the front side and the edges of the back side of the hollow-square-shaped coating battery; and the second edge cutting module is configured to cut a preset length at a preset position of the insulating film extending outside the left side and the right side of the U-shaped coating battery when cutting the edges of the left side and the right side of the U-shaped coating battery, or cut a preset length at a preset position of the insulating film extending outside the left side and the right side of the U-shaped coating battery when cutting the edges of the left side and the edges of the right side of the hollow-square-shaped coating battery.

6. The device of claim 5, wherein the edge cutting device further comprises a first middle folding and adhering module including a first middle folding and adhering module mounting plate, a first middle folding and adhering front-rear translating slide group, a first middle folding and adhering front-rear translating driver, a first middle folding and adhering front-rear translating slide plate, a first middle folding and adhering front-rear position adjusting member, a first middle folding and adhering front-rear position adjusting slide group, a first middle folding and adhering press bracket, and a first middle folding and adhering press member, wherein the first middle folding and adhering module mounting plate is fixed on the first film abutting module, the first middle folding and adhering front-rear translating driver and a slide rail of the first middle folding and adhering front-rear translating slide group are fixed to the first middle folding and adhering module mounting plate, the first middle folding and adhering front-rear translating slide plate is fixed to a free end of the first middle folding and adhering front-rear translating driver, a slide block of the first middle folding and adhering front-rear translating slide group is fixed to the first middle folding and adhering front-rear translating slide plate, the first middle folding and adhering front-rear position adjusting member and a slide rail of the first middle folding and adhering front-rear position adjusting slide group are fixed to the first middle folding and adhering front-rear translating slide plate, the first middle folding and adhering press bracket is fixed to the free end of the first middle folding and adhering front-rear position adjusting member and the slide block of the first middle folding and adhering front-rear position adjusting slide group, the first middle folding and adhering press member is fixed to the first middle folding and adhering press bracket, a pressing direction of the first middle folding and adhering press member is opposite to a conveying direction of the battery, and a projection of the first middle folding and adhering press member in the pressing direction is located on the insulating film extending out of the bottom side of the battery.

7. The device of claim 1, wherein the folding and adhering device comprises one or two second folding and adhering mechanisms, each of the second folding and adhering mechanisms including a second upper folding and adhering module, a second lower folding and adhering module, a second middle folding and adhering module, a second folding and adhering forward-backward module, and a second folding and adhering support base, wherein the second upper folding and adhering module is configured to hold and adhere the insulating film extending outside the left side of the battery to the front side or the back side of the battery from top to bottom under the U-shaped coating, or fold and adhere the insulating film extending outside the left side of the battery to the bottom side of the battery from top to bottom under the hollow-square-shaped coating;

the second lower folding and adhering module is configured to hold and adhere the insulating film extending outside the right side of the battery to the front side or the back side of the battery from bottom to top under the U-shaped coating, or fold and adhere the insulating film extending outside the right side of the battery to the bottom side of the battery from bottom to top in the hollow-square-shaped coating;

the second upper folding and adhering module and the second lower folding and adhering module, combined with the transferring and positioning device, are configured to form the third folding and adhering station configured to fold and adhere the battery coating;

the second middle folding and adhering module is configured to hold and adhere the insulating film extending outside the bottom side of the battery in a horizontal backward direction to the back side of the battery under the U-shaped coating, or fold and adhere the insulating film extending outside the front side or the back side of the battery in a horizontal forward or backward direction to the bottom side of the battery in the hollow-square-shaped coating;

the second folding and adhering forward-backward module is configured to install the second upper folding and adhering module, the second lower folding and adhering module, and the second middle folding and adhering module, and is able to drive the second upper folding and adhering module, the second lower folding and adhering module, and the second middle folding and adhering module to move forward-backward in a left-right direction; and the second folding and adhering support is configured to install the second folding and adhering forward-backward module, and adjust and locate the second folding and adhering forward-backward module.

* * * * *